(12) United States Patent
Allgaier

(10) Patent No.: US 10,823,748 B2
(45) Date of Patent: Nov. 3, 2020

(54) SEED DELIVERY SYSTEMS AND MAPPING OF ROW SPEEDS

(71) Applicant: PRECISION PLANTING LLC, Tremont, IL (US)

(72) Inventor: Ryan Allgaier, East Peoria, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 16/248,709

(22) Filed: Jan. 15, 2019

(65) Prior Publication Data

US 2019/0219606 A1 Jul. 18, 2019

Related U.S. Application Data

(60) Provisional application No. 62/617,588, filed on Jan. 15, 2018.

(51) Int. Cl.

| *G01P 1/07* | (2006.01) |
| *A01C 21/00* | (2006.01) |
| *A01B 79/00* | (2006.01) |
| *A01C 7/04* | (2006.01) |
| *A01C 7/16* | (2006.01) |
| *F16H 1/22* | (2006.01) |

(52) U.S. Cl.
CPC ................ *G01P 1/07* (2013.01); *A01C 21/00* (2013.01); *A01B 79/005* (2013.01); *A01C 7/046* (2013.01); *A01C 7/16* (2013.01); *A01C 21/005* (2013.01); *F16H 1/22* (2013.01)

(58) Field of Classification Search
CPC ..... G01P 1/07; F16H 1/22; A01C 7/16; A01C 7/046; A01C 21/005; A01C 21/00; A01B 79/005
See application file for complete search history.

(56) References Cited

U.S. PATENT DOCUMENTS

| 4,159,064 | A | * | 6/1979 | Hood ..................... | A01C 7/105 |
| | | | | | 221/8 |
| 5,315,564 | A | * | 5/1994 | Upton ..................... | G01S 15/04 |
| | | | | | 239/77 |
| 6,091,997 | A | * | 7/2000 | Flamme ............... | A01B 79/005 |
| | | | | | 111/903 |
| 6,389,999 | B1 | | 5/2002 | Duello | |
| 2010/0010667 | A1 | * | 1/2010 | Sauder .................... | A01C 7/04 |
| | | | | | 700/231 |
| 2010/0116974 | A1 | | 5/2010 | Liu et al. | |
| 2014/0230705 | A1 | * | 8/2014 | Radtke ................... | A01C 7/105 |
| | | | | | 111/177 |
| 2014/0303854 | A1 | * | 10/2014 | Zielke .................... | A01C 21/00 |
| | | | | | 701/50 |

(Continued)

FOREIGN PATENT DOCUMENTS

| WO | 9916004 A1 | 4/1999 |
| WO | 2014018717 A1 | 1/2014 |
| WO | 2014026183 A2 | 2/2014 |

OTHER PUBLICATIONS

Extended European Search Report from the European Patent Office; Application No. 19151803.4, dated Jun. 14, 2019, 9 pages.

*Primary Examiner* — Ryan W Sherwin

(57) ABSTRACT

A seed delivery apparatus and methods in which a seed conveyor delivers seed from a metering device to a furrow in a controlled manner to maintain seed placement accuracy within the furrow.

10 Claims, 51 Drawing Sheets

(56) References Cited

U.S. PATENT DOCUMENTS

| | | | |
|---|---|---|---|
| 2015/0094916 A1* | 4/2015 | Bauerer | A01C 21/00 |
| | | | 701/50 |
| 2015/0237795 A1* | 8/2015 | Koch | G01C 15/00 |
| | | | 701/50 |
| 2017/0086360 A1* | 3/2017 | Garner | A01C 5/068 |
| 2017/0251656 A1* | 9/2017 | Kolb | A01C 7/206 |
| 2018/0148276 A1* | 5/2018 | Stuber | A01C 14/00 |

* cited by examiner

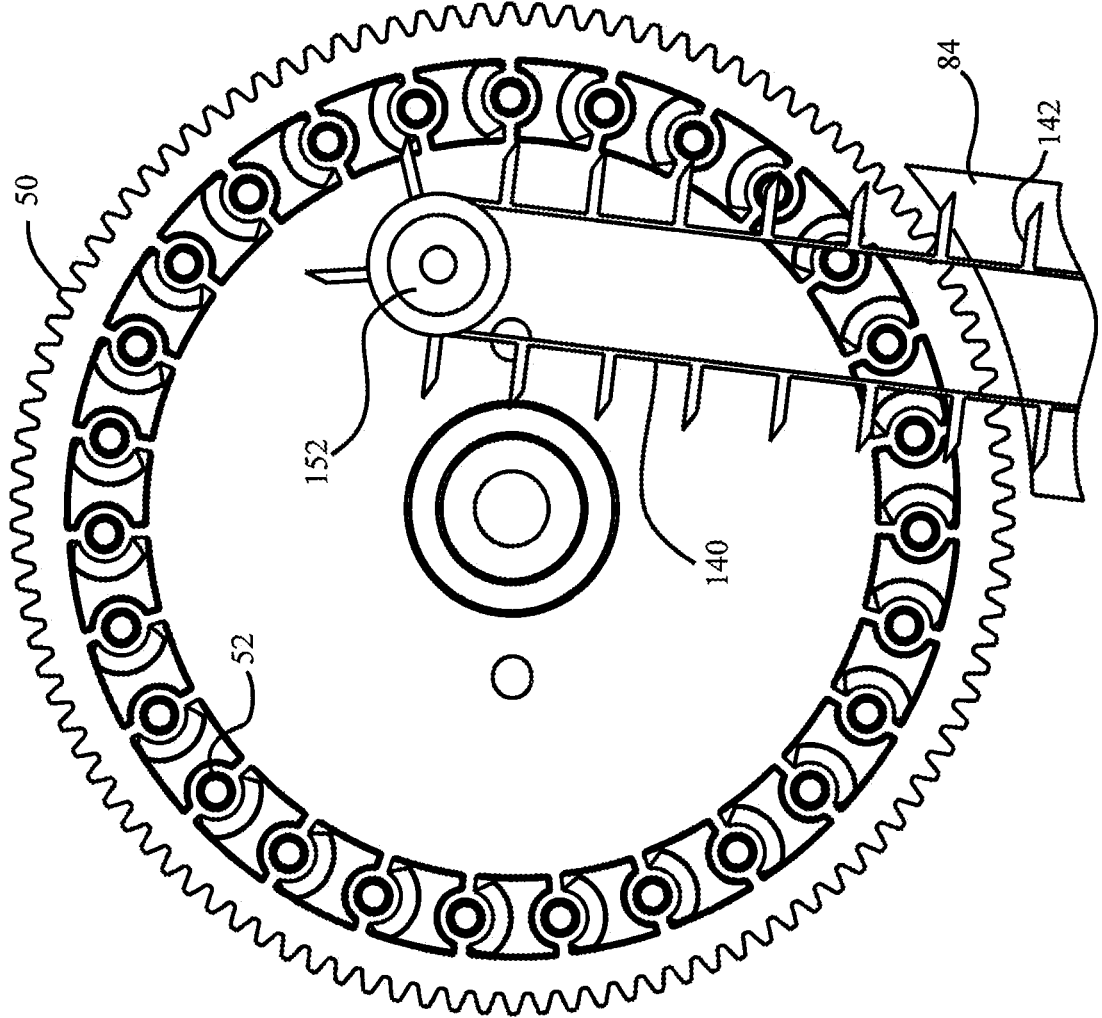
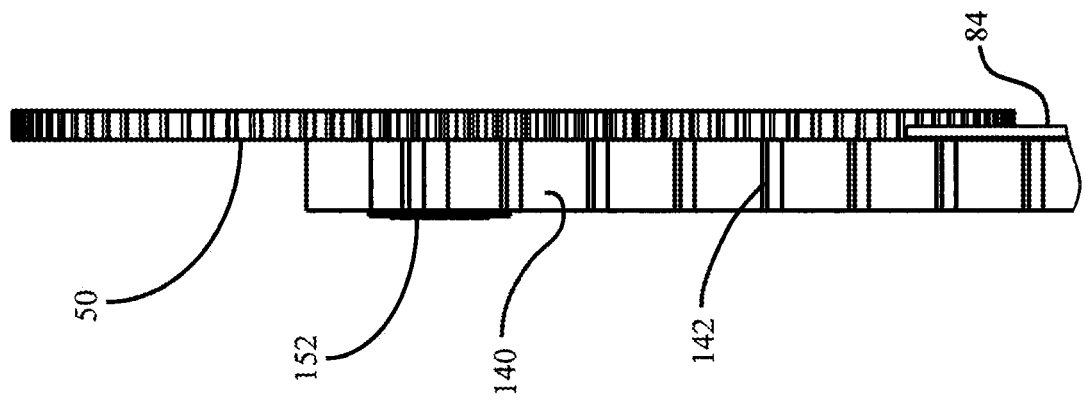

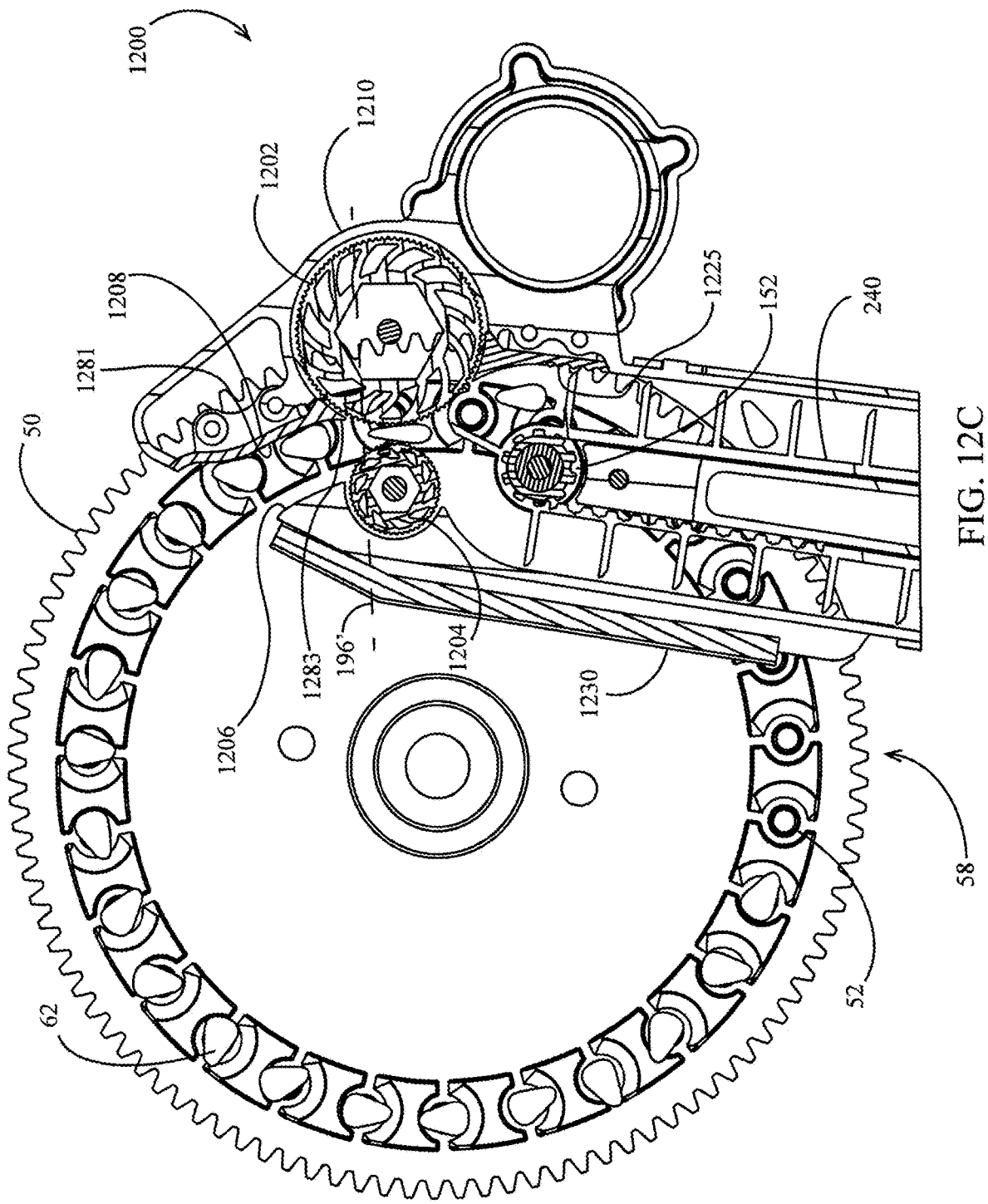

SEED DELIVERY SYSTEMS AND MAPPING OF ROW SPEEDS

BACKGROUND

In recent years, the agricultural industry has recognized the need to perform planting operations more quickly due to the limited time during which such planting operations are agronomically preferable or (in some growing seasons) even possible due to inclement weather. However, drawing a planting implement through the field at faster speeds increases the speed of deposited seeds relative to the ground, causing seeds to roll and bounce upon landing in the trench and resulting in inconsistent plant spacing. The adverse agronomic effects of poor seed placement and inconsistent plant spacing are well known in the art.

As such, there is a need for apparatus, systems and methods of effectively delivering seed to the trench while maintaining seed placement accuracy at both low and high implement speeds.

BRIEF DESCRIPTION OF THE DRAWINGS

FIG. 11D is a front elevation view of an embodiment of a seed conveyor in cooperation with an embodiment of a seed disc.

FIG. 11E is a side elevation view of an embodiment of a seed conveyor in cooperation with an embodiment of a seed disc.

FIG. 12C is a cross-sectional view of the seed conveyor of FIG. 12A in communication with an embodiment of a seed disc.

DESCRIPTION

Figure 1:
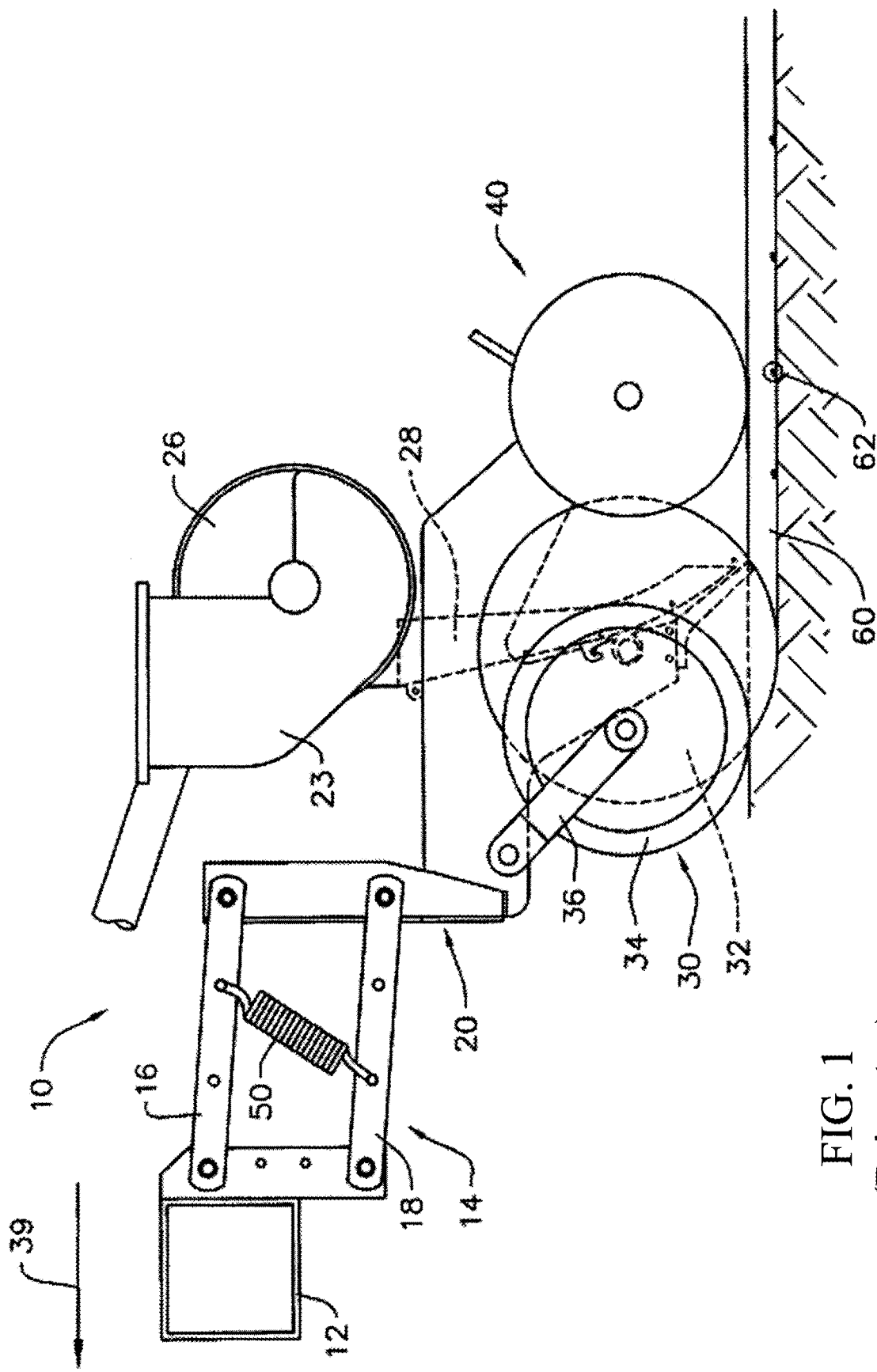
FIG. 1 is a side elevation view of a prior art row unit of an agricultural row crop planter.

Referring now to the drawings, wherein like reference numerals designate identical or corresponding parts throughout the several views, FIG. 1 illustrates a side elevation view of a single row unit 10 of a conventional row crop planter such as the type disclosed in U.S. Pat. No. 7,438,006, the disclosure of which is hereby incorporated herein in its entirety by reference. As is well known in the art, the row units 10 are mounted in spaced relation along the length of a transverse toolbar 12 by a parallel linkage 14, comprised of upper and lower parallel arms 16, 18 pivotally mounted at their forward ends to the transverse toolbar 12 and at their rearward end to the row unit frame 20. The parallel linkage 14 permits each row unit 10 to move vertically independently of the toolbar 12 and the other spaced row units in order to accommodate changes in terrain or rocks or other obstructions encountered by the row unit as the planter is drawn through the field.

The row unit frame 20 operably supports a seed hopper 23 which may be adapted to receive seed from a bulk hopper (not shown), a seed meter 26 and a seed tube 28 as well as a furrow opener assembly 30 and furrow closing assembly 40. The furrow opening assembly 30 comprises a pair of furrow opener discs 32 and a pair of gauge wheels 34. The gauge wheels 34 are pivotally secured to the row unit frame 20 by gauge wheel arms 36. A coil spring 50 is disposed between the parallel arms 16,18 to provide supplemental downforce to ensure that the furrow opener discs 32 fully penetrate the soil to the desired depth as set by a depth adjusting member (not shown) and to provide soil compaction for proper furrow formation. Rather than a coil spring, supplemental downforce may be provided by actuators or other suitable means such as disclosed in U.S. Pat. No. 6,389,999 to Duello, the entire disclosure of which is hereby incorporated herein by reference.

In operation, as the row unit 10 is lowered to the planting position, the opener discs 32 penetrate into the soil. At the same time, the soil forces the gauge wheels 34 to pivot upwardly until the gauge wheel arms 36 abut or come into contact with the stop position previously set with the furrow depth adjusting member (not shown) or until a static load balance is achieved between the vertical load of the row unit and the reaction of the soil. As the planter is drawn forwardly in the direction indicated by arrow 39, the furrow opener discs cut a V-shaped furrow 60 into the soil while the gauge wheels 34 compact the soil to aid in formation of the V-shaped furrow. Individual seeds 62 from the seed hopper 23 are dispensed by the seed meter 26 into an upper opening in the seed tube 28 in uniformly spaced increments. As seeds 62 fall through the seed tube 28, the seeds move downwardly and rearwardly between the furrow opener discs 32 and into the bottom of the V-shaped furrow 60. The furrow 60 is then covered with soil and lightly compacted by the furrow closing assembly 40.

It should be appreciated that because seeds 62 fall freely through the seed tube 28 in the row unit 10 described above, the path of travel of the seeds and the velocity of the seeds at the exit of the seed tube are relatively unconstrained. It would be preferable to constrain the path of travel of seeds 62 in order to reduce errors in spacing between seeds; i.e., placing seeds in the field at non-uniform spacing. Additionally, it would be preferable to control the velocity of seeds 62 such that the seeds have a decreased horizontal velocity relative to the ground upon landing in the furrow 60.

Figure 2A:
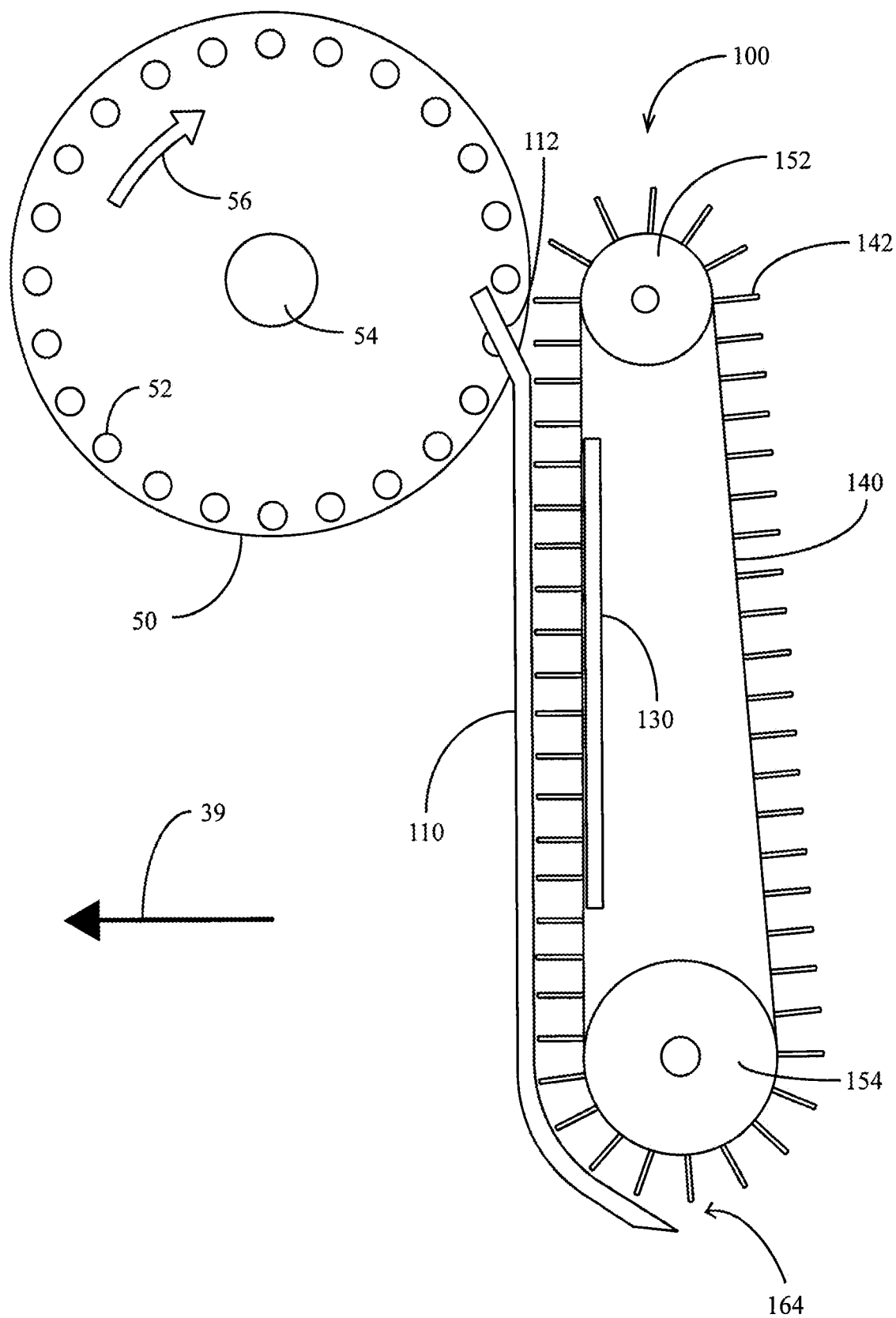
FIG. 2A is a side elevation view of an embodiment of a seed conveyor in cooperation with a seed disc.

A seed conveyor 100 is illustrated in FIG. 2A. The seed conveyor 100 includes a belt 140 stretched around upper and lower pulleys 152,154 and preferably driven by the upper pulley 152; in other embodiments the seed conveyor may be driven by the lower pulley 154. The belt 140 includes flights 142. The seed conveyor 100 additionally includes a guide surface 110 disposed adjacent to the flights 142 on one side of the seed conveyor. The seed conveyor 100 preferably includes a backing plate 130 disposed to maintain the position of belt 140.

Figure 2B:
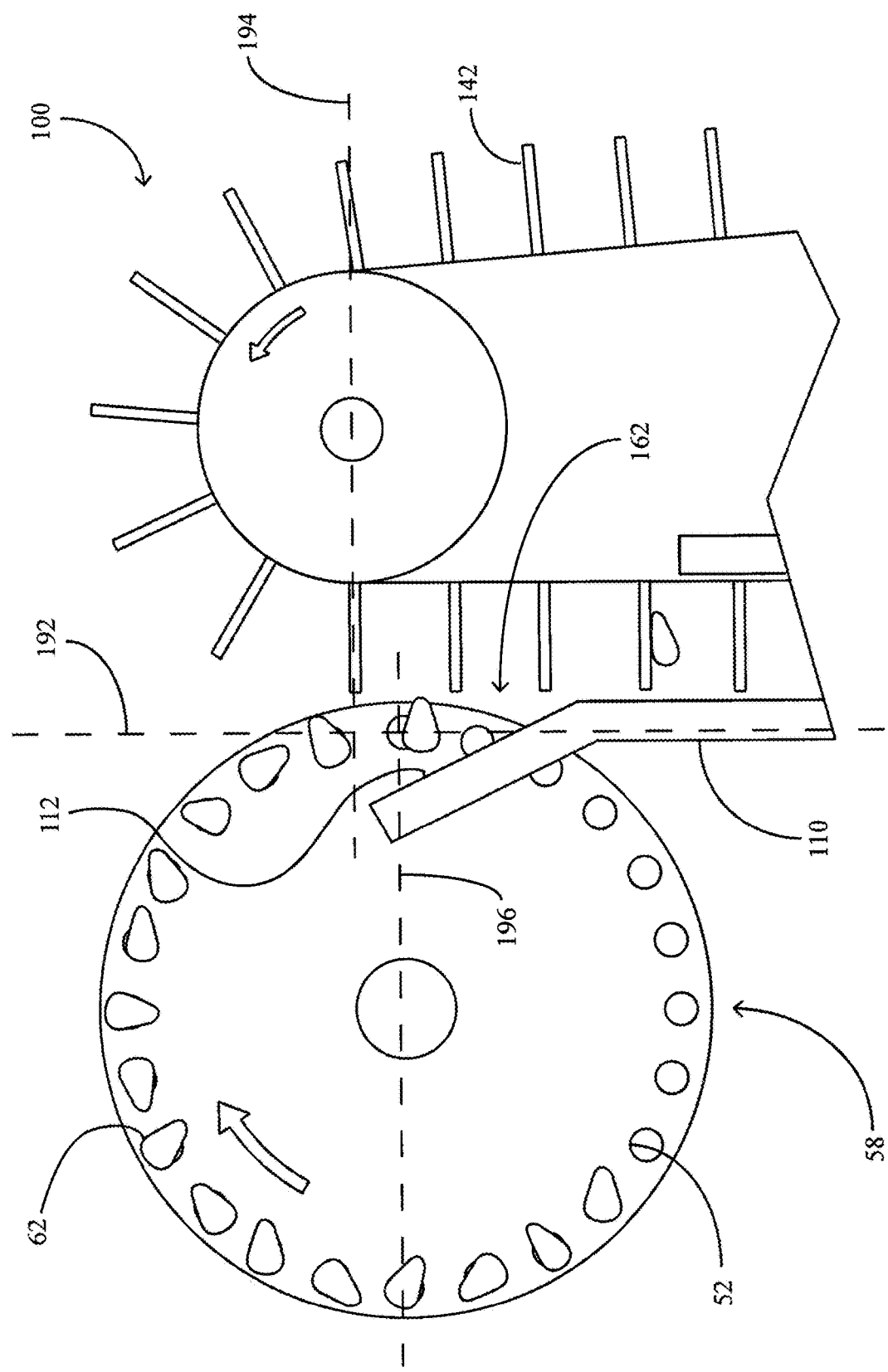
FIG. 2B is a partial side elevation view of an embodiment of a seed conveyor in cooperation with a seed disc.

In operation, the seed conveyor 100 receives seeds 62 from a seed disc 50 and conveys them to an exit 164. The seed disc 50 is preferably housed in a seed meter 26 similar to that illustrated in FIG. 1 and rotates in a direction indicated by arrow 56 about a shaft 54 rotatably mounted in the seed meter. Turning to FIG. 2B, the seed meter 26 is preferably of the vacuum type as is known in the art, such that a vacuum source (not shown) creates a vacuum behind the seed disc 50 (on the perspective of FIG. 2B), thus creating a pressure differential across apertures 52 in the disc. As the apertures 52 rotate past a pool of seeds in the location generally indicated by reference numeral 58, the pressure differential causes individual seeds 62 to become entrained on each aperture 52 such that the seeds are carried by the disc as illustrated. As the apertures cross a boundary such as axis 196, preferably at approximately the 3 o'clock position of the seed disc 50, the vacuum source is substantially cut off (e.g., by termination of a vacuum seal as is known in the art) such that the seeds 62 are released from the disc as they cross axis 196. Seeds 62 preferably fall from the disc in a substantially vertical fashion along an axis 192. Guide surface 110 includes an angled portion 112, along which each seed 62 slides downward and rearward before passing between two flights 142 at a seed inlet generally indicated by reference numeral 162. Each seed 62 is then conveyed downward by seed conveyor 100.

The belt 142 is preferably driven at a speed proportional to the groundspeed St (FIG. 2C) of the row unit 10. For example, in some embodiments the seed conveyor 100 is driven such that the linear speed of belt 142 at the bottom of the lower pulley 154 is approximately equal to the groundspeed St.

Figure 2C:
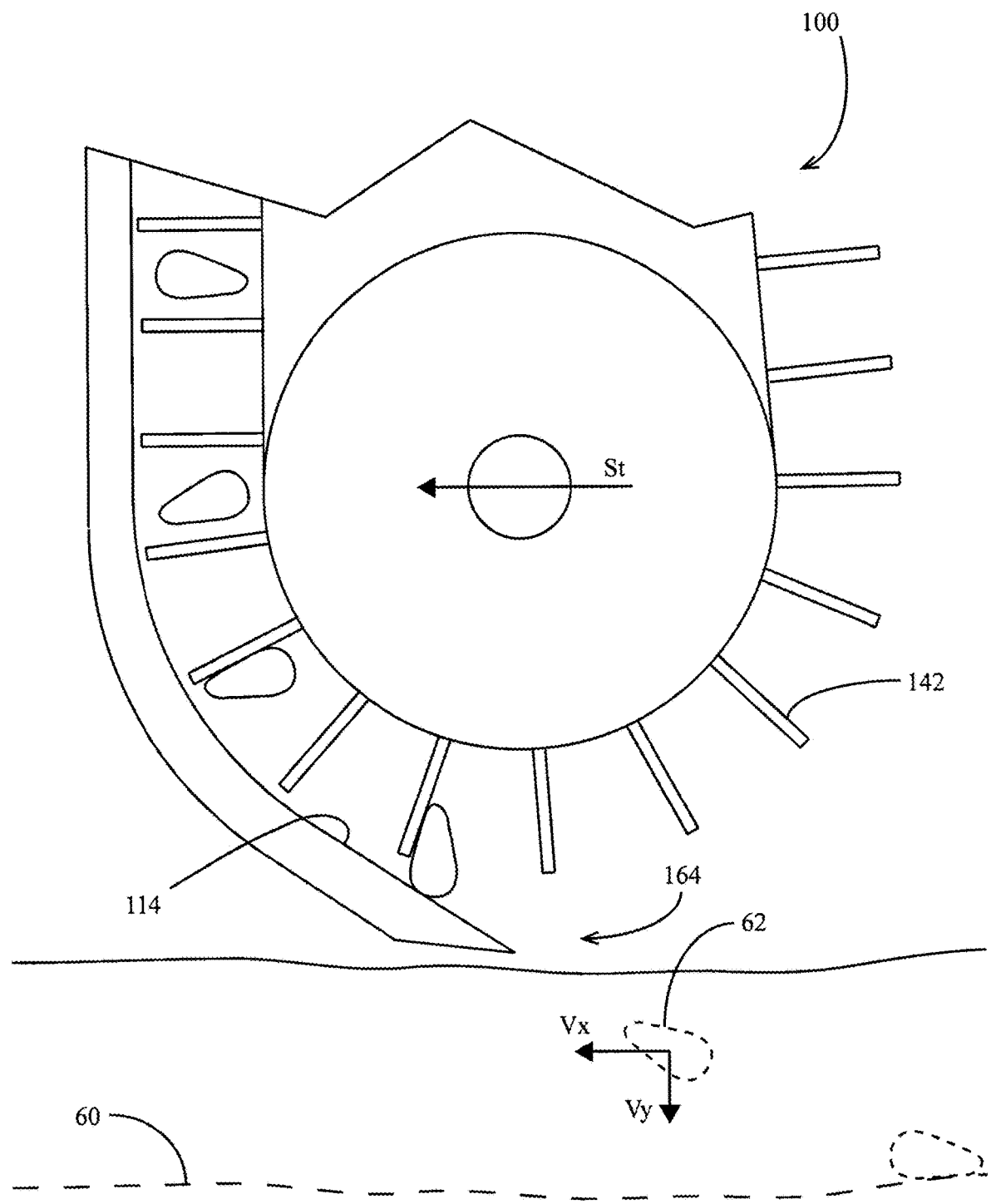
FIG. 2C is a partial side elevation view of an embodiment of a seed conveyor depositing seeds in a seed trench.

As illustrated in FIG. 2B, each seed 62 is initially accelerated downward by the flight 142 above the seed. Turning to FIG. 2C, as each seed 62 moves downward along the seed conveyor 100, it may fall away from the flight 142 above it.

However, as each seed 62 nears the bottom of the seed conveyor, the flights 142 accelerate in order to travel around lower pulley 154 such that the flights 142 contact the seed and impart a rearward horizontal velocity to the seed. Additionally, an angled portion 114 of the guide surface 110 guides the seed rearward, imparting a rearward horizontal velocity to the seed. Thus, as the seed 62 exits the seed conveyor at a seed exit generally indicated by reference numeral 164, the seed has a downward vertical velocity component Vy and a horizontal velocity component Vx, the magnitude of which which is less than the speed of travel St of the row unit 10. It should be appreciated that a smaller horizontal velocity component Vx is preferable because the seed 62 will experience less fore-aft roll as it lands in the furrow 60, leading to more uniform seed placement. The angled portion 114 preferably is disposed 20 degrees below horizontal.

Returning to FIG. 2B, it should be appreciated that flights 142 travel faster as they travel around the upper end of upper pulley 152, e.g., above an axis 194. Additionally, the flights 142 have a substantial horizontal velocity component above axis 194. As a result, attempting to introduce seeds 62 between the flights above axis 194 may result in seeds being knocked away from the belt 140. Thus, the seed inlet 162 at which seeds 62 pass between flights 142 is preferably below the axis 194. This result is preferably accomplished by positioning of the axis 196 at which seeds are released from the disc 50 below the axis 194 and/or by configuring angled portion 112 of guide surface such that seeds 62 slide below axis 194 before entering the inlet 162.

Figure 11A:
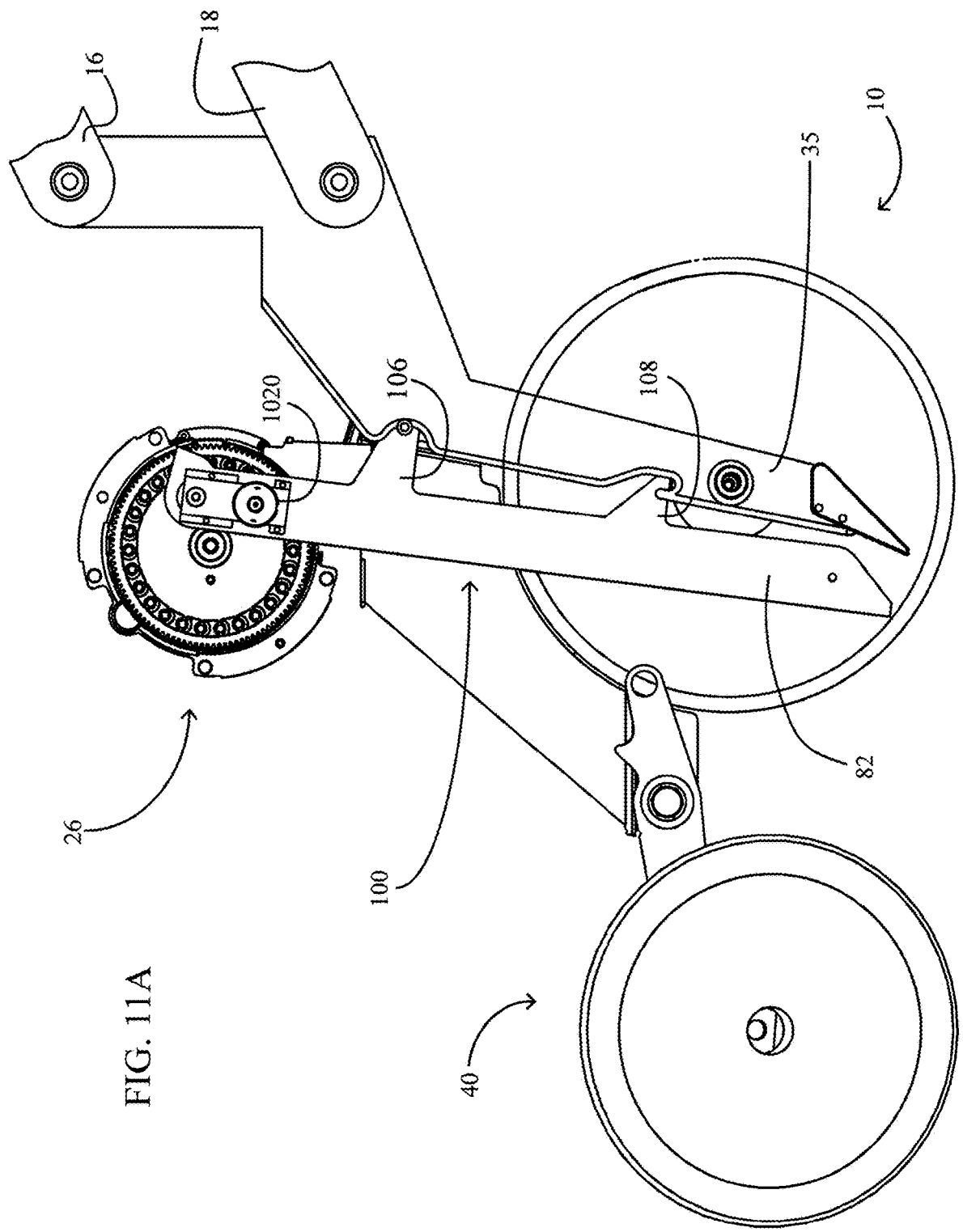
FIG. 11A is a side elevation view of an embodiment of a planter row unit in cooperation with an embodiment of a seed conveyor.
Figure 11B:
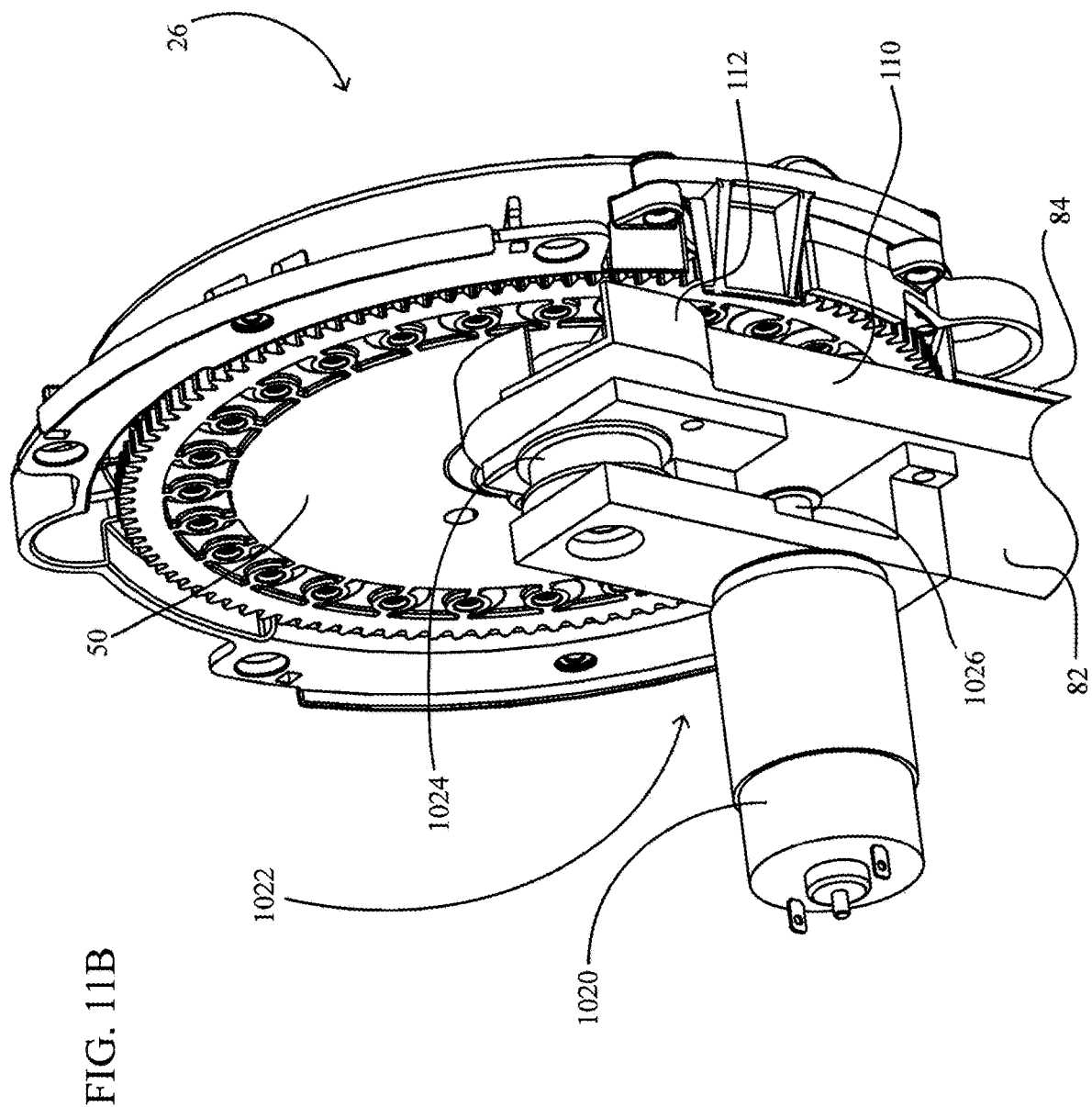
FIG. 11B is a perspective view of a seed conveyor in cooperation with an embodiment of a seed meter.
Figure 11C:
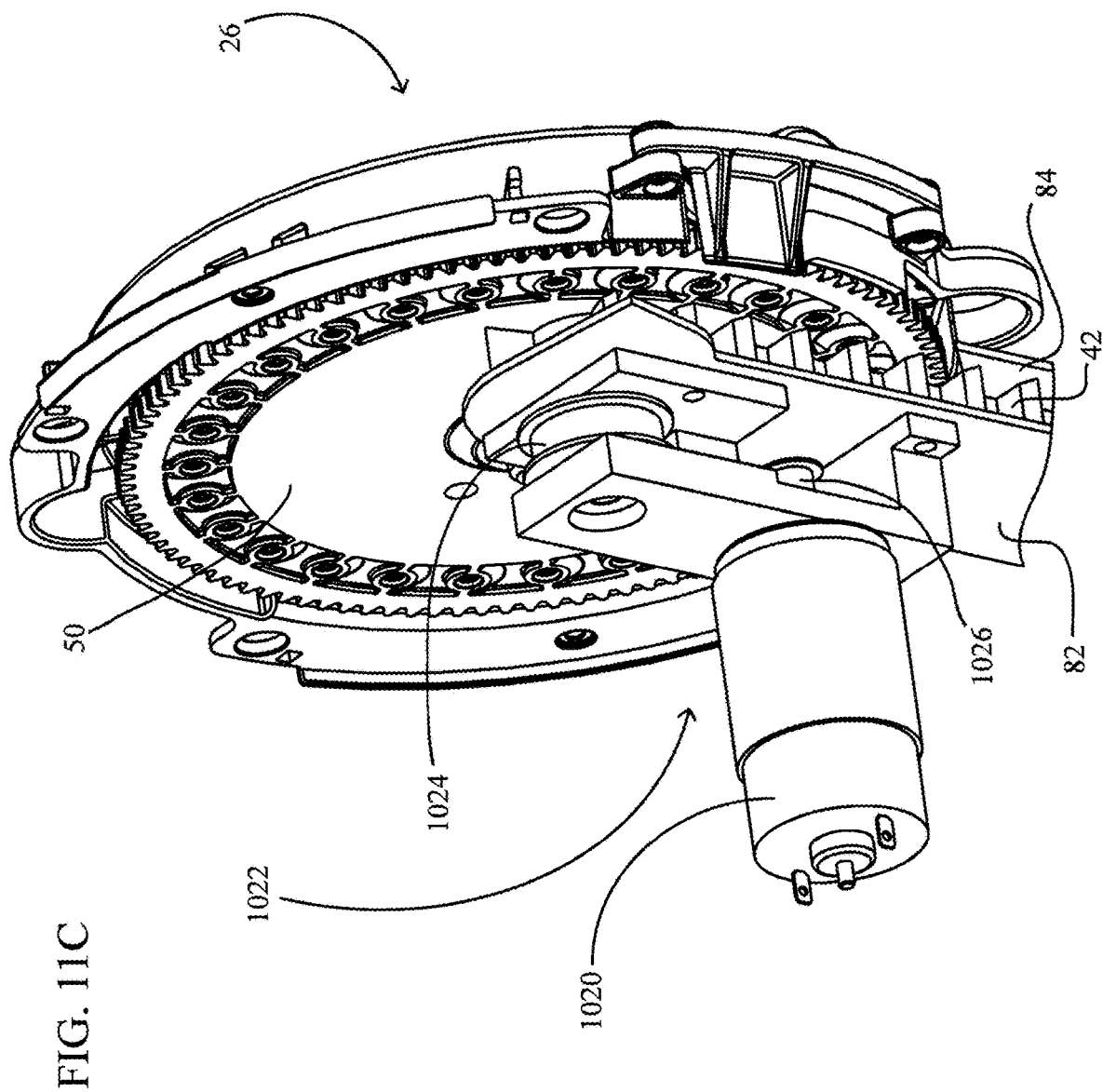
FIG. 11C is a perspective view of a seed conveyor in cooperation with an embodiment of a seed meter.

Turning to the embodiment of FIGS. 11A-11E, a seed conveyor 100 is illustrated in cooperation with a row unit 10. The row unit 10 includes a shank portion 35. Referring to FIG. 11A, the seed conveyor 100 is mounted to the shank portion 35 by attachment ears 106,108. Turning to FIG. 11B, the seed conveyor 100 includes sidewalls 82,84. A conveyor motor assembly 1022 is mounted to the sidewall 82. The conveyor motor assembly includes a conveyor motor 1020. The conveyor motor drives an output shaft 1026. The output shaft 1026 preferably drives the input shaft 1024; in some embodiments the output shaft is coupled to an input shaft by a drive belt (not shown), while in other embodiments the output shaft and input shaft may be operably coupled by one or more gears. The input shaft 1024 is operably coupled to the upper pulley 152 of the seed conveyor 100. Turning to FIG. 11C, the seed conveyor is shown with guide surface 110 removed for clarity, revealing the flights 142. Turning to FIG. 11D, the seed conveyor 100 is preferably disposed transversely adjacent the seed disc 50. Turning to FIG. 11E, the seed conveyor 100 is disposed to receive seeds 62 released from the seed disc 50 onto the angled portion 112 of the seed guide 110 (FIG. 11B). In operation, seeds 62 are released from the surface of the seed disc 50 at approximately the three o'clock position. Seeds 62 slide along the angled portion 112 of the seed guide 110 between the flights 142 of the belt 140.

Figure 2D:
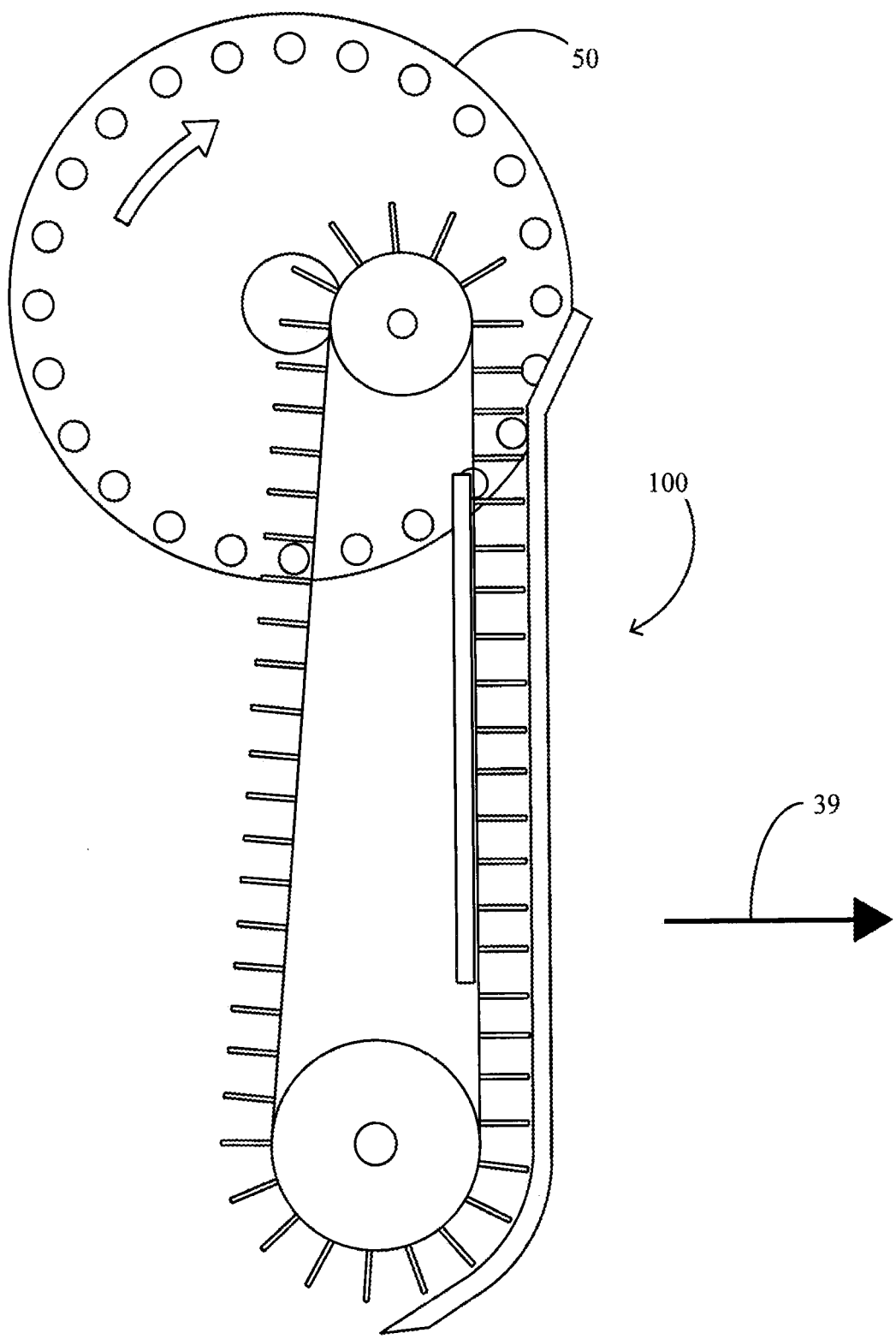
FIG. 2D is a side elevation view of an embodiment of a seed conveyor in cooperation with a seed disc.

As illustrated FIG. 2D, the orientation of the seed conveyor 100 with respect to the seed meter 50 may be varied. In the embodiment of FIG. 2D, the orientation of the seed conveyor 100 has been reversed from that illustrated in FIG. 2A, reducing the space claim of the combination. In such alternative embodiments, seeds are preferably discharged from the seed conveyor 100 in a direction opposite to the direction of travel 39. Additionally, the seed conveyor 100 is preferably positioned to receive seeds from the seed meter 50.

Figure 2E:
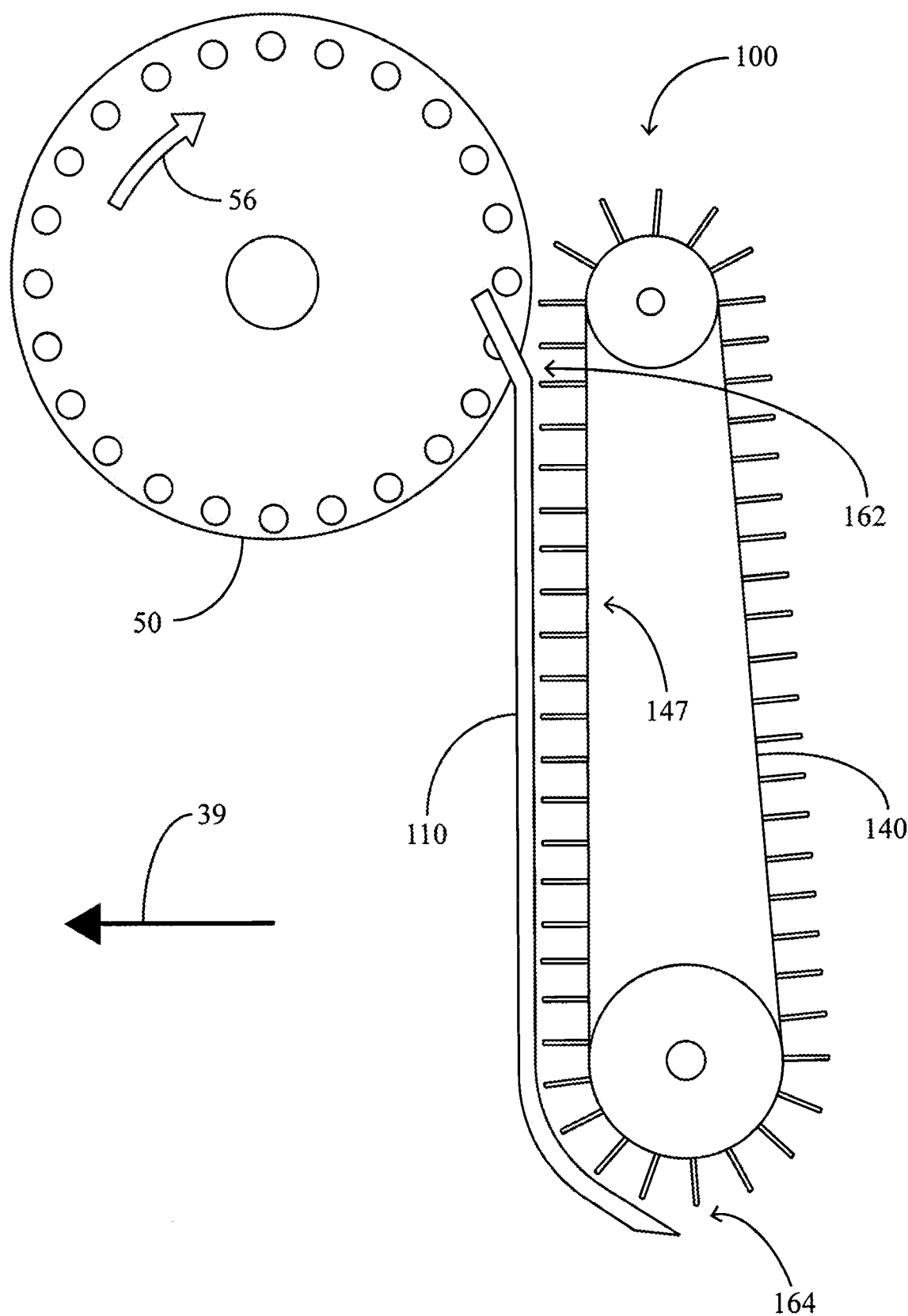
FIG. 2E is a side elevation view of an embodiment of a seed conveyor in cooperation with a seed disc.

In the embodiment of FIG. 2E, the seed conveyor includes an unconstrained belt region 147. The unconstrained belt region 147 is preferably located adjacent the seed guide 110. The unconstrained belt region 147 is preferably located between the seed inlet 162 and the seed exit 164. As the belt 140 travels through the unconstrained belt region 147, the belt is free to undergo small fore-aft deflections (to the right and left on the perspective of FIG. 2E). It should be appreciated that in the embodiment of FIG. 2E, the backing plate is preferably omitted or located at a predetermined aft (rightward on the perspective of FIG. 2E) distance from the seed guide 110 to allow the belt 140 to undergo fore-aft deflections.

Figure 3:
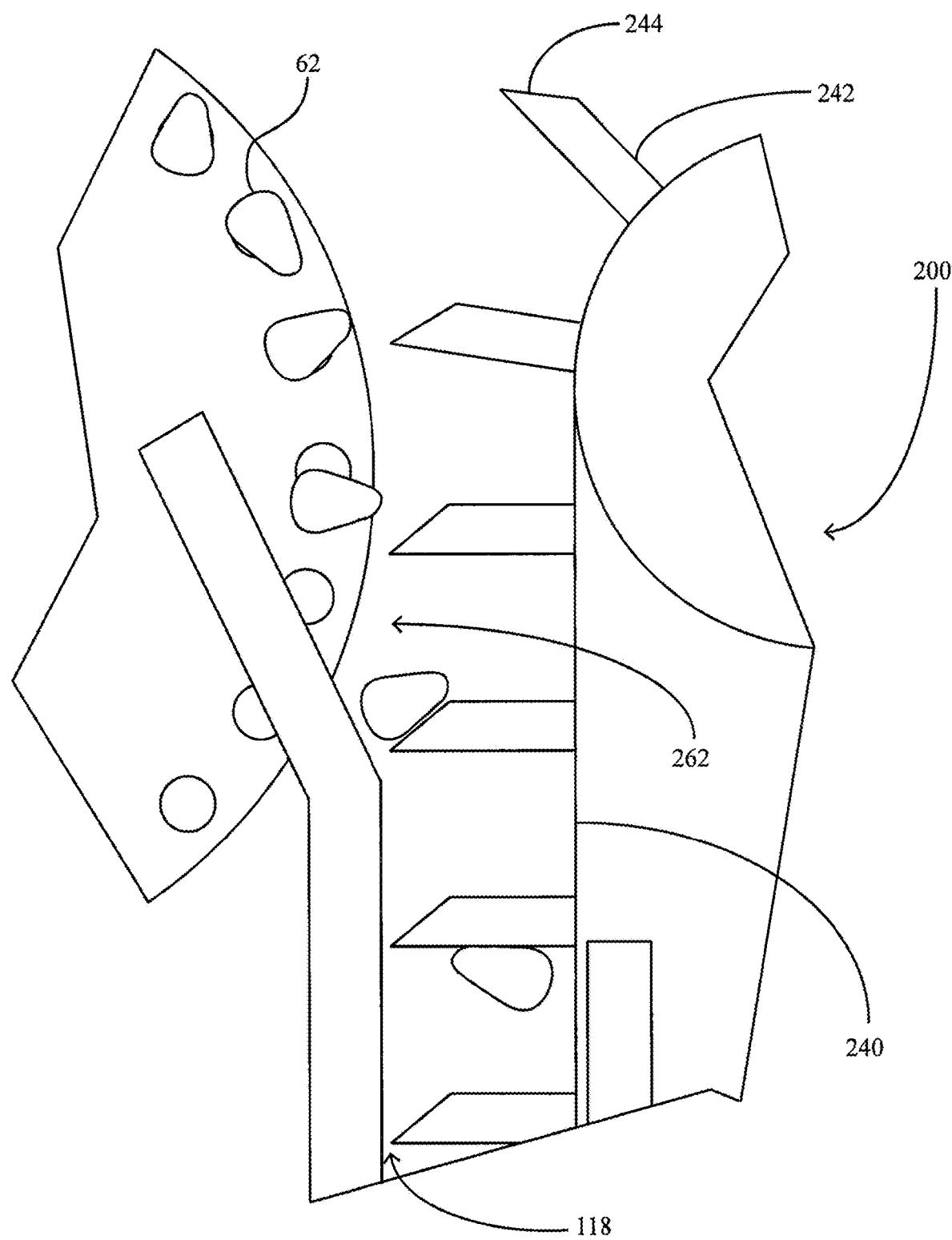
FIG. 3 is a partial side elevation view of an embodiment of a seed conveyor in cooperation with a seed disc.

In an alternative embodiment illustrated in FIG. 3, a modified seed conveyor 200 includes a belt 240 having modified flights 242 having bevels 244. As the belt 240 moves past a seed inlet 262, seeds 62 are more easily introduced between the flights 242 because a larger vertical gap exists between flights at the seed inlet due to the bevels 244. Similar to the embodiment of FIGS. 2A-2C, a gap 118 between the guide surface and the belt is preferably of a predetermined size large enough to allow consistent clearance between the guide surface and the belt, but small enough to prevent seeds 62 from escaping from between flights.

Figure 4A:
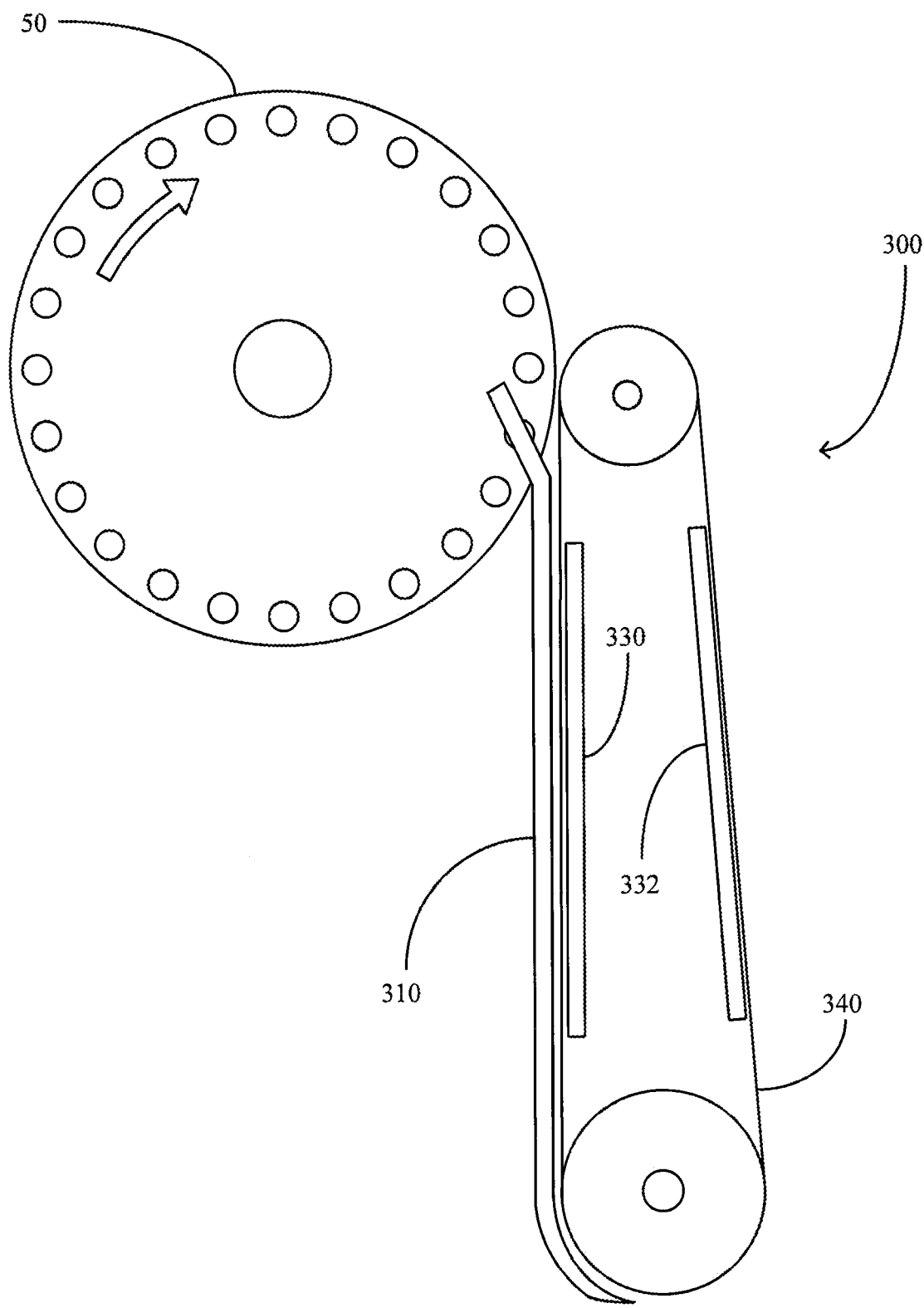
FIG. 4A is a side elevation view of an embodiment of a seed conveyor in cooperation with a seed disc.
Figure 4B:
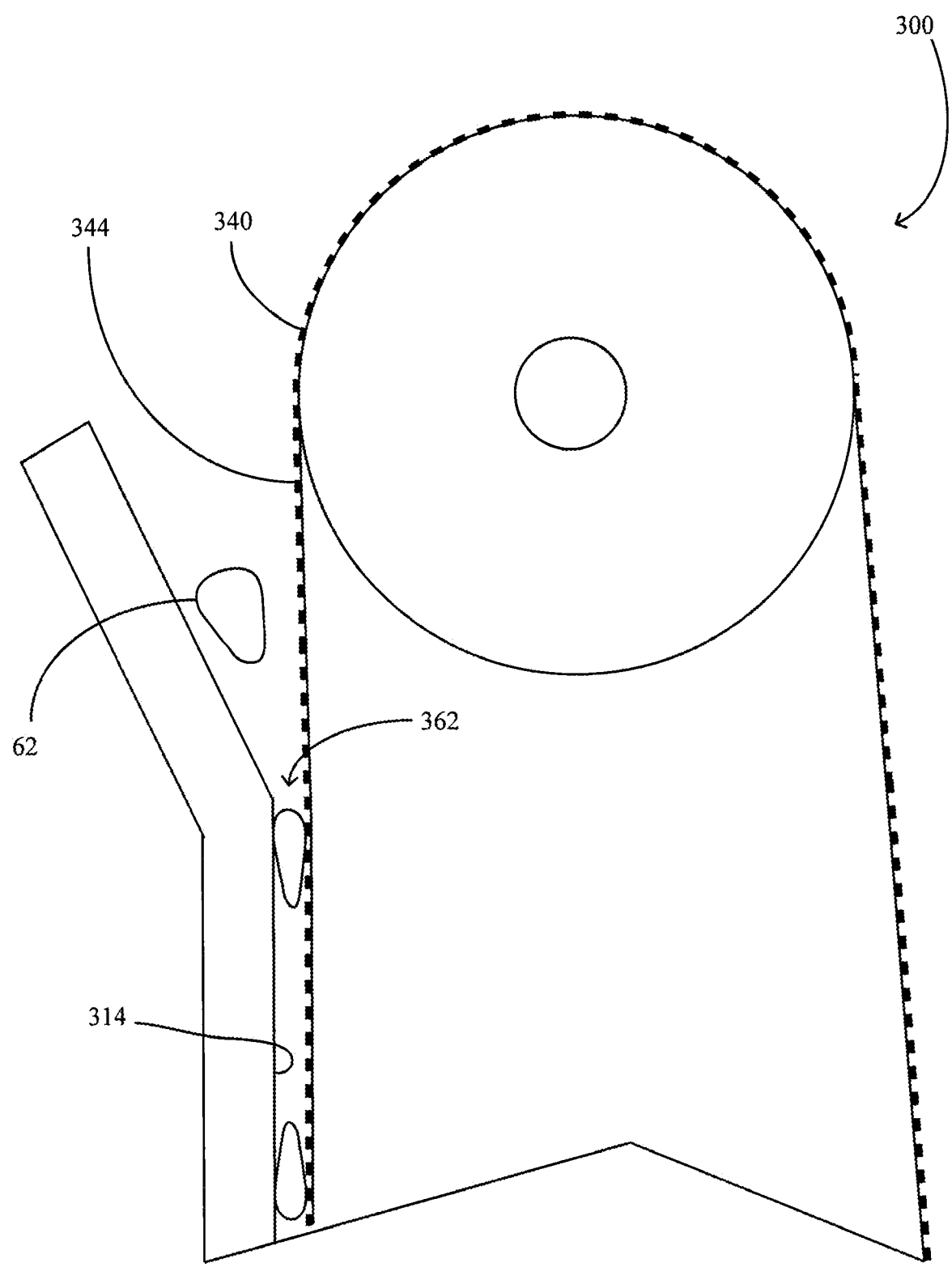
FIG. 4B is a partial side elevation view of an embodiment of a seed conveyor in cooperation with a seed disc.

In an alternative embodiment illustrated in FIG. 4A-4B, a modified seed conveyor 300 includes a modified belt 340 without flights. Referring to FIG. 4A, the belt 340 is disposed adjacent a modified guide surface 310. Backing plates 330,332 preferably retain the desired position of the belt 340. Turning to FIG. 4B, the belt 340 preferably includes roughness elements 344 such that the outer surface of the belt has a relatively high effective coefficient of friction. Guide surface 310 includes an inner face 314 which is smooth (i.e., has a relatively low coefficient of friction) and is preferably substantially free from burrs, warping, and other surface imperfections. Thus, as seeds 62 are released from the seed disc 50 and into a modified seed inlet generally indicated by reference numeral 362, the seeds are drawn between the belt 340 and the guide surface and held static with respect to the belt while sliding downward along the guide surface 314.

Figure 4C:
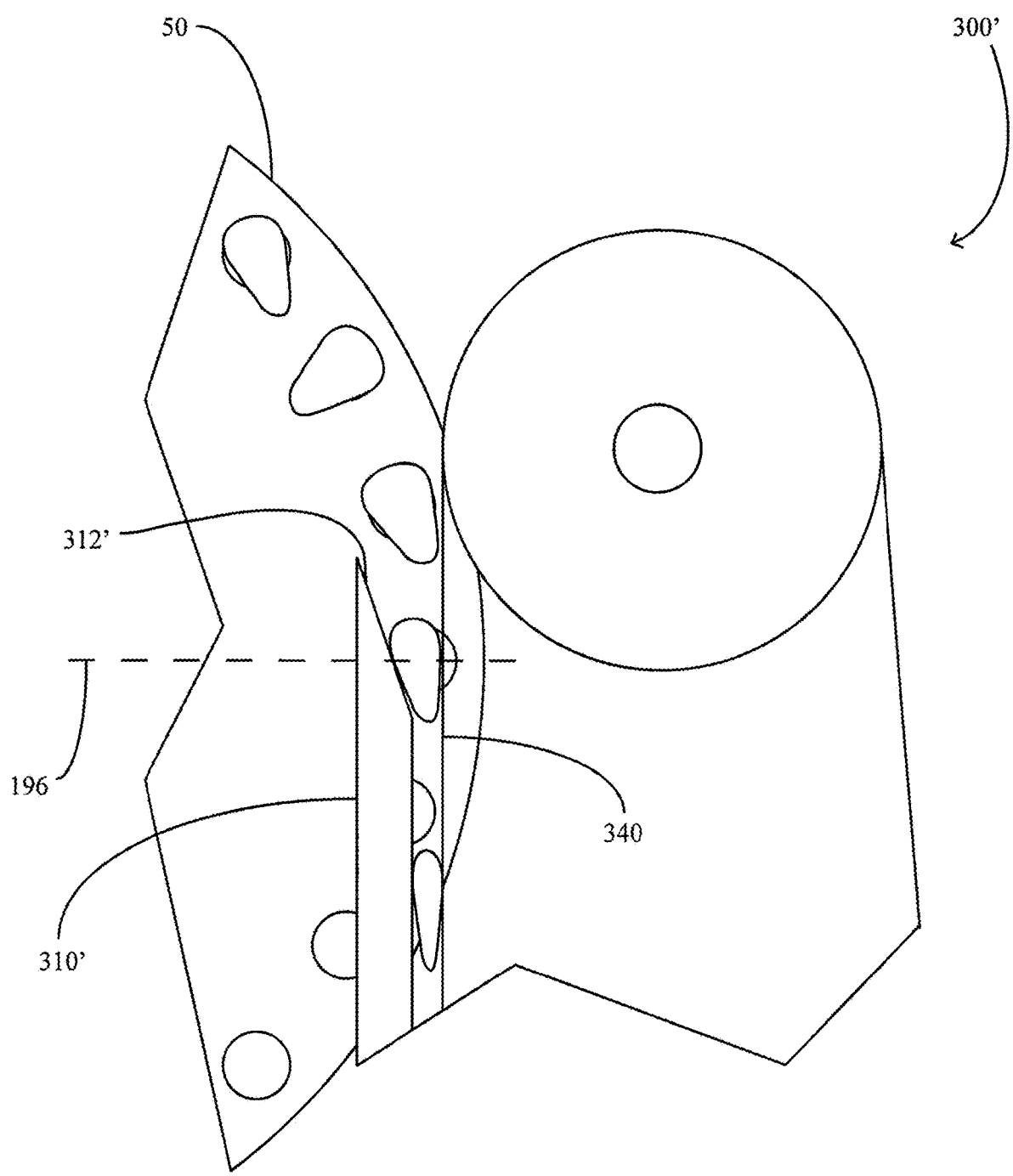
FIG. 4C is a partial side elevation view of an embodiment of a seed conveyor in cooperation with a seed disc.

In some embodiments, the seed conveyor 300 of FIGS. 4A-4B is modified as illustrated in FIG. 4C. The modified seed conveyor 300' includes a modified guide surface 310' having an angled portion 312'. In a preferred embodiment, the conveyor 300' is disposed with respect to the seed disc 50 such that angled portion 312' is adjacent to the axis 196 at which seeds 62 are released from the disc 50 (by vacuum cut-off as discussed elsewhere herein). Thus as each seed 62 is released from the disc 50, the seed is pulled between the angled portion 312' and the belt 340. The belt 340 then continues to draw the seed 62 downward against a smooth interior face of the guide surface 310' and discharged as in the embodiment of FIGS. 4A-4B. Thus the guide surface 310' cooperates with the belt 340 to pull seeds 62 from the disc 50 at approximately the same time that each seed is released from the disc. In alternative embodiments, the angled surface 312' is disposed just above the axis 196 such that the guide surface and belt begin to pull each seed from the disc just before the seed is released from the disc. In other embodiments, the angled surface 312' may be disposed just below the axis 196 such that the guide surface and belt catch each seed just after the seed is released from the disc. In still other embodiments, the seed conveyor 300' may be located farther frontward or rearward (to the right or left as viewed in FIG. 4C) such that seeds 62 are pushed from the apertures 52 by contact with either the belt 340 or with the angled surface 312'.

Seed Sensing

As described further herein, the seed conveyor embodiments described above are preferably provided with seed sensors for detecting the time at which each seed 62 passes known locations.

Figure 5A:
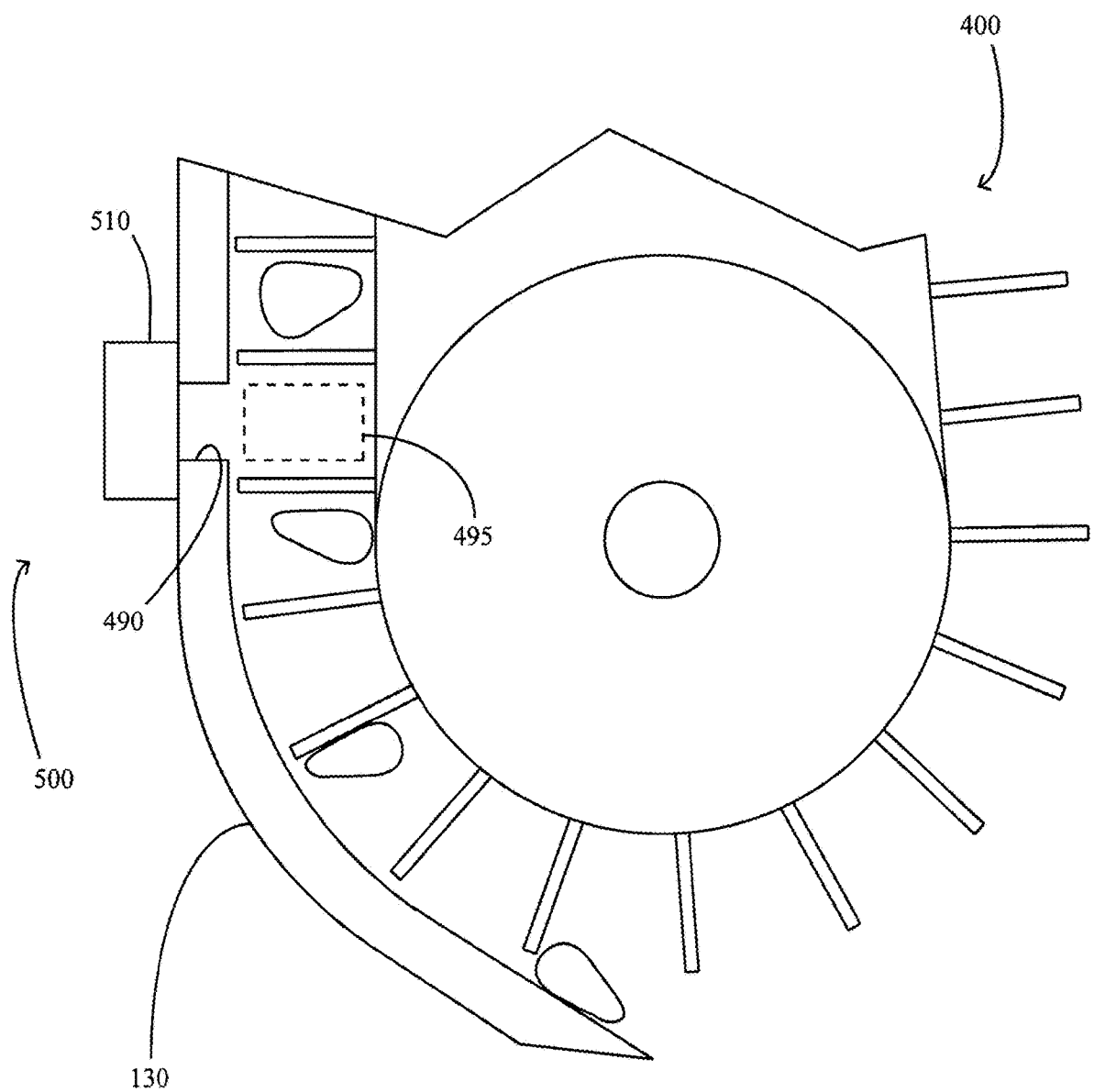
FIG. 5A is a partial side elevation view of an embodiment of a seed conveyor in cooperation with an embodiment of a seed sensor.

Turning to FIG. 5A, a bottom portion of a seed conveyor 400 similar to the seed conveyor 100 of FIG. 2 is illustrated. The seed conveyor 400 includes a guide surface 130 having an opening 490. A seed sensor 500 is mounted to guide surface 130. The seed sensor 500 may include an optical sensor 510 disposed to detect light passing through a sensing region 495 between the flights. It should be appreciated that the height of measuring region 495 is less than or equal to the height of opening 490. The height of measuring region 495 is preferably greater than the height of the flights and less than the gap between the flights. The optical sensor 510 may additionally include a light source such as an LED for providing light waves to be reflected by the belt for detection by the sensor. Alternatively, a separate light source (not shown) may be disposed behind the belt (to the right in the perspective of FIG. 5A) so as to transmit light through apertures (not shown) in the belt toward sensor 510. In any case, the sensor 500 generates a signal which changes due to the presence of a seed 62 in measuring region 495.

Figure 5B:
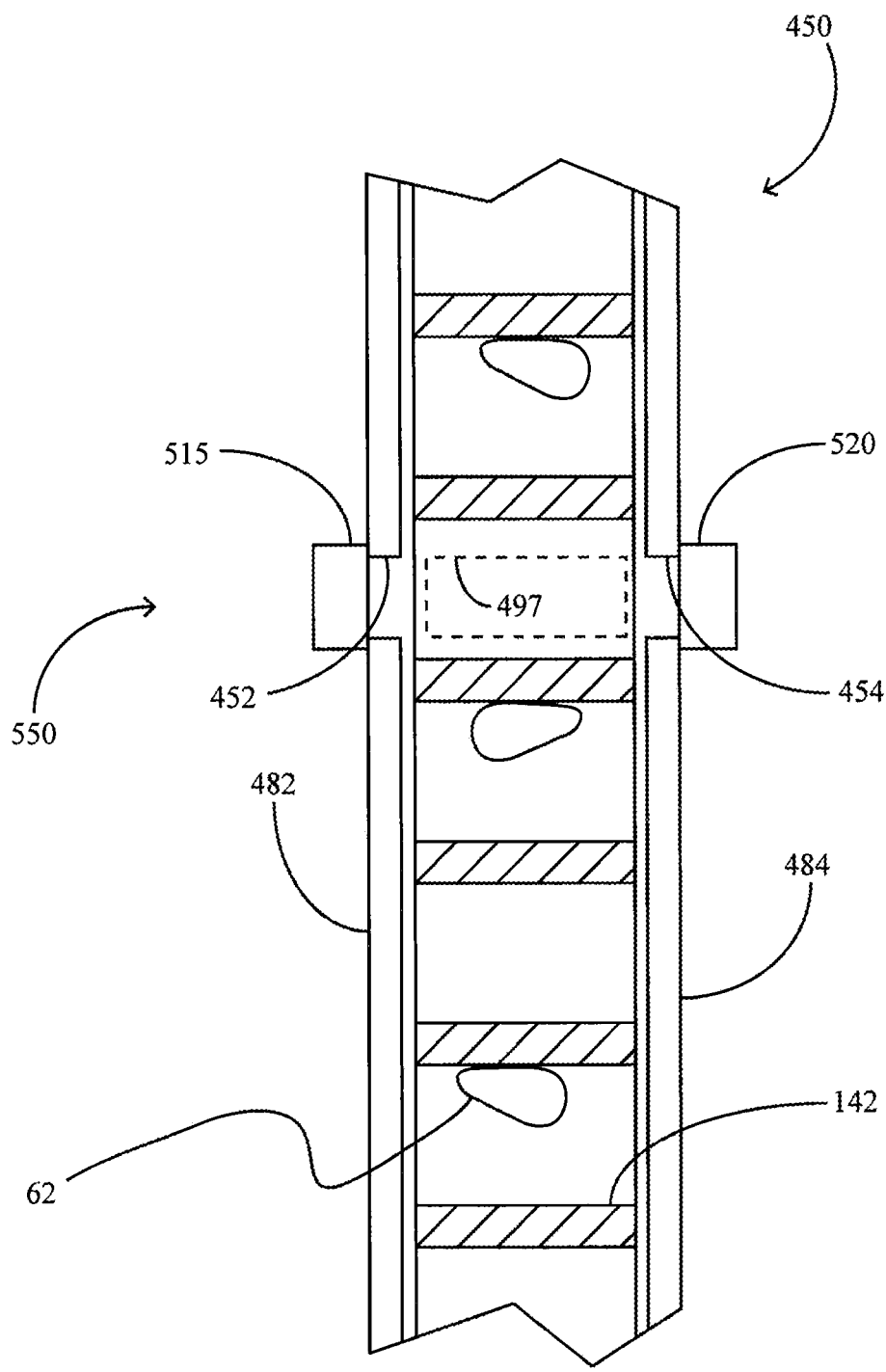
FIG. 5B is a partial front elevation view of an embodiment of a seed conveyor in cooperation with an embodiment of a seed sensor.

Turning to FIG. 5B, a central portion of a seed conveyor 450 similar to the seed conveyor 400 is viewed from the front (from the left in the perspective of FIG. 5A), with the guide surface not shown for clarity. The seed conveyor 450 includes sidewalls 482,484 that cooperate with the guide surface to enclose the belt and flights 142. Sidewalls 482, 484 include openings 452,454 respectively, which openings are preferably aligned along a horizontal axis. A seed sensor 550 includes a transmitter 520 mounted to sidewall 484 and a receiver 515 mounted to sidewall 482. In some embodiments, the seed sensor 550 is an optical sensor. The transmitter 520 is disposed to transmit light through aperture 454, through a sensing region 497, and through aperture 452. The receiver 515 is disposed to detect light transmitted through the sensing region 497 and aperture 452. The height of sensing region 497 is preferably equal to the height of apertures 452,454. The height of sensing region 497 is preferably greater than the height of flights 142 and less than the vertical spacing between the flights. The depth (on the perspective of FIG. 5B) of sensing region 497 is preferably the same as the depth of flights 142. The sensor 550 generates a signal which changes due to the presence of a seed 62 in measuring region 497.

Figure 5C:
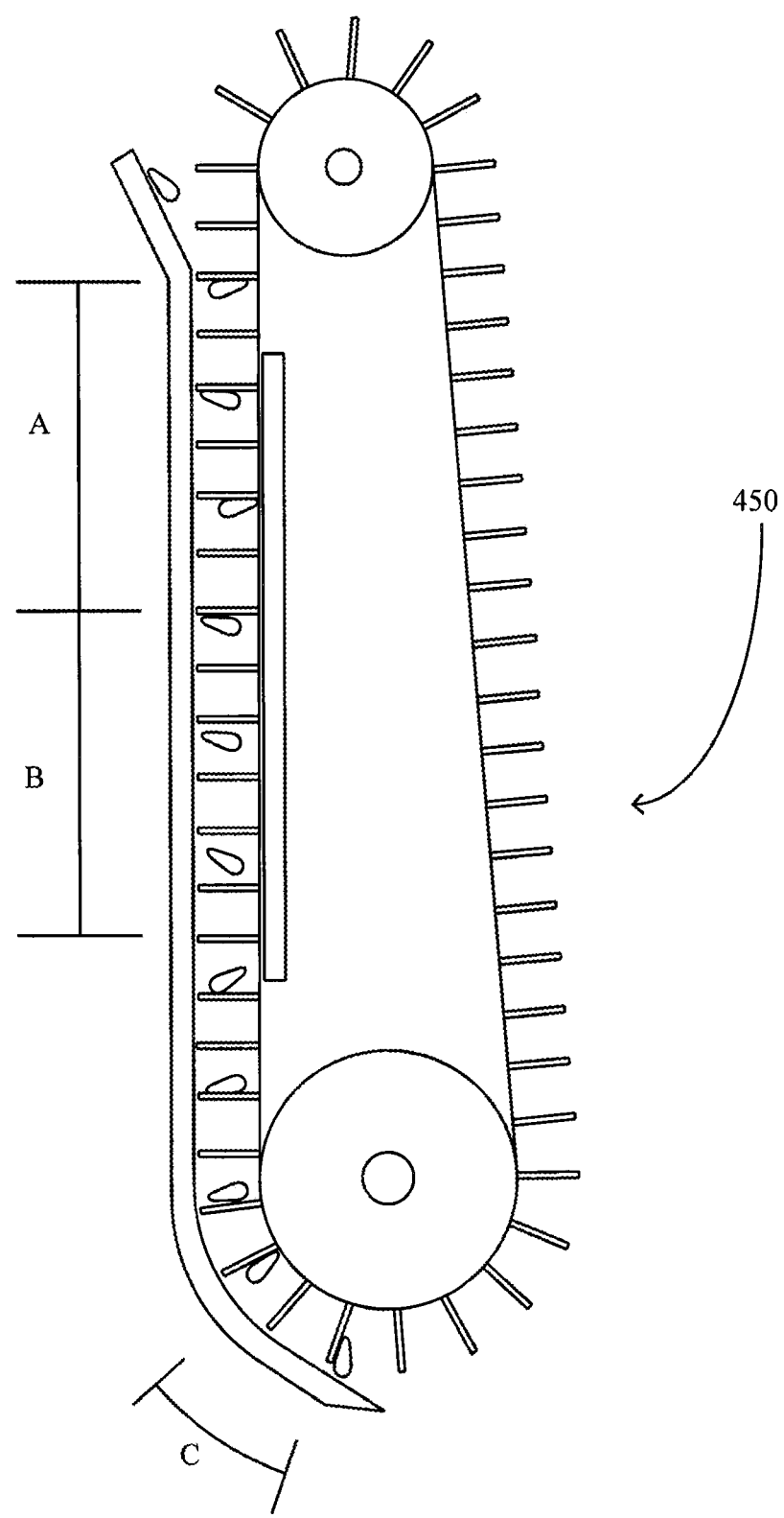
FIG. 5C is a side elevation view of an embodiment of a seed conveyor.

Turning to FIG. 5C, it should be appreciated in light of this disclosure that in either of the seed conveyor embodiments 400,450, the vertical location of the seed sensors 500,550 may be selected in order to select the location of each seed 62 relative to the flights 142 at the point where the seed is detected.

In order to detect seeds while the seeds are positively constrained against a flight 142, the seed sensor are preferably placed along an upper portion of the belt in a zone A (FIG. 5C). In zone A, each seed 62 is in contact with the flight above the seed until the seed is accelerated by gravity to a speed in excess of the belt speed. To achieve a similar result, in other embodiments, the seed sensor is placed in a zone C, in which the flights have accelerated and again push the seeds along the seed path.

Alternatively, in order to detect the seed when it is separated from the flights 142, the sensor is preferably located in a zone B. In zone B, the seed has been accelerated by gravity to a speed faster than the belt speed and separated from the flight above it, but has not yet contacted the flight below.

Figure 5D:
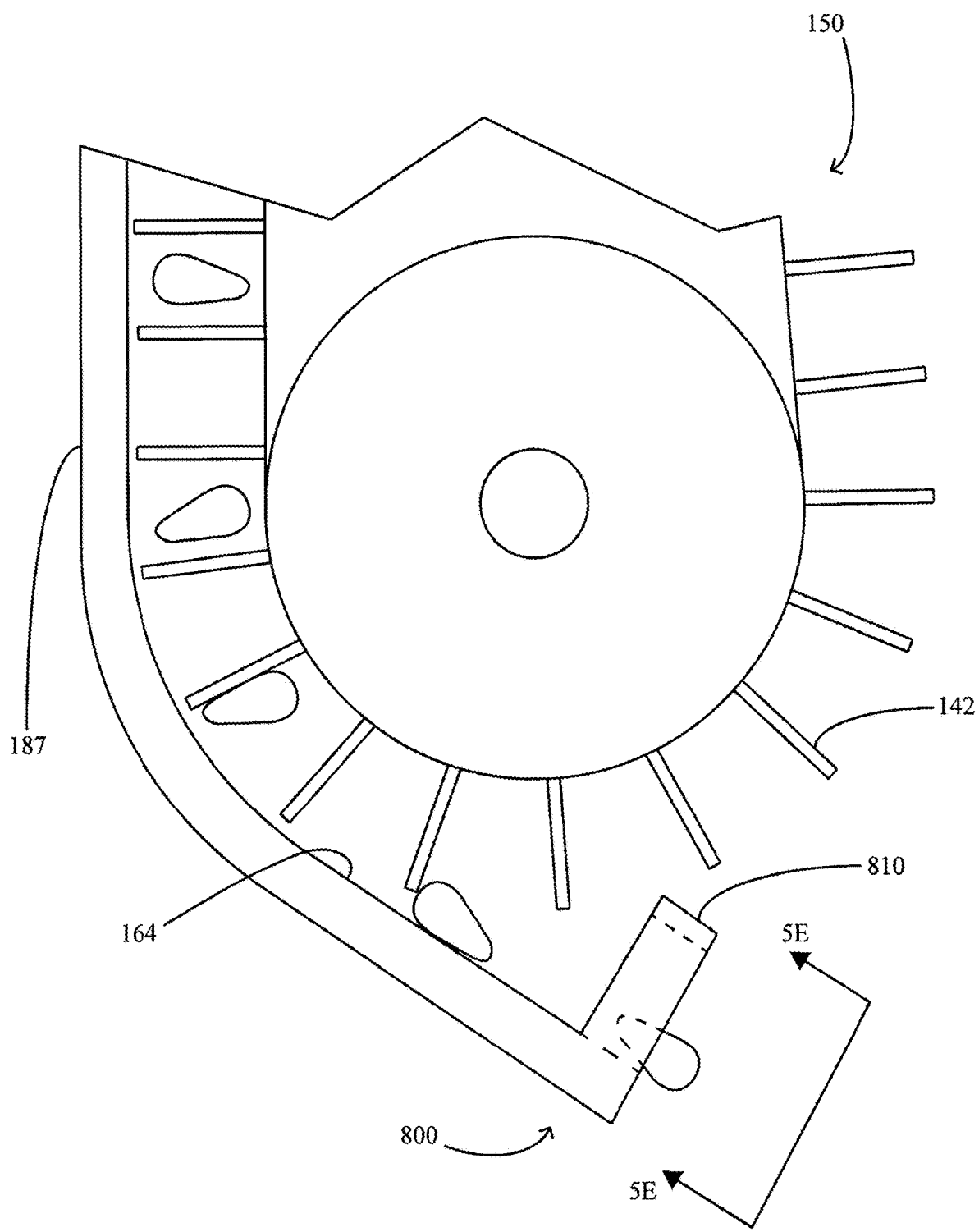
FIG. 5D is a partial side elevation view of an embodiment of a seed conveyor in cooperation with an embodiment of a seed sensor.
Figure 5E:
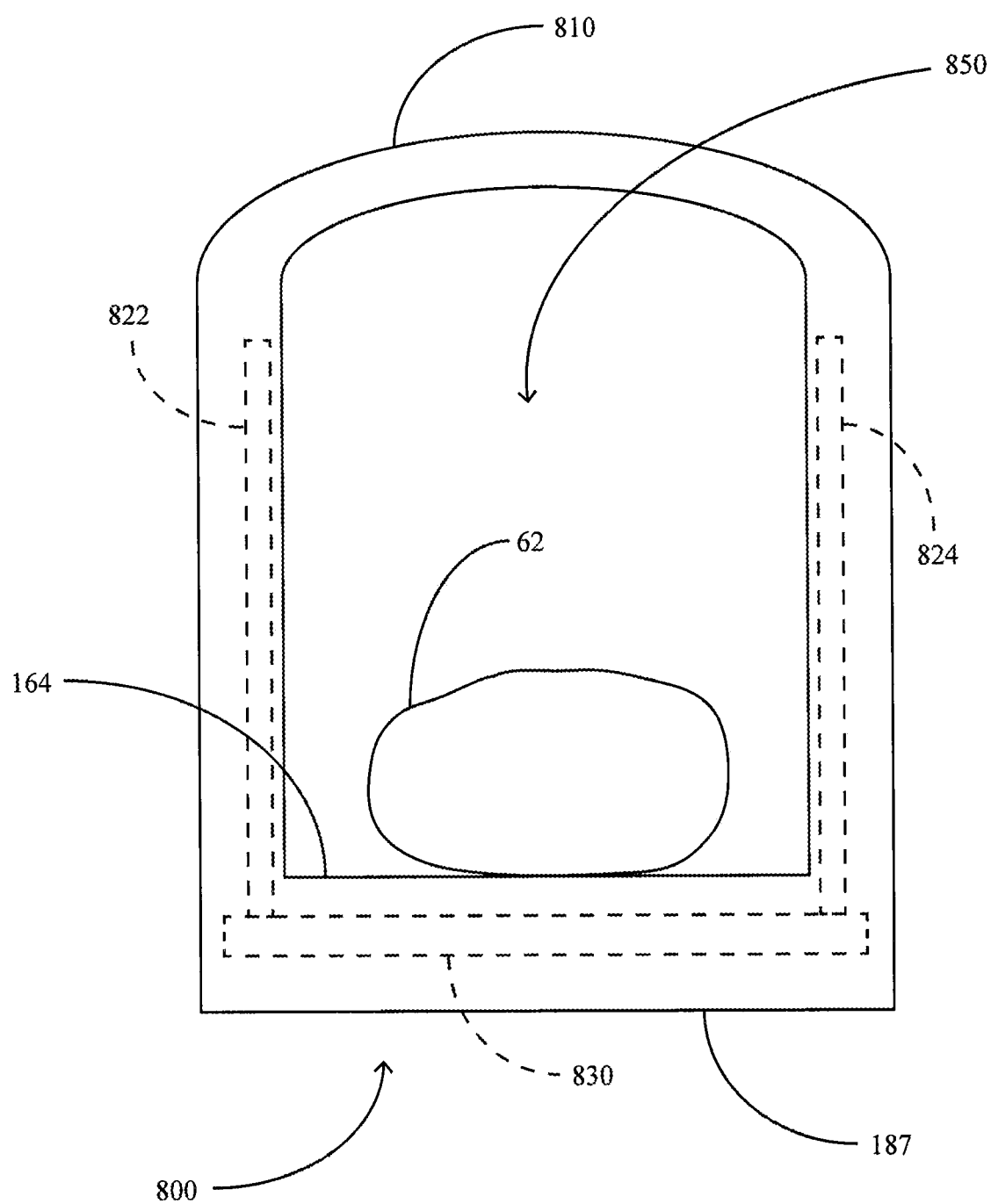
FIG. 5E is a view of an embodiment of a seed sensor in cooperation with an embodiment of a seed conveyor along section 5E-5E of FIG. 5D.

In other embodiments, the seed conveyor may incorporate an electromagnetic seed sensor. In one such embodiment, referring to FIG. 5D, a seed conveyor 150 includes a seed guide 187 incorporating an electromagnetic seed sensor 800. In such embodiments, seeds 62 slide along an inner face 164 of the seed guide 187, passing through a sensor arc 810 before exiting the seed conveyor 150. Turning to FIG. 5E, which illustrates the electromagnetic seed sensor 800 along the section 5E-5E of FIG. 5D, the sensor arc 810 houses an electromagnetic energy transmitter 822 and a receiver 824. A circuit board 830 and associated circuitry is housed in the seed guide 187. The circuit board 830 is in electrical communication with the transmitter and receiver 822,824. The transmitter 822 generates electromagnetic energy which crosses a sensing region 850 within the sensor arc 810. The detector 824 generates a signal related to a characteristic of the electromagnetic energy received from the transmitter 822. As each seed 62 passes through the sensing region 850, a characteristic of the electromagnetic energy transmitted to the detector 824 is modified such that the signal generated by the detector is likewise modified. The seed sensor 800 may be substantially similar to any of the electromagnetic seed sensors disclosed in Applicant's U.S. patent application Ser. No. 12/984,263, the disclosure of which is hereby incorporated herein in its entirety by reference.

Figure 5F:
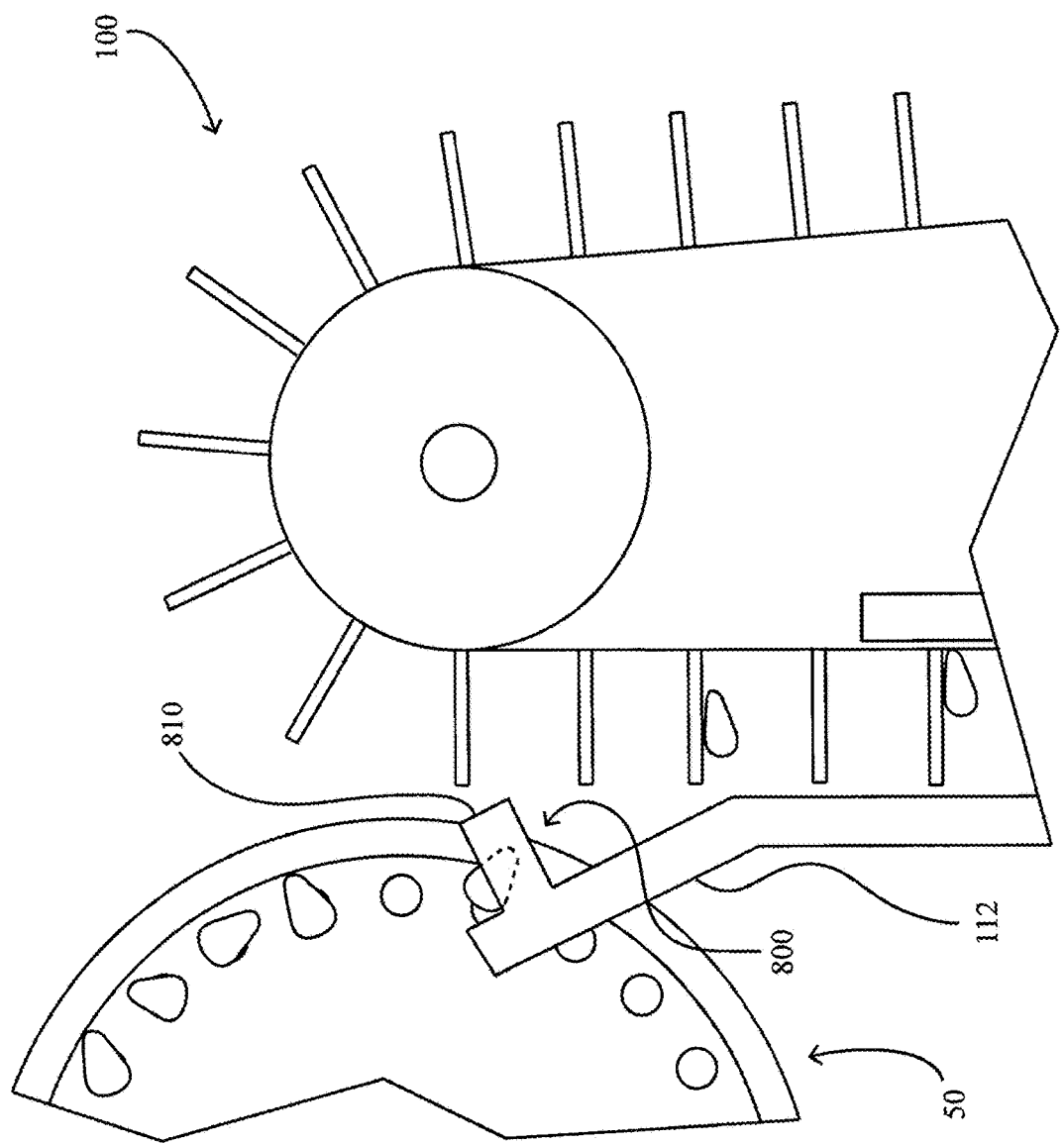
FIG. 5F is a partial side elevation view of an embodiment of a seed conveyor in cooperation with an embodiment of a seed sensor and a seed disc.

In other embodiments, turning to FIG. 5F, a similar electromagnetic seed sensor 800 is mounted to the angled portion 112 of the seed conveyor 100. In such embodiments, seeds 62 pass through the sensor arc 810 after being released from the seed meter 50 and before entering between flights 142 of the seed conveyor. It should be appreciated that in various embodiments, the sensor arc 810 may be positioned such that seeds 62 pass through the sensor arc either before or after contacting the angled portion 112. In other embodiments, an optical sensor may be disposed to sense the passage of seeds in the same location as the sensor arc 810 of FIG. 5F.

Figure 6A:
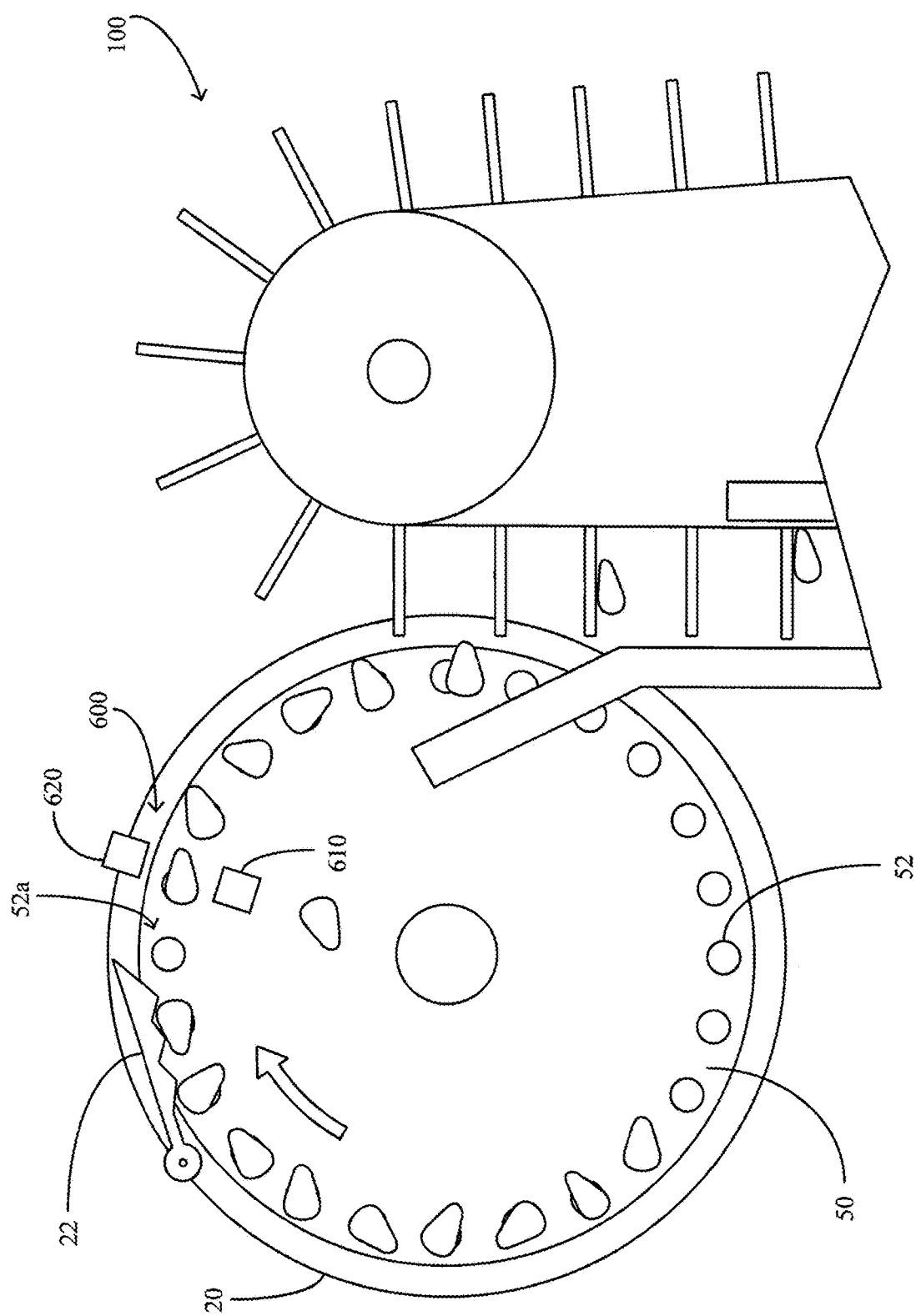
FIG. 6A is a partial side elevation view of a seed disc in cooperation with an embodiment of a seed sensor in cooperation with an embodiment of a seed disc and an embodiment of a seed conveyor.

Turning to FIG. 6A, an additional seed sensor 600 may be used to detect the presence of seeds 62 on the disk 50. The seed sensor 600 is preferably disposed to detect passing seeds 62 on the surface of the disc. The seed sensor 600 may comprise an optical transmitter 610 configured to emit light to an optical receiver 620, which is preferably configured to produce a signal related to the amount of light received from transmitter 610. The transmitter and receiver 610,620 are preferably mounted to a seed meter housing 20 of the seed meter 26 enclosing the seed disc 50. As illustrated in FIG. 6A, the transmitter and receiver 610,620 are preferably disposed below and above the seed path, respectively, such that passing seeds cause a light interruption and modify the signal produced by the receiver 620. Thus when a seed is not present on an aperture 52 (e.g., aperture 52a), the receiver 620 produces a modified signal. It should be appreciated in light of this disclosure that where a seed stripper or singulator 22 is incorporated in the seed meter 26 in order to remove excess seeds from apertures 52, such devices may occasionally "strip" an aperture such that no seed is carried to the seed conveyor 100. Thus the seed sensor 600 is preferably disposed downstream along the seed path with respect to the singulator 22.

Figure 6B:
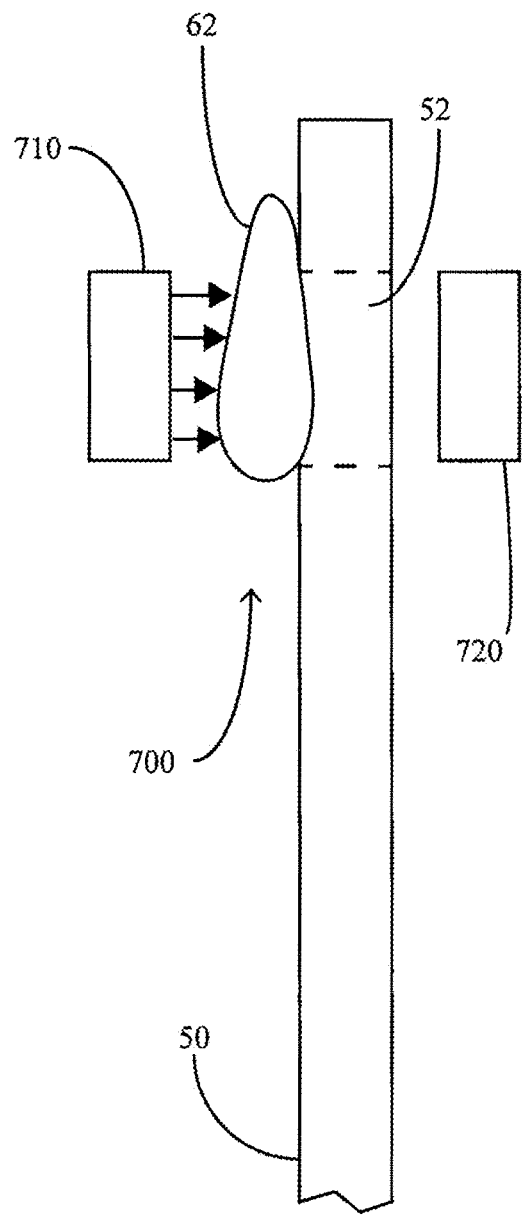
FIG. 6B is a partial front elevation view of an embodiment of a seed disc in cooperation with an embodiment of a seed sensor.
Figure 6C:
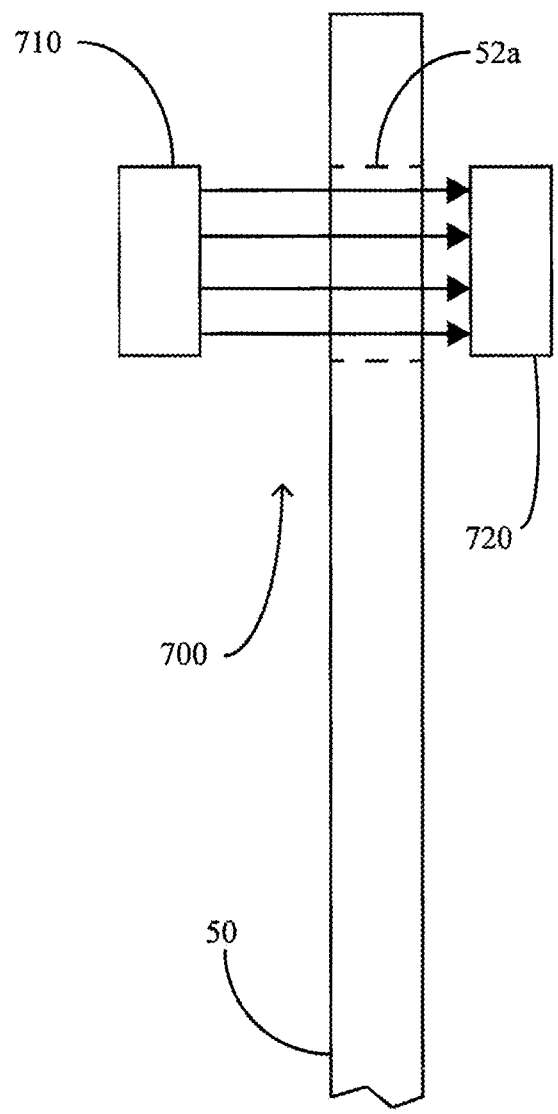
FIG. 6C is a partial front elevation view of an embodiment of a seed disc in cooperation with an embodiment of a seed sensor.

In other embodiments, as illustrated in FIGS. 6B and 6C, a transverse seed sensor 700 preferably comprises a transmitter 710 and receiver 720 disposed to transmit and receive light across the apertures 52 in a transverse direction, such that light from transmitter 710 is transmitted to the receiver 720 if no seed is present on the aperture (e.g., aperture 52a). In such an embodiment, the receiver 720 receives light and emits a modified signal when a "skip" (i.e., a failure to load or retain at least one seed on the disk) occurs.

Figure 7A:
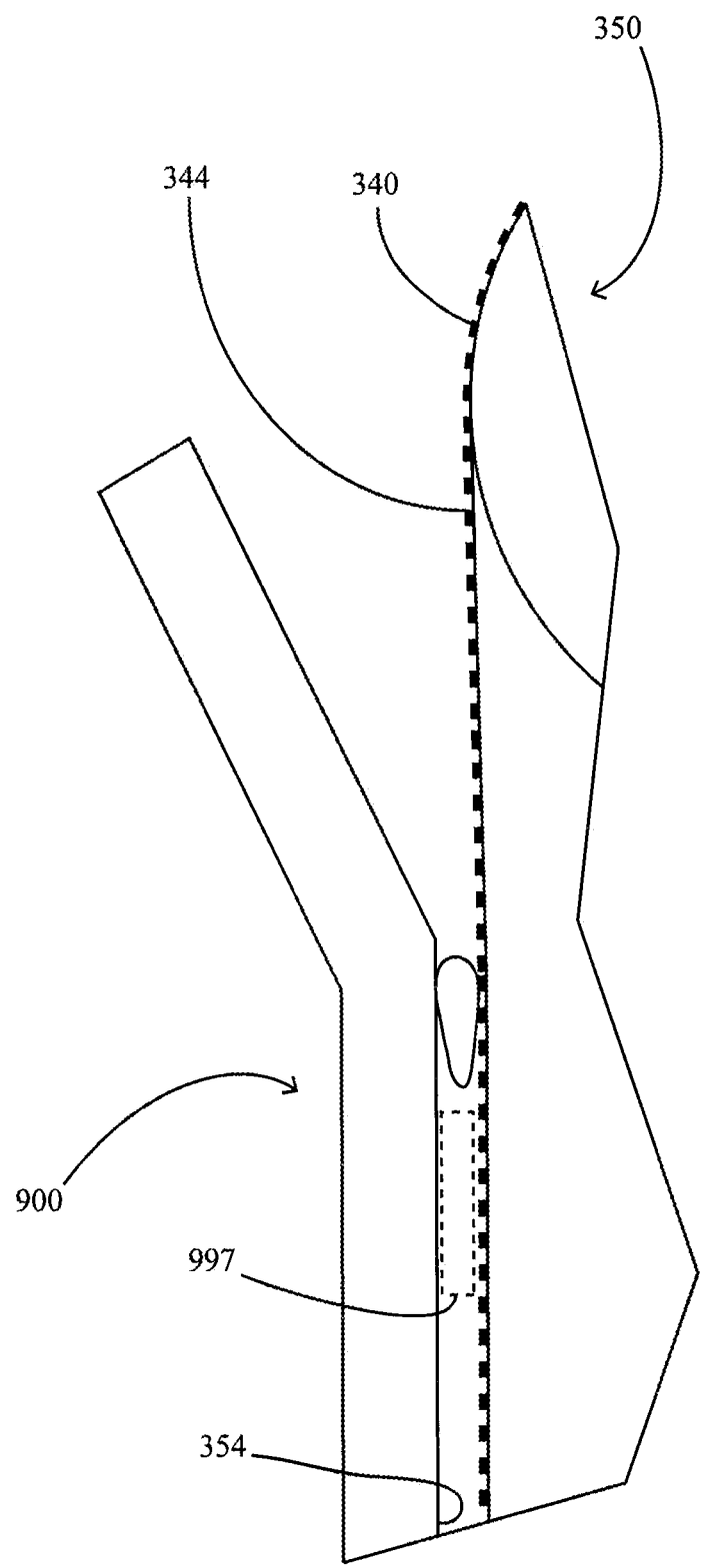
FIG. 7A is a partial side elevation view of an embodiment of a seed conveyor in cooperation with an embodiment of a seed sensor.
Figure 7B:
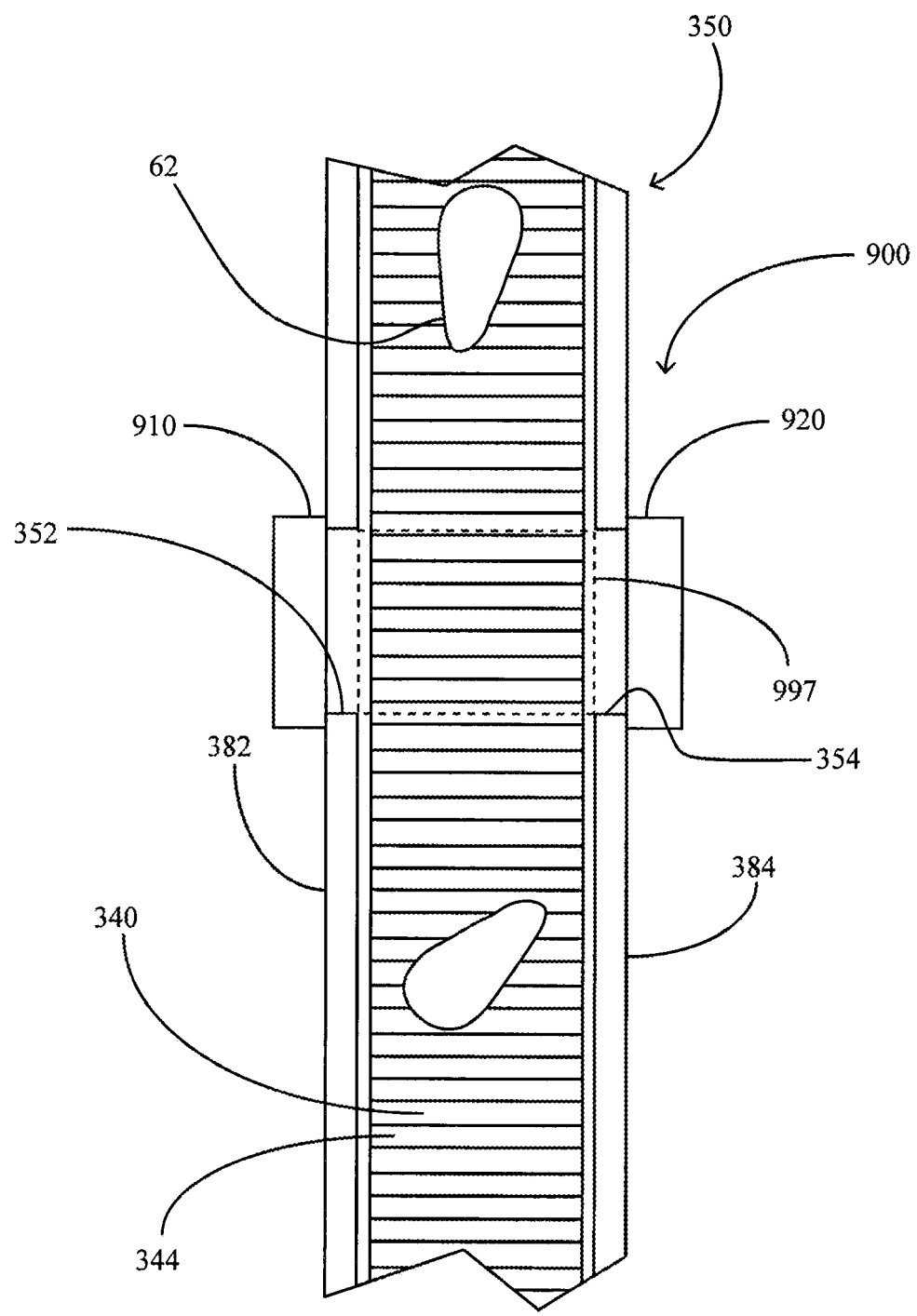
FIG. 7B is a partial front elevation view of an embodiment of a seed sensor in cooperation with an embodiment of a seed conveyor.

A transverse seed sensor may also be incorporated in the seed conveyor 300 of FIGS. 4A-4B. Referring to FIG. 7A, a seed sensor 900 is incorporated into a modified seed conveyor 350. The seed sensor 900 is transversely disposed to detect the passage of seeds through a sensing region 997 between the belt 340 and an inner face 354 of the seed conveyor 350. Turning to FIG. 7B, the seed conveyor 350 includes spaced-apart transverse sidewalls 382,384. The sidewalls 382,384 include apertures 352,354, respectively. A transmitter 910 is mounted to sidewall 382. Transmitter 910 is configured to transmit light (or other electromagnetic energy) through the aperture 352, through the sensing region 997, and through the aperture 354. A receiver 920 is mounted to sidewall 384. Receiver 920 is configured to generate a signal which changes due to the presence of a seed in measuring region 997.

Loading Wheel Seed Conveyor Embodiments

Figure 12A:
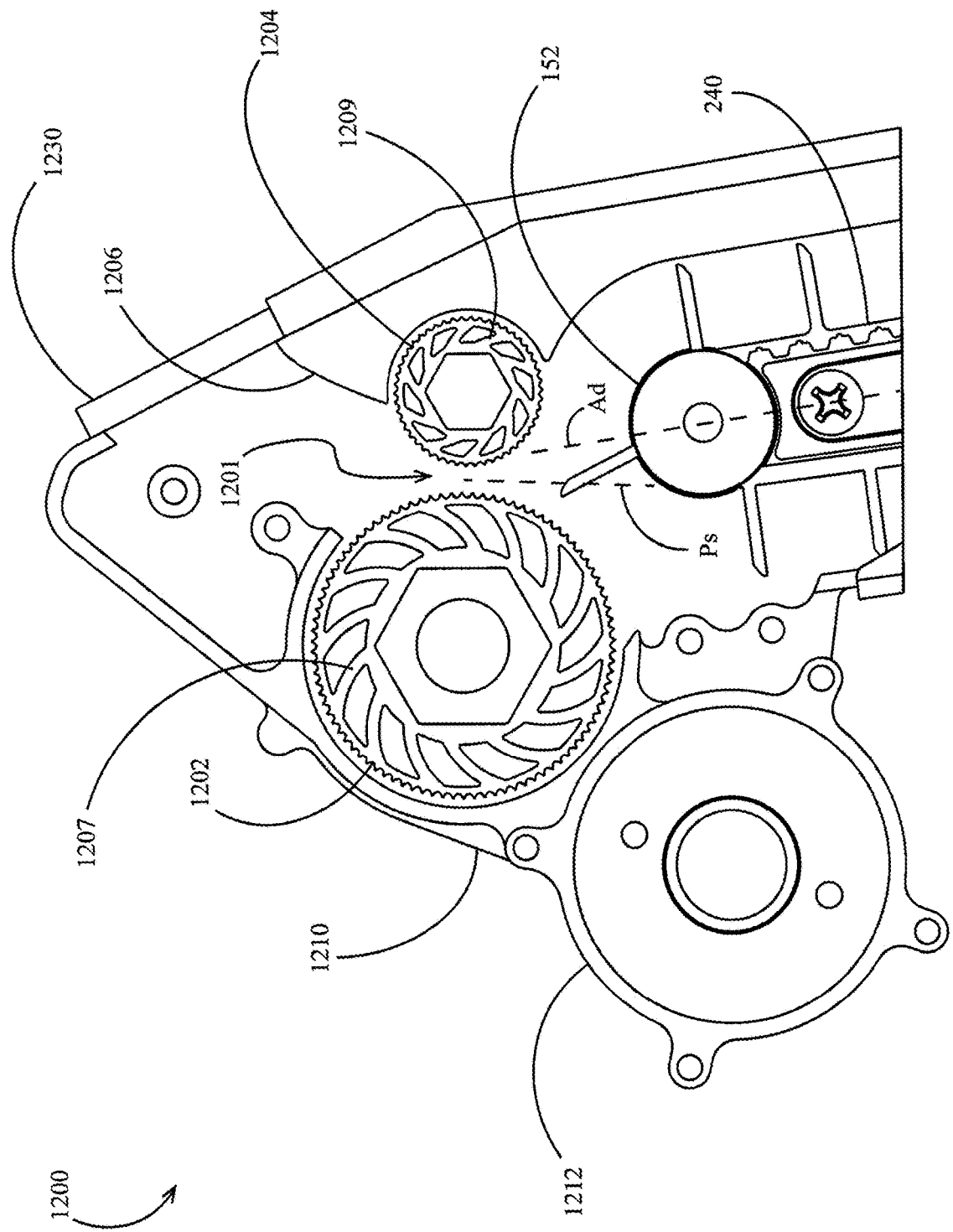
FIG. 12A is a side elevation view of another embodiment of a seed conveyor with certain components removed for clarity.
Figure 12B:
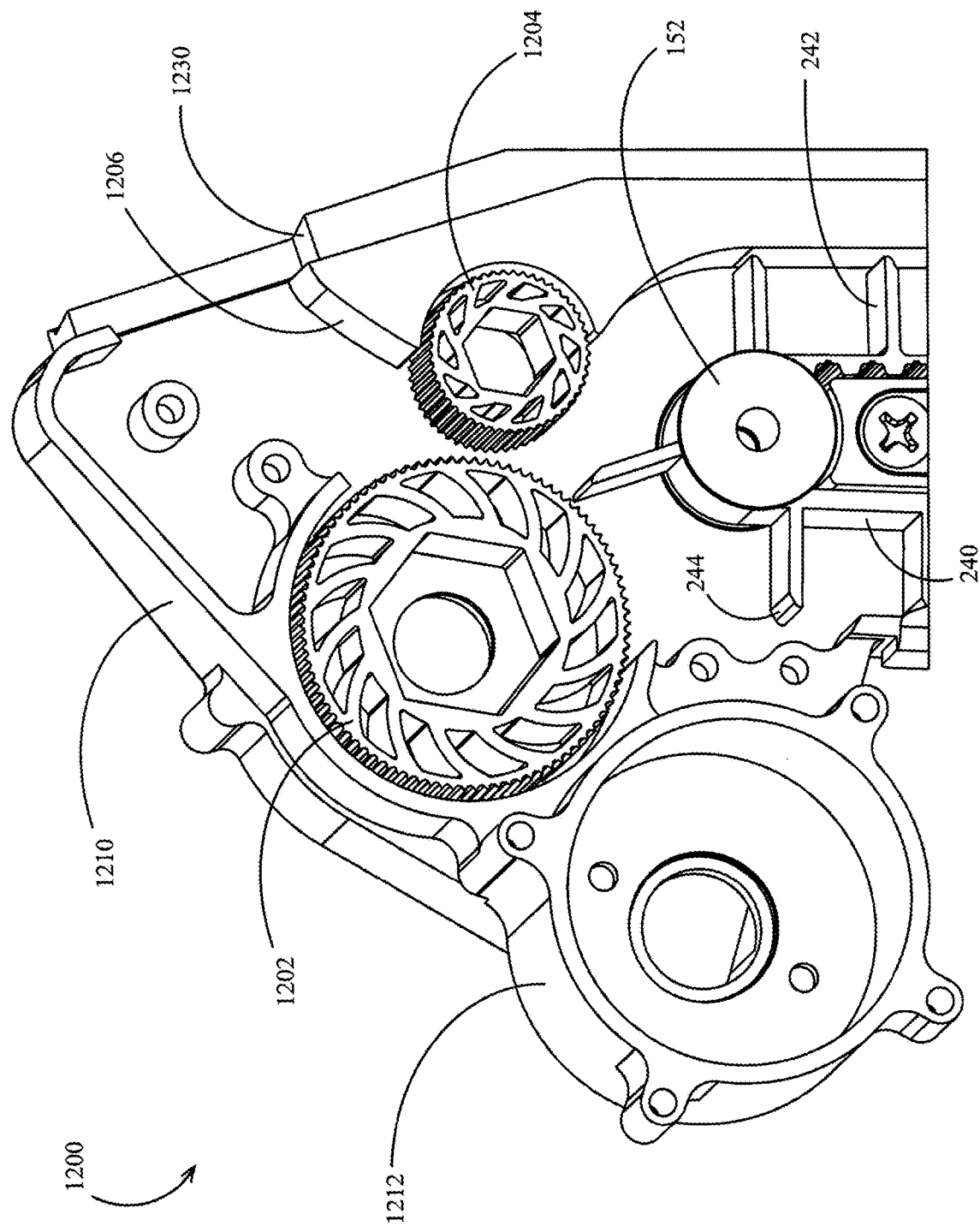
FIG. 12B is a side perspective view of the seed conveyor of FIG. 12A with certain components removed for clarity.
Figure 12D:
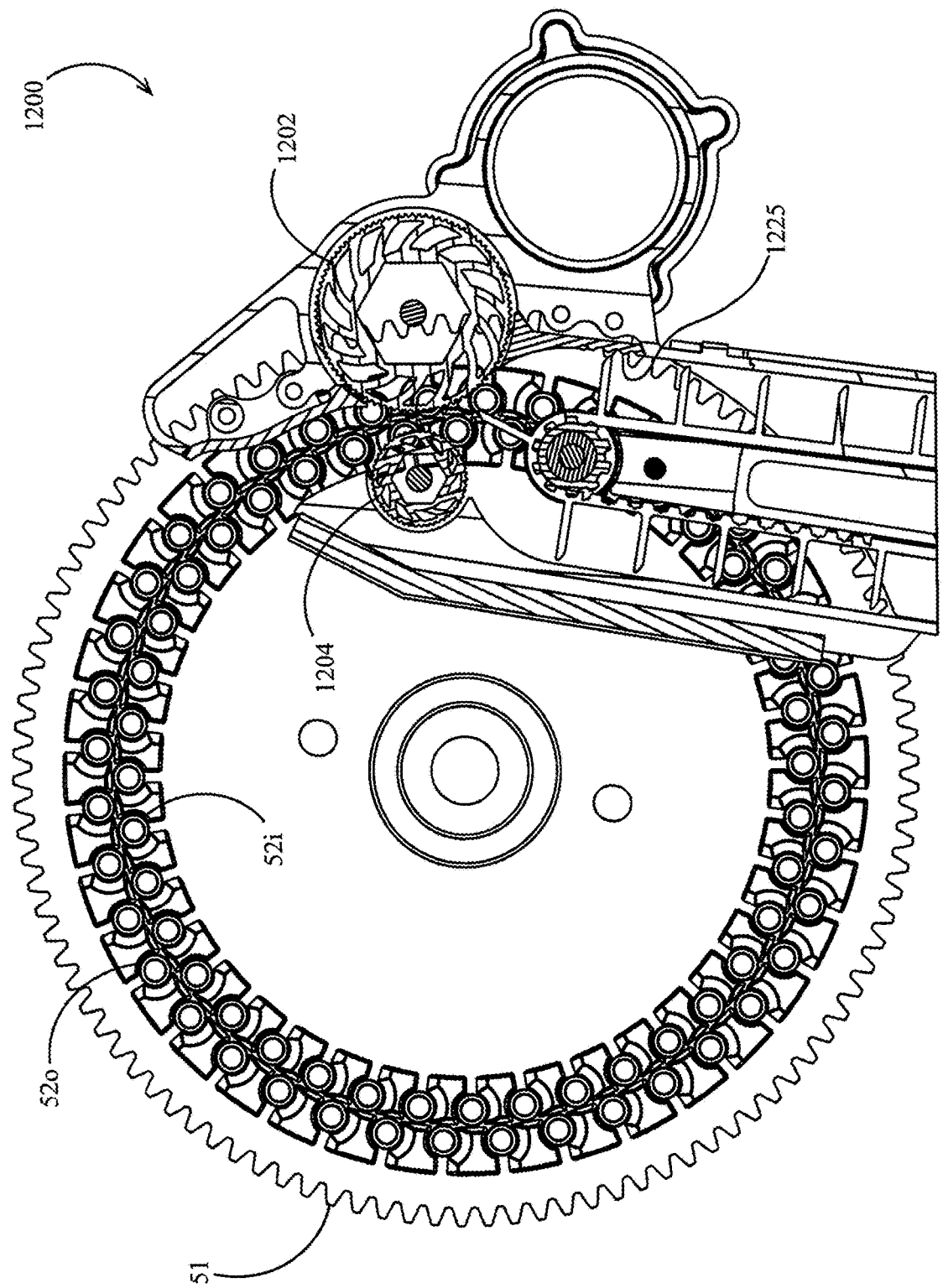
FIG. 12D is a cross-sectional view of the seed conveyor of FIG. 12A in communication with another embodiment of a seed disc.
Figure 12E:
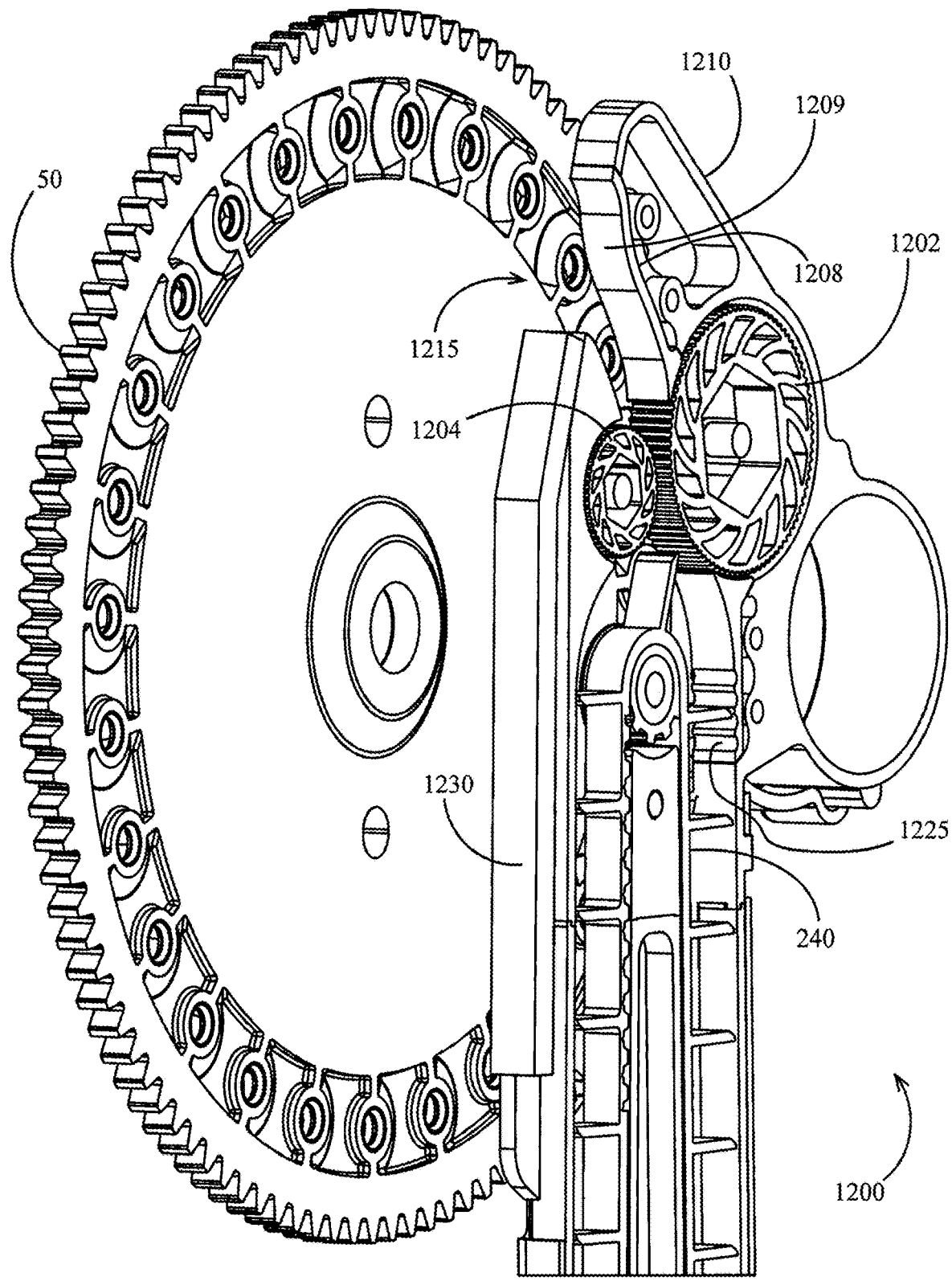
FIG. 12E is a perspective cross-sectional view of the seed conveyor of FIG. 12A in communication with the seed disc of FIG. 12C.
Figure 12F:
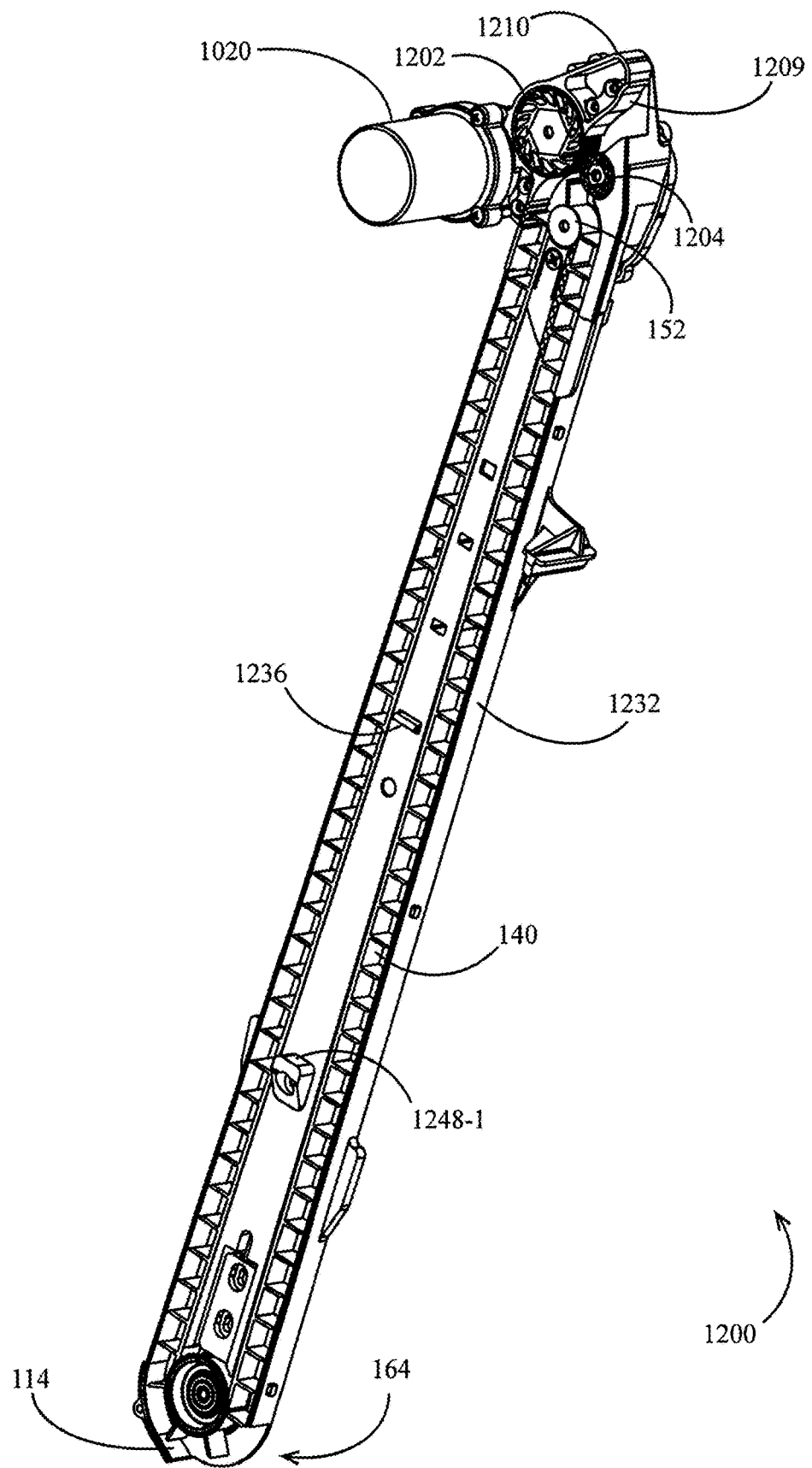
FIG. 12F is a perspective view of the seed conveyor of FIG. 12A with certain components removed for clarity.
Figure 12H:
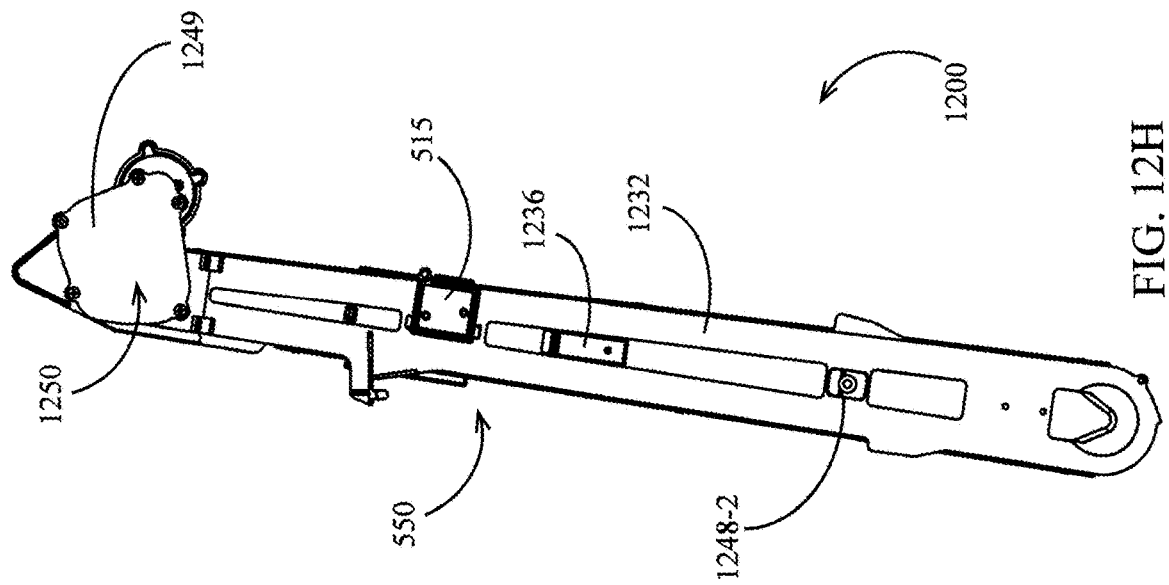
FIG. 12H is a right side elevation view of the seed conveyor of FIG. 12A with certain components removed for clarity.
Figure 12G:
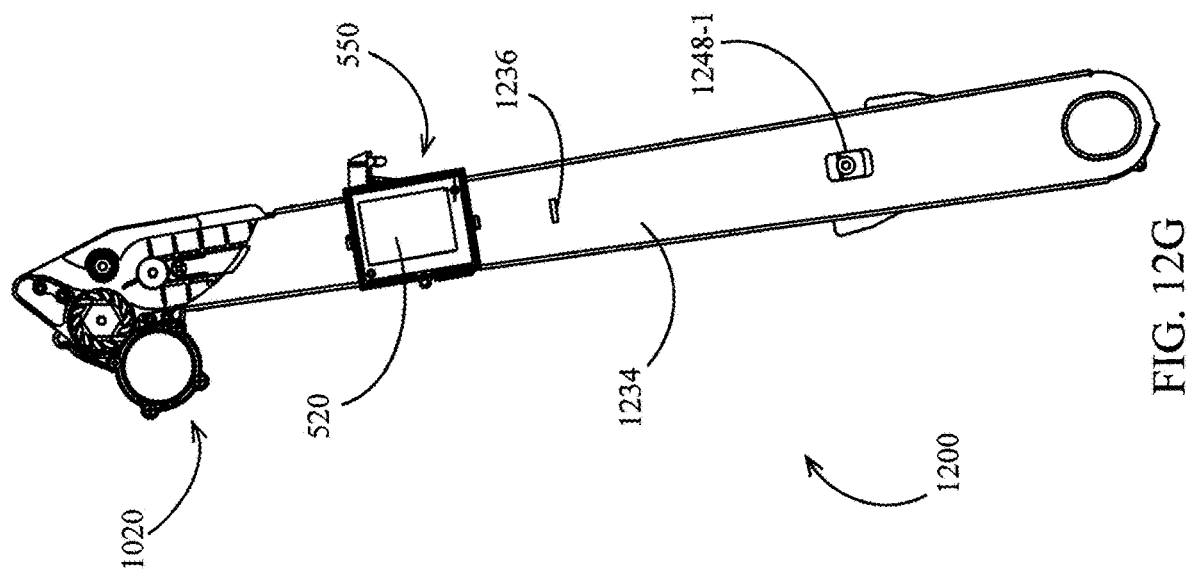
FIG. 12G is a left side elevation view of the seed conveyor of FIG. 12A with certain components removed for clarity.
Figure 12I:
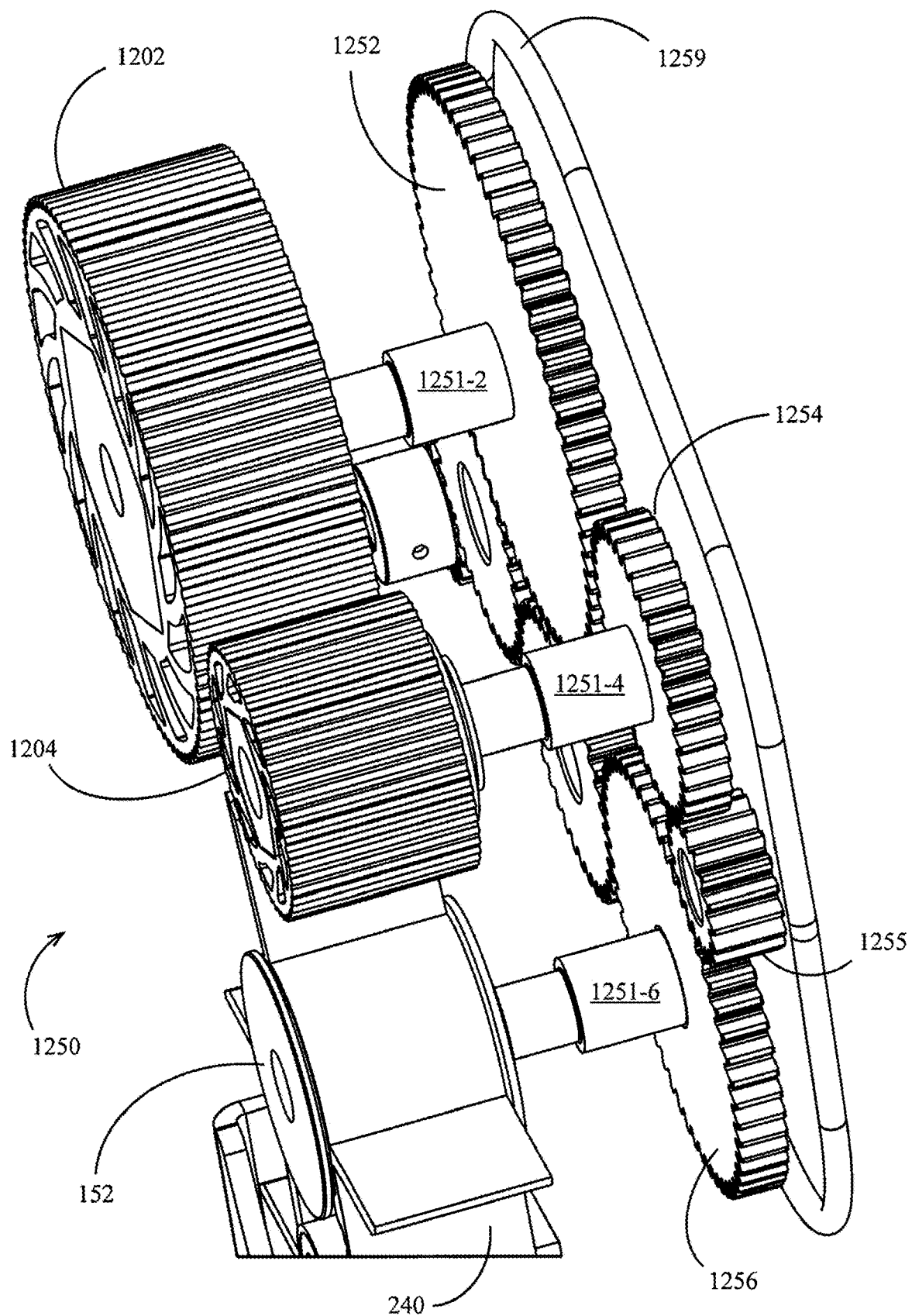
FIG. 12I is a perspective view of the gearbox of the seed conveyor of FIG. 12A.
Figure 12J:
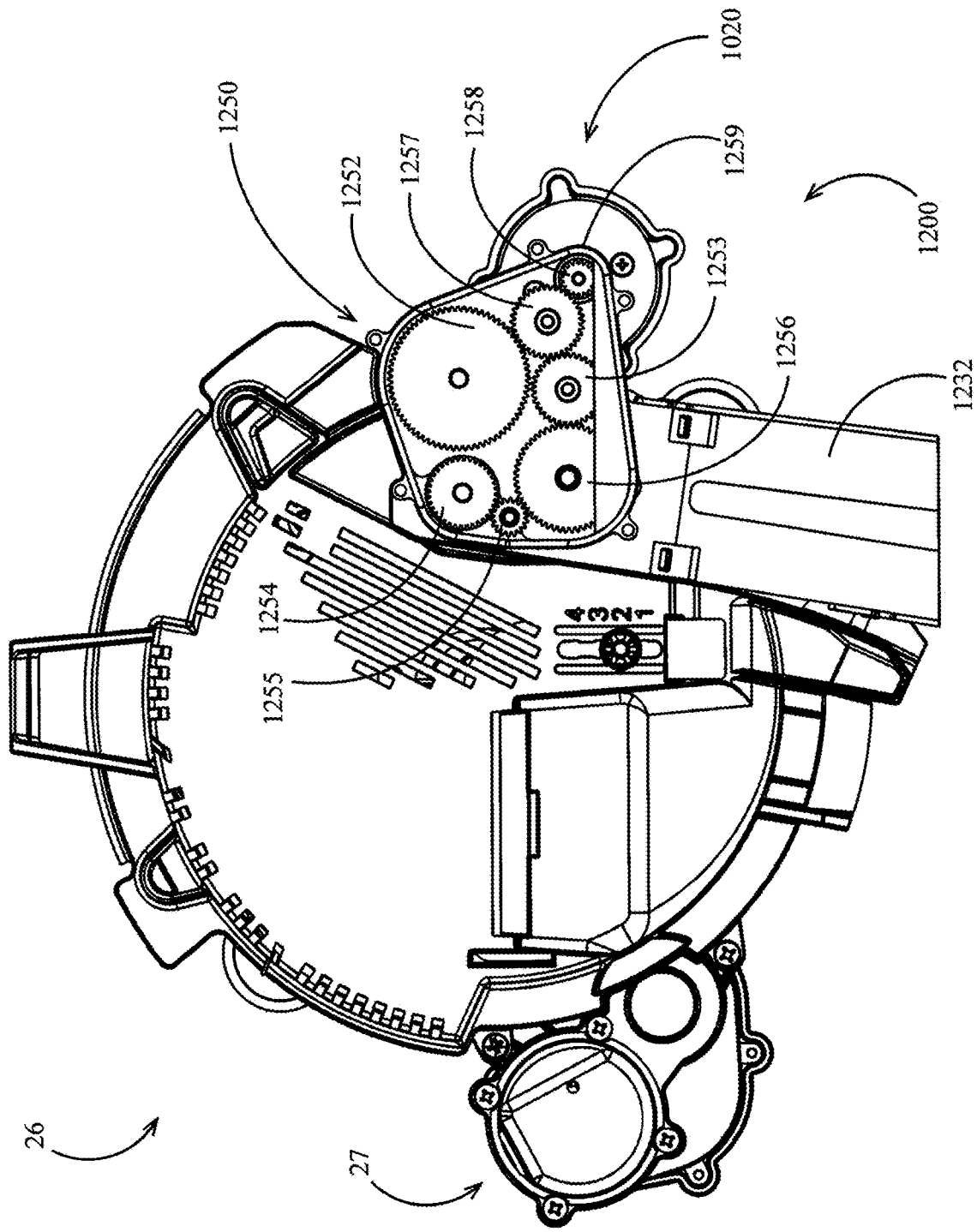
FIG. 12J is a partial right elevation view of the seed conveyor of FIG. 12A in communication with an embodiment of a seed meter.
Figure 12K:
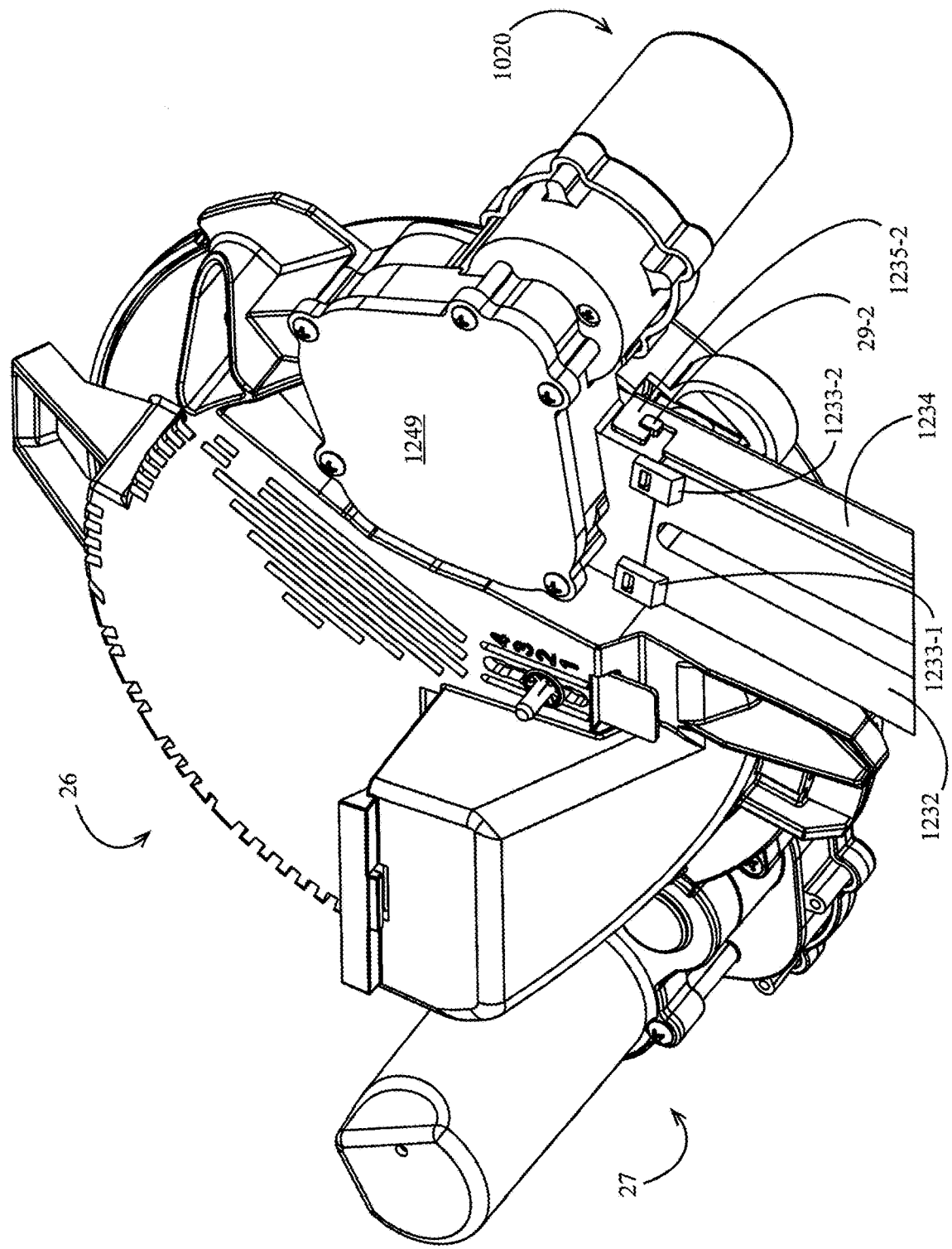
FIG. 12K is a partial right perspective view of the seed conveyor of FIG. 12A in communication with the seed meter of FIG. 12J.
Figure 12L:
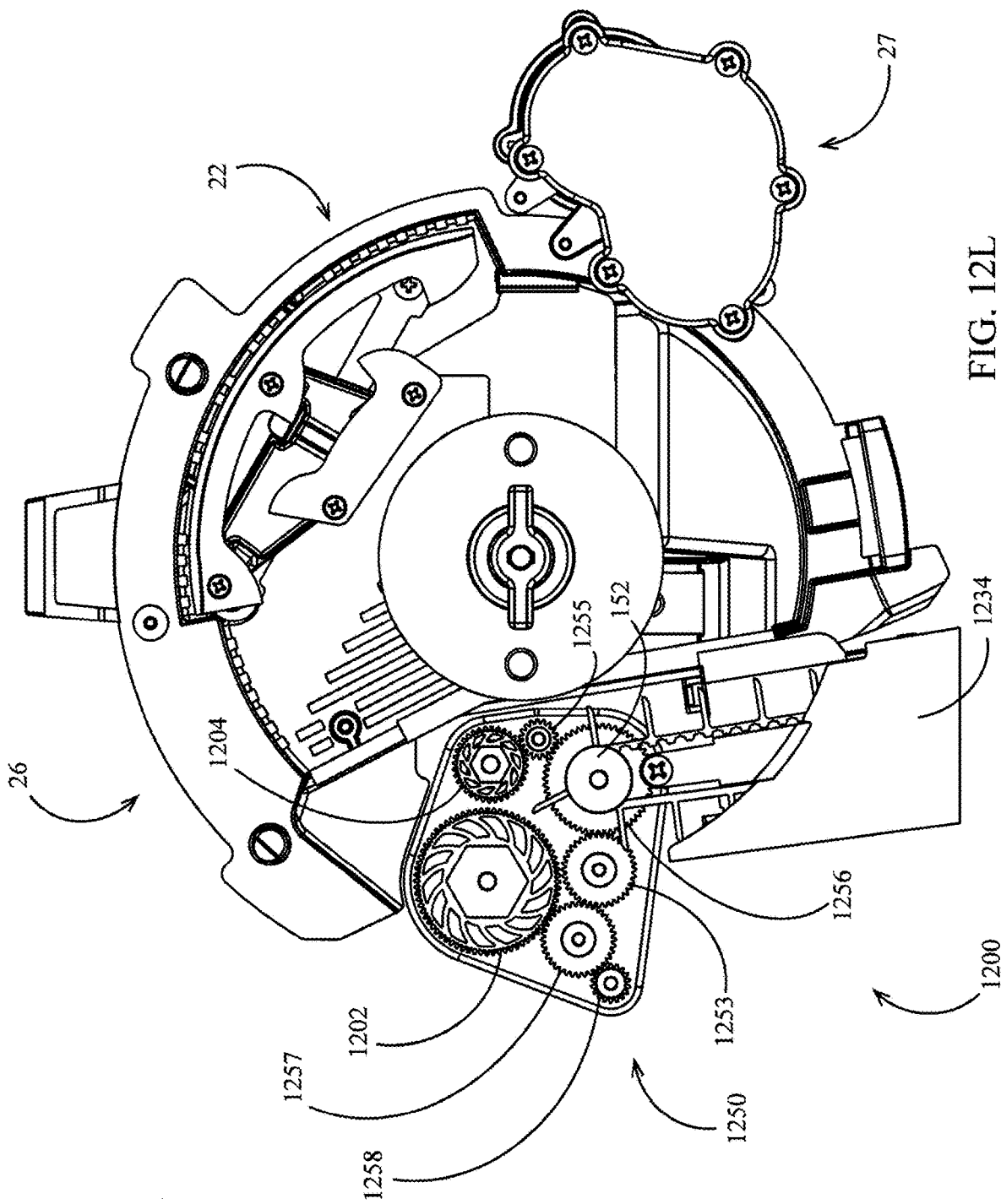
FIG. 12L is a partial left elevation view of the seed conveyor of FIG. 12A in communication with the seed meter of FIG. 12J, with certain components removed for clarity.
Figure 12M:
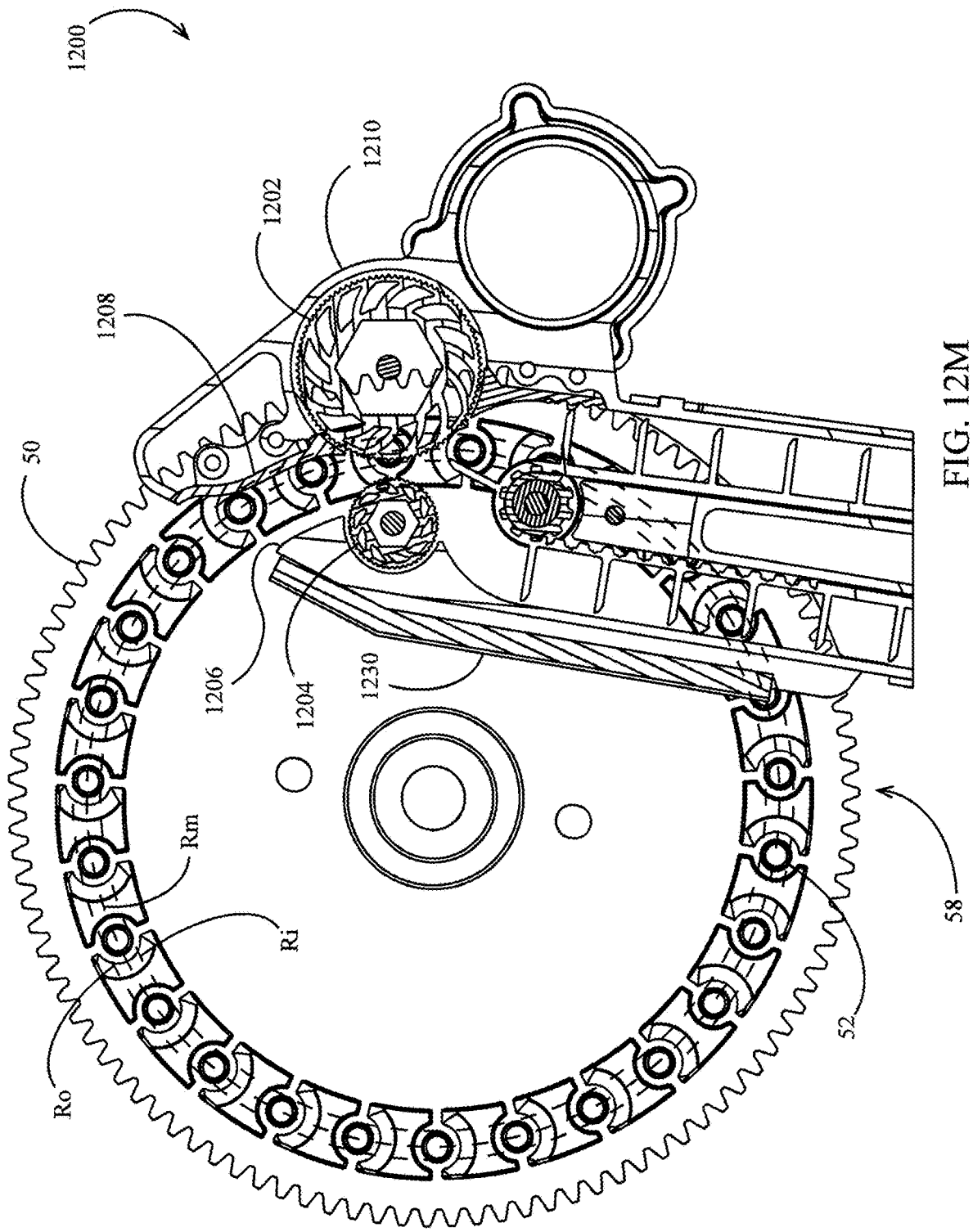
FIG. 12M is a cross-sectional view of the seed conveyor of FIG. 12A in communication with the seed disc of FIG. 12C.
Figure 13:
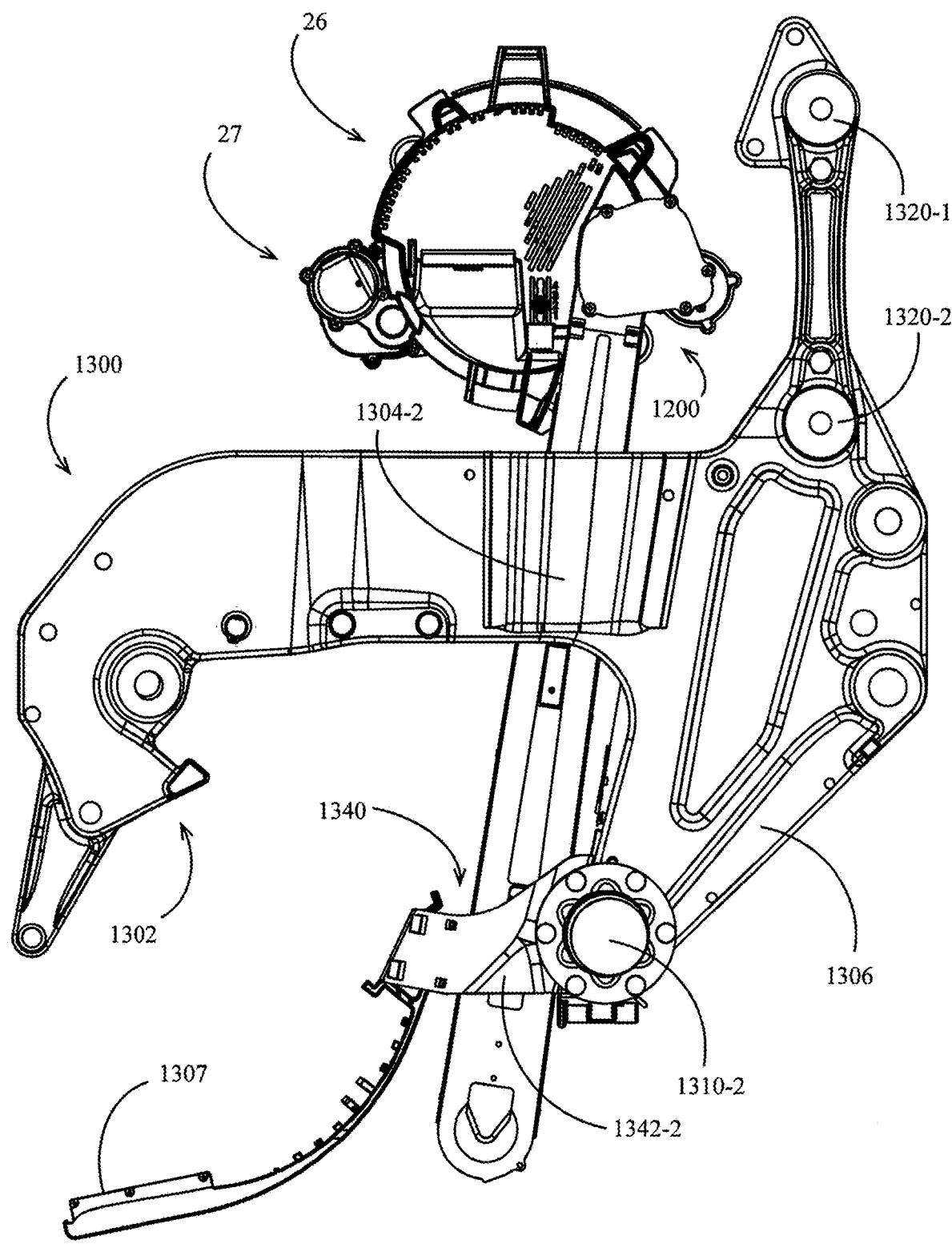
FIG. 13 is partial side elevation view of a row unit shank supporting the seed conveyor of FIG. 12A.

Turning to FIGS. 12A-13, a seed conveyor 1200 including loading wheels is illustrated. Referring to FIGS. 12A and 12B, the seed conveyor 1200 includes a housing 1210 in which a first loading wheel 1202 and a second loading wheel 1204 are rotatably supported by the meter housing 1210, preferably above the apex of the belt 140. The loading wheels are preferably driven to rotate as described later herein; on the view of FIG. 12A, loading wheel 1202 preferably rotates in the clockwise direction and loading wheel 1204 preferably rotates in the counter-clockwise direction. The loading wheels 1202,1204 are preferably spaced to leave a gap 1201 between the loading wheels, preferably above the apex of the belt 140. The gap 1201 is preferably sized to permit seeds to pass through with a small amount of compression of each loading wheel, such that a seed placed in the gap is positively constrained by the loading wheels 1202,1204. The gap is preferably 0.01 inches wide for seed conveyors used to plant corn and soybeans. The loading wheel 1202 preferably includes vanes 1207 and the loading wheel 1204 preferably includes vanes 1209. The loading wheels 1202,1204 are preferably made of a material having relatively low compressibility. In some embodiments, the loading wheels 1202, 1204 are made of polyurethane. It should be appreciated that the vanes in each loading wheel make the loading wheel more compressible than a solid piece of relatively incompressible material such that the loading wheels may be compressed to receive seeds in the gap 1201. In other embodiments each loading wheel is comprised of a solid annular or cylindrical piece of a more compressible material; such embodiments are not preferred because more compressible materials tend to wear more quickly from repeated engagement of seeds. As illustrated, the loading wheels 1202,1204 preferably include roughness elements (e.g., ribbing) disposed substantially around the perimeters of the loading wheels.

Referring to FIG. 12C, the seed conveyor 1200 is illustrated in communication with a seed disc 50 having a single radial array of seed apertures 52. The seed conveyor 1200 is preferably disposed adjacent the seed disc 50. In operation, as described elsewhere herein, the seed apertures pick up seeds 62 from a seed pool 58 located at approximately the six o'clock position on the view of FIG. 12C and are carried in a clockwise seed path. As the seeds 62 approach the housing 1210, they preferably pass through a notch in a brush 1230 disposed to contact and clean the seed disc and then enter the housing 1210.

Referring to FIGS. 12C and 12E, seeds 62 preferably enter the housing 1210 through a throat 1215 defined by a lower surface 1206 and an upper surface 1211. The upper surface 1211 preferably comprises a lower surface of an insert 1208 removably attached (e.g., by screws as illustrated herein) to the housing 1210. It should be appreciated that the upper surface 1211 is preferably part of a removable insert because frequent repeated contact with seeds 62 may cause appreciable wear depending on the material used to form the upper surface 1211. The upper surface 1211 is preferably normal to the surface of the seed disc 50. The upper surface 1211 preferably includes a curvilinear portion 1281 concentric with the seed apertures 52 and a subsequent curvilinear portion 1283 along which the upper surface 1211 curves continuously from concentricity with the seed apertures 52 to become approximately tangential with the outer perimeter of the loading wheel 1202. The surface 1211 preferably terminates adjacent to the gap 1201. Turning to FIG. 12M, the seed apertures 52 define an outer radius Ro, a median radius Rm and an inner radius Ri from the center of the seed disc 50. The curvilinear portions 1281 and 1283 preferably have radii between Ro and Rm. The curvilinear portion 1283 preferably has a radius approaching Rm toward the terminal end of the upper surface 1211. The lower surface 1206 preferably has a radius less than Ri. In operation, each seed 62 is preferably dislodged inwardly from the seed aperture 52 by contact with the curvilinear portion 1281 but preferably remains entrained on the seed aperture while in contact with the curvilinear portion 1281. The seed 62 is further dislodged inwardly from the seed aperture 52 by contact with the curvilinear portion 1283.

Turning to FIG. 12D, the seed conveyor 1200 is illustrated in communication with a seed disc 51 having an array of inner seed apertures 52i arranged concentrically with an array of outer seed apertures 52o. Those skilled in the art will recognize that such discs are conventionally used to plant soybeans and other crops. The seed conveyor 1200 is preferably configured to partially dislodge seeds from both aperture arrays and subsequently constrain or "pinch" them between the loading wheels. For example, the loading wheel 1204 is disposed to intersect the path of the array of inner seed apertures 52i such that the loading wheel 1204 urges seeds from the inner seed apertures toward the gap 1201. As illustrated, the upper surface 1211 is preferably disposed similarly with respect to the outer seed apertures 52o as described herein with respect to the apertures 52 in FIG. 12M.

Returning to FIG. 12C, after the seeds 62 pass the curvilinear portion 1283, they enter the gap 1201 between the loading wheels 1202,1204. The loading wheels 1202, 1204 are slightly compressed by the introduction of each seed into the gap 1201 such that the wheels positively constrain the seed in the gap. The vacuum seal imposing a vacuum on the apertures 52 preferably terminates adjacent to the gap 1201 at an axis 196' such that seeds 62 are released from the disc 50 just before entering the gap. Due to the rotation of the loading wheels, the seed 62 is then ejected downward toward the belt.

Returning to FIG. 12A, seeds 62 ejected by the loading wheels 1202,1204 travel along a nominal seed path Ps which is tangential to both of the loading wheels. Seeds ejected by the loading wheels 1202,1204 preferably freefall along the seed path Ps under the influence of gravity and the velocity imparted on the seeds by ejection from the loading wheels 1202,1204. Seed traveling along seed path Ps preferably enters between flights of the belt 240 forward (to the left on the view of FIG. 12A) of a plane Ad dividing the ascending and descending portions of the belt. Thus the seed path Ps intersects a descending portion of the belt 240.

Returning to FIG. 12C, seeds 62 enter the belt 52 between flights 242 and pass by a surface 1225, which preferably comprises a surface of an insert removably attachable (e.g., by screws as illustrated) to the housing. The surface 1225 preferably includes agitation elements (e.g., ribbing) sized to agitate seeds 62 which may occasionally be accidentally trapped between the flight 242 and the inner wall of the housing 1210 instead of being introduced between flights as desired; upon agitation against the surface 1225, the seeds are released from being trapped between the flight 242 and the inner wall of the housing 1210 and pass in between adjacent flights. It should be appreciated that allowing a seed 62 to remain trapped between the flight 242 and the inner wall of the housing 1210 causes unnecessary wear on the housing 1210, damages the seed, damages the belt 240, and causes seed spacing errors due to reflexive action of the flight upon release of seed from the conveyor 1200.

Turning to FIGS. 12I, 12J, 12K, and 12L, the seed conveyor 1200 preferably includes a seed conveyor motor 1020. The seed conveyor motor 1020 is preferably housed within a motor housing 1212 of the housing 1210. The motor 1020 preferably drives the seed conveyor via a gearbox 1250. The motor 1020 preferably also drives the loading wheels 1202,1204 via the gearbox 1250.

Referring to FIG. 12J, the motor 1020 drives an output gear 1258. The output gear preferably drives an idler gear 1257. The idler gear 1257 preferably drives an idler gear 1253. The idler gear 1253 preferably drives a conveyor input gear 1256. Thus the output gear 1258 indirectly drives the conveyor drive gear 1256.

The conveyor input gear 1256 preferably drives an idler gear 1255. The idler gear 1255 preferably drives a loading wheel drive gear 1254. Thus the output gear 1258 indirectly drives the loading wheel drive gear 1254.

The idler gear 1257 preferably drives a loading wheel drive gear 1252. Thus the output gear 1258 indirectly drives the loading wheel drive gear 1252.

Turning to FIG. 12I, the loading wheel drive gear 1252 preferably drives the loading wheel 1202 via a shaft 1251-2. The loading wheel drive gear 1254 preferably drives the loading wheel 1204 via a shaft 1251-4. The conveyor drive gear 1256 preferably drives the upper pulley 152 via a shaft 1251-6.

The gears constituting the gearbox 1250 are preferably relatively sized as illustrated in FIG. 12J. The gears constituting the gearbox 1250 are preferably relatively sized such that the angular speeds of the perimeters of the loading wheels 1202,1204 are substantially equal. The gears constituting the gearbox 1250 are preferably relatively sized such that a ratio between the linear speed of the perimeter of the loading wheel 1204 and the linear speed of the outer perimeter of flights 242 on the descending portion of the belt 240 is approximately 0.73. In other embodiments, the gears constituting the gearbox 1250 are relatively sized such that a ratio between the linear speed of the perimeter of the loading wheel 1204 and the linear speed of the outer perimeter of flights 242 rounding the top belt 240 is approximately 0.73.

Referring to FIGS. 12I and 12K, the gearbox 1250 is preferably enclosed by a cover 1249 securing a seal 1259 against the meter 26.

In other embodiments, the seed disc 50 is also indirectly driven by the motor 1020, e.g., by a drive belt connecting a gear driven by output gear 1258 to a shaft on which the seed disc is mounted for rotation. In still other embodiments, the loading wheels 1202,1204 are driven by a separate motor from the motor 1020. As illustrated, the seed disc 50 is preferably driven by a separate meter drive motor 27 which preferably comprises an electric motor disposed to drive gear teeth provided on the perimeter of the seed disc 50 as disclosed in Applicant's U.S. application Ser. No. 61/675,714, the disclosure of which is hereby incorporated herein in its entirety by reference.

Turning to FIGS. 12F, 12G, and 12H, the seed conveyor 1200 is illustrated from top to bottom. As with the other seed conveyor embodiments described elsewhere herein, the belt 240 conveys seeds 62 downwardly toward a seed exit 164 at which an angled portion 114 imports a rearward horizontal velocity to the seeds as the seeds are released sequentially into the trench.

Turning to FIGS. 12G, 12H, and 12K, the seed conveyor 1200 preferably includes a housing portion 1232 and a housing portion 1234 which cooperate to enclose the belt 240 during operation. The housing portions 1232,1234 preferably comprise three walls each. Referring to FIG. 12K, the housing portion 1232 preferably engages the housing 1234 such that two fore-aft walls of the housing portion 1232 are received within two fore-aft walls of the housing portion 1234.

To assemble the seed conveyor 1200, the user first attaches the housing portion 1232 to the housing 1210 using attachment ears 1233. Referring to FIG. 12K, the user then slides the housing portion 1234 over the housing portion 1232 in a transverse direction and then slides the housing portion 1234 downwardly such that attachment ears 1235 in the housing portion 1234 engage protrusions 29 in the housing 1210. When the housing portions 1232,1234 are relatively positioned such that the attachment ears 1235 engage protrusions 29, a spring 1236 mounted to the housing portion 1234 is allowed to relax such that a portion of the spring extends through openings in the housing portions 1232,1234, thus retaining the relative vertical position of the housing portions 1232,1234. To disassemble the seed conveyor 1200, the user first pulls back the spring 1236 to allow the housing portions 1232,1234 to slide vertically relative to one another, then slides the housing portion 1234 upwards and then away from the housing portion 1232.

Figure 15:
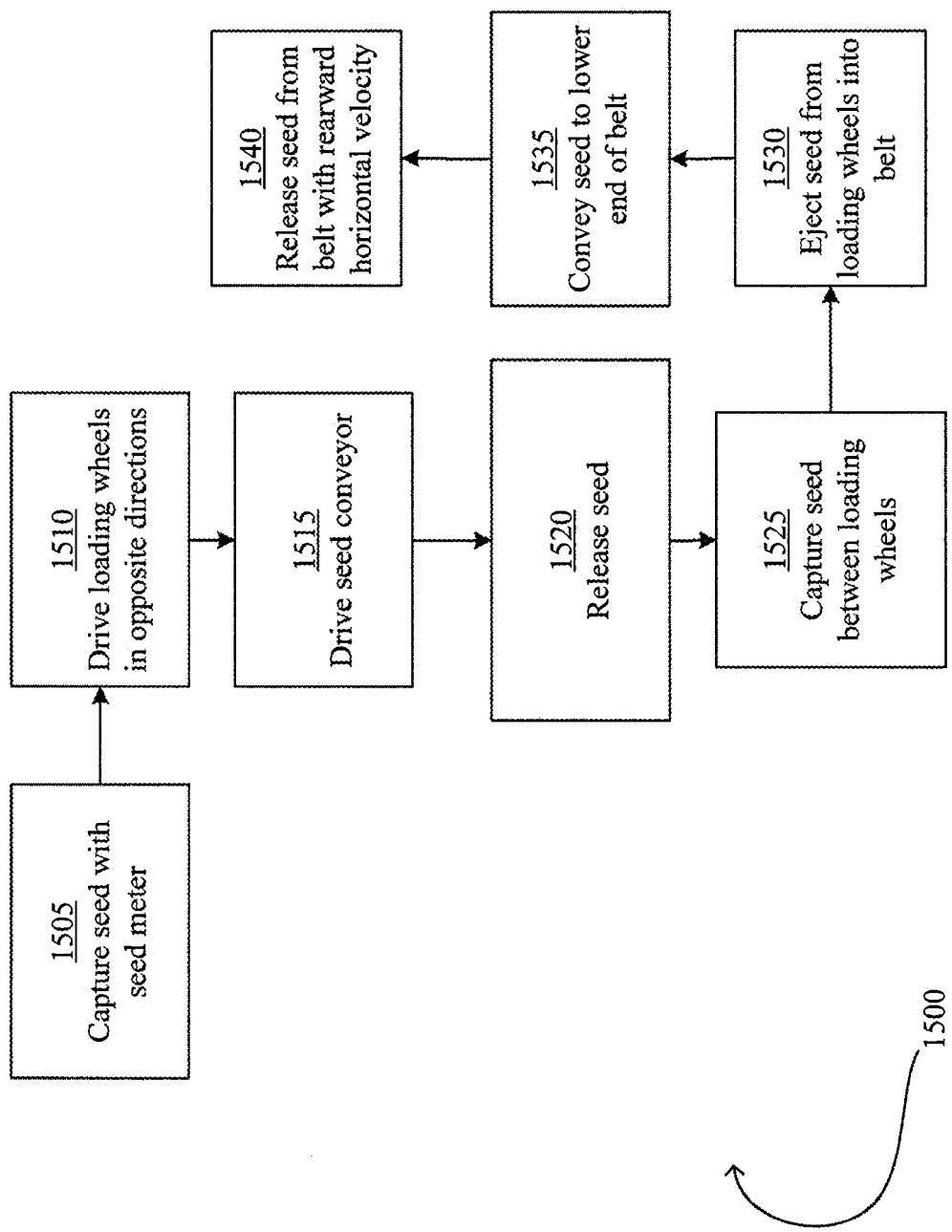
FIG. 15 illustrates a process for operating a seed conveyor having loading wheels.

Turning to FIG. 15, process 1500 for planting seeds using the seed conveyor 1200 is illustrated. At step 1505, the seed disc 50 is preferably rotated through the seed pool and a seed is preferably captured by the seed meter. In the implementation of process 1500 using a vacuum-type seed meter or positive air seed meter, the step of capturing seeds is accomplished by entraining seeds onto the seed apertures 52 of a seed disc 50. In the implementation of process 1500 using a finger pickup-style meters such as those disclosed in U.S. Pat. No. 6,273,010, the entire disclosure of which is hereby incorporated herein by reference, the step of capturing a seed is accomplished by capturing each seed with a spring-loaded mechanical finger. At step 1510, the loading wheels 1202,1204 are preferably driven to rotate in opposite directions. At step 1515, the seed conveyor 1200 is driven such that flights 142 circulate around the belt 240. At step 1520, a seed is released (e.g., from an aperture 52 of the seed disc 50), preferably adjacent to the loading wheels 1202,1204 and preferably above the loading wheels 1202,1204. At step 1525, the seed is preferably captured between the loading wheels 1202,1204. At step 1525, one of the loading wheels is preferably deformed to receive the seed in the gap 1201. At step 1530, the seed is preferably ejected from between the loading wheels 1202,1204. At step 1530, one of the loading wheels preferably returns to a relaxed state. At step 1530, the seed is preferably ejected downward into the belt 240, i.e., between flights 142. At step 1535, the seed is conveyed to a lower end of the belt 240 between flights 142. At step 1540, the seed is released from the belt with a rearward horizontal velocity, e.g., by releasing the seed along surface 114.

Turning to FIG. 13, the seed conveyor 1200 is illustrated mounted to a row unit 1300. The row unit 1300 preferably includes a closing wheel attachment portion 1302 for pivotally mounting a closing wheel assembly (not shown) to the row unit and parallel arm attachment apertures 1320 for pivotally mounting a parallel arm arrangement (not shown) to the row unit. The parallel arm arrangement is pivotally mounted to a toolbar (not shown) such that the row unit 1300 is allowed to translate vertically with respect to the toolbar as the row unit traverses a field. The row unit 1300 preferably includes two transversely spaced sidewalls 1304, preferably located below the mounting location of the meter 26. The row unit 1300 preferably includes a downwardly extending shank 1306 having a pair of opener disc axles 1310 for pivotally mounting a pair of opener discs to either side of the shank 1306. A bracket 1340 is preferably mounted to a lower portion of the shank 1306. The bracket 1340 preferably includes two transversely spaced sidewalls 1342 extending rearwardly and joined at a rearward end of the bracket 1340. A seed firmer 1307 is preferably mounted to the rearward end of the bracket 1340. The seed firmer 1307 is preferably disposed to resiliently contact the bottom of the trench (not shown) opened by the. The seed firmer 1307 is preferably made of a resilient material. In some embodiments, the seed firmer 1307 comprises seed firmers such as those described in U.S. Pat. No. 5,425,318, the disclosure of which is hereby incorporated in its entirety herein by reference.

The user preferably mounts the seed conveyor 1200 to the row unit 1300 by extending the seed conveyor between the sidewalls 1304 of the row unit and the sidewalls 1342 of the bracket 1340. The seed conveyor 1200 is preferably mounted to the row unit 1300 via structure (not shown) adjacent the sidewalls 1304. Referring to FIGS. 12F, 12G and 12H, the seed conveyor 1200 preferably includes two transversely extending spacers 1248 which contact interior surfaces of the sidewalls 1342 of the bracket 1340, maintaining a lower end of the seed conveyor in substantial alignment with the trench opened by the opening discs and in substantial alignment with the seed firmer 1307.

The seed conveyor 1200 preferably includes a seed sensor 550 comprised of a transmitter 520 mounted to the housing portion 1232 and a receiver 515 mounted to the housing portion 1234. The housing portions 1232,1234 preferably include openings (not shown) aligned along a transversely extending axis such that light (or other signals) transmitted by the transmitter 520 pass through the openings and between flights of the belt 240 to the receiver 515.

Figure 14:
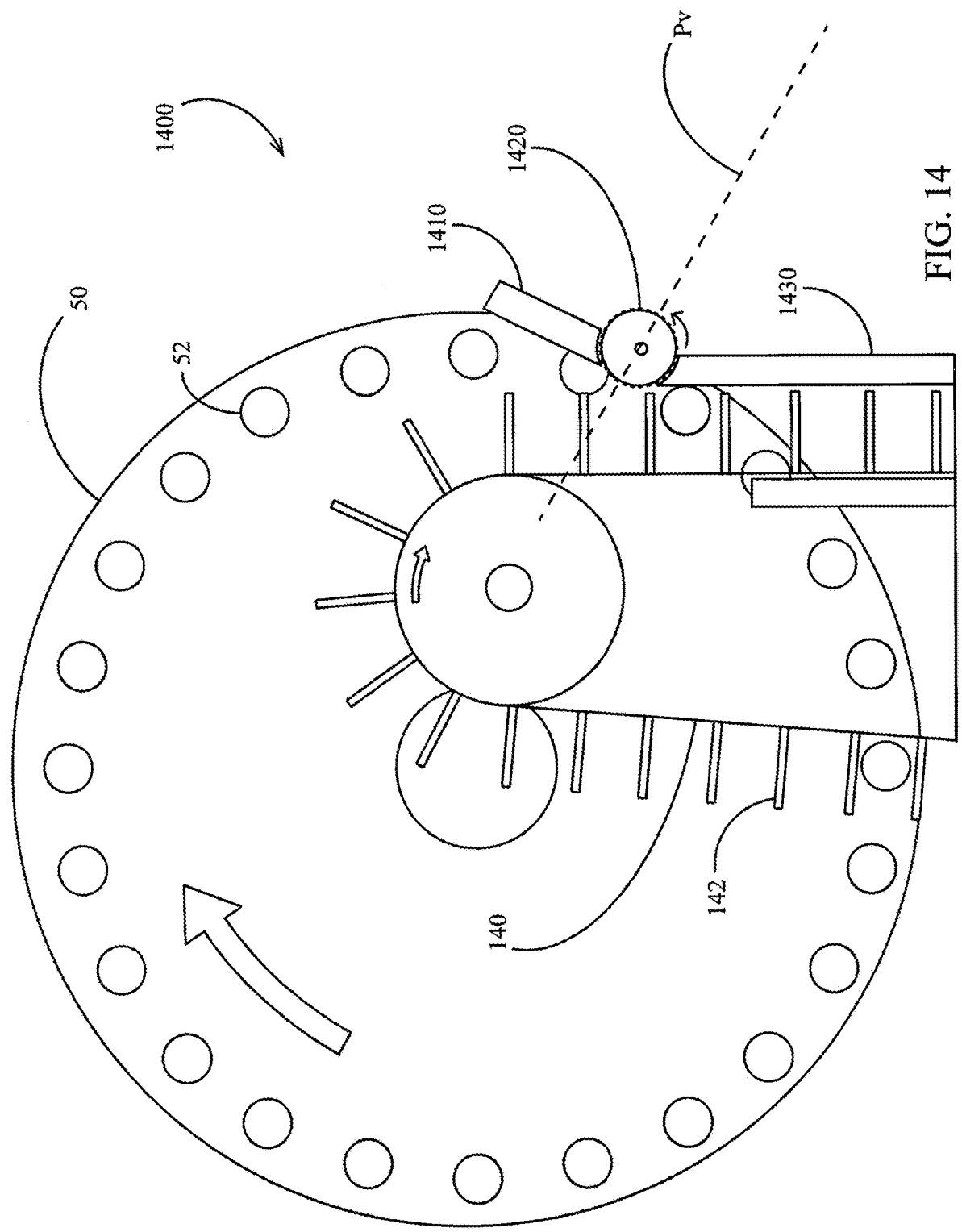
FIG. 14 is a partial side elevation view still another embodiment of a seed conveyor including a loading wheel.

Turning to FIG. 14, a seed conveyor 1400 having a single loading wheel 1420 is illustrated. The seed conveyor 1400 is preferably disposed such that the path of seed apertures 52 intersects the descending portion of the belt 140. The vacuum imposed on the seed apertures 52 is preferably substantially cut off (e.g., by the terminal end of a vacuum seal) adjacent to a plane Pv intersecting the location at which seeds enter the belt 140. Thus seeds are released from the disc just prior to entering the belt (i.e., passing between flights 142 of flight). The loading wheel 1420 is preferably located adjacent to the location at which seed enter the belt 140. The loading wheel 1420 is preferably driven for rotation about a central axis in the direction indicated by the arrow in FIG. 14. The surface of the loading wheel thus urges the seeds into the belt and prevents seeds from being stuck between the tips of flights 142 and a wall 1430 adjacent to the belt 142. The surface of the loading wheel 1420 preferably includes roughness elements as illustrated in FIG. 14 such that the loading wheel exerts greater frictional forces on the passing seeds. A guide 1410 preferably guides seeds into contact with the loading wheel 1420.

Conveyor Control Systems and Methods

Figure 8A:
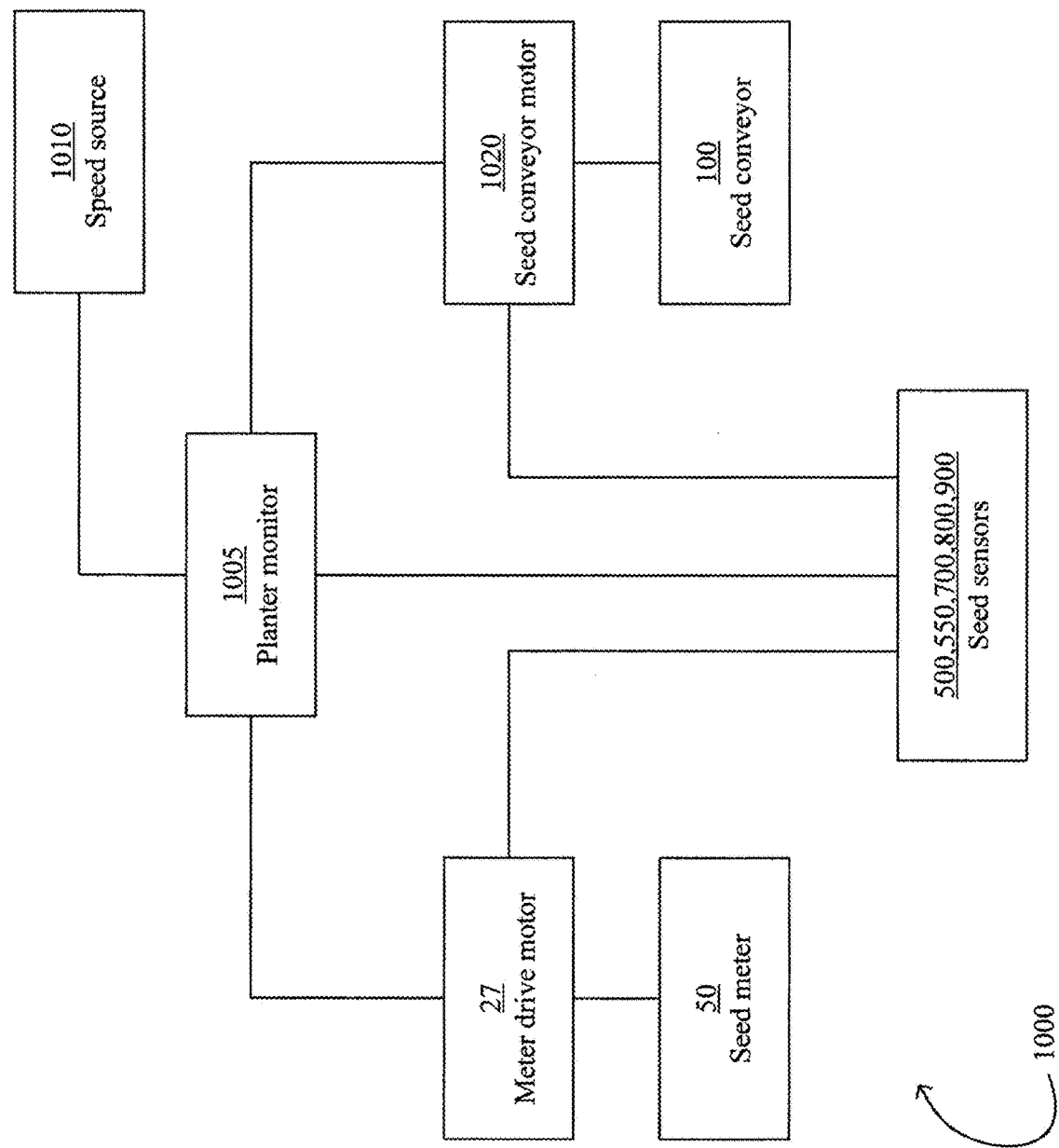
FIG. 8A is a schematic illustration of an embodiment of a seed conveyor control system.

A control system 1000 for controlling and monitoring the seed conveyor 100 as well as any other seed conveyor embodiment disclosed herein is illustrated schematically in FIG. 8A. The control system 1000 includes a planter monitor 1005. The planter monitor 1005 preferably includes a CPU and user interface, and may comprise a monitor such as that disclosed in Applicant's co-pending U.S. patent application Ser. No. 12/522,252. The planter monitor 1005 is preferably in electrical communication with a seed conveyor motor 1020. The seed conveyor motor 1020 is operably coupled to the seed conveyor 100 to drive the seed conveyor. For example, in some embodiments the seed conveyor motor 1020 includes a driven output shaft mechanically coupled to a central shaft of the upper pulley 154 or the lower pulley 152. The seed conveyor 1020 preferably includes an encoder (e.g., a hall-effect sensor) for sensing the rotational speed of the conveyor 100. The planter monitor 1005 is preferably in electrical communication with a meter drive motor 27. The meter drive motor 27 may comprise any apparatus known in the art for driving seed meters at a desired speed such as a hydraulic drive or electric drive. As an example, the meter drive motor 27 may comprise an electric motor mounted on or near the seed meter 50, the electric motor having an output shaft operably coupled to the shaft 54 of the seed meter; in such an embodiment, the meter drive motor 27 preferably includes an encoder (e.g., a hall-effect sensor) for sensing the rotational speed of meter 50. In other embodiments, the meter drive motor 27 may comprise a ground drive driven by the rotation of planter wheels 8 (FIG. 9B). The planter monitor 1005 is also preferably in electrical communication with a speed source 1010. The speed source may comprise a GPS system, a radar speed sensor, or a wheel speed sensor. The planter monitor may choose between multiple speed sources by predicting reliability as disclosed in Applicant's co-pending PCT Patent Application No. PCT/US2011/045587, incorporated herein in its entirety by reference.

Continuing to refer to FIG. 8A, the planter monitor is preferably in electrical communication with one or more seed sensors adapted for mounting to the seed conveyor 100. The seed sensors may comprise one or more of the seed sensors 500,550,700,800,900 described herein. The seed sensors may also be in electrical communication with the meter drive motor 27 and the seed conveyor motor 1020.

Figure 8B:
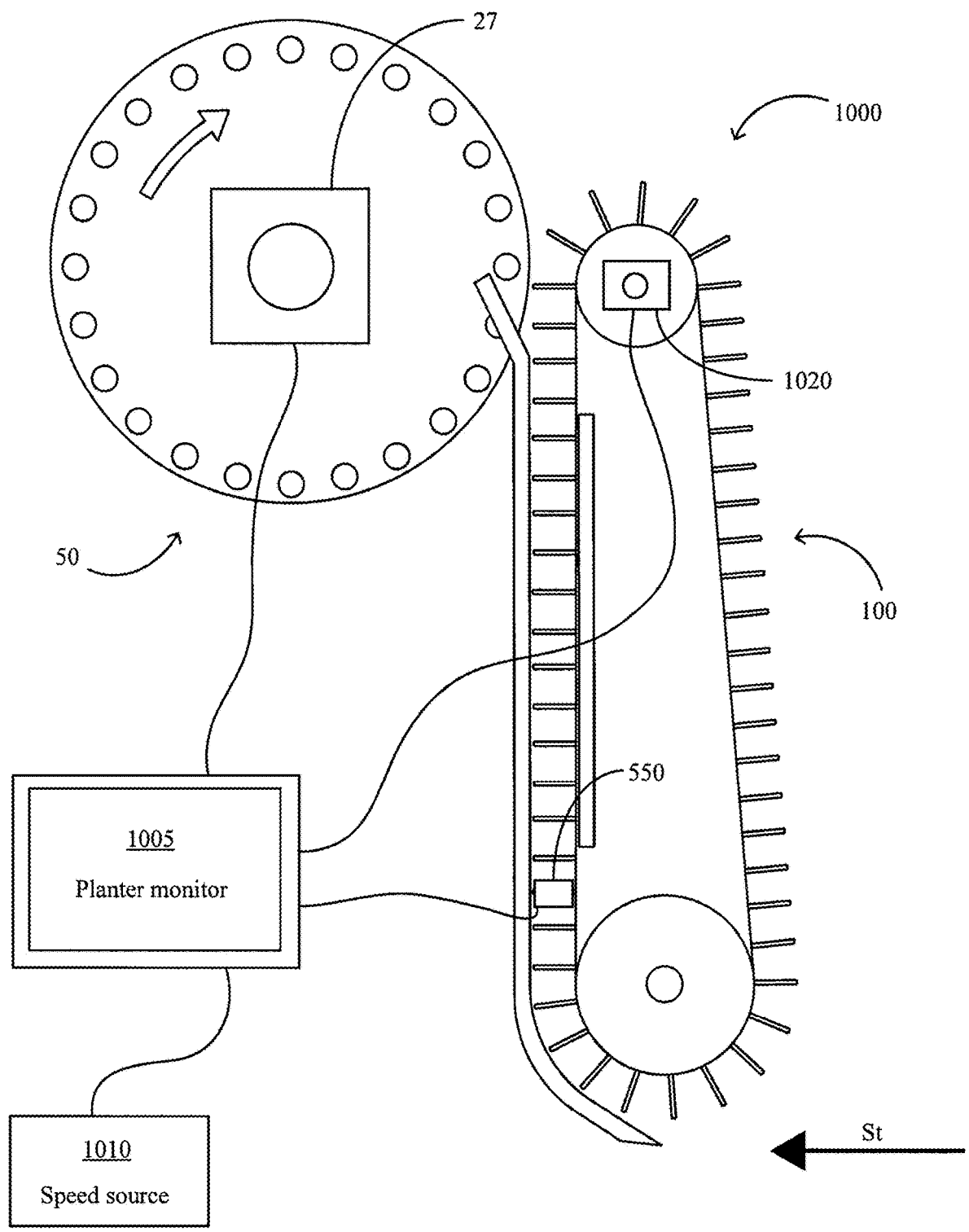
FIG. 8B illustrates an embodiment of a seed conveyor control system.

Turning to FIG. 8B, one embodiment of a planter monitor control system 1000 is illustrated. The planter monitor control system 1000 of FIG. 8B includes a seed sensor 550 mounted to the sidewalls of the seed conveyor 100. The meter drive motor 27 in the planter monitor control system 1000 of FIG. 8B comprises an electric drive. The speed St of seed conveyor 100 is generally to the left along the perspective of FIG. 8B and has a magnitude which varies with the speed and direction of the planting implement.

Figure 9A:
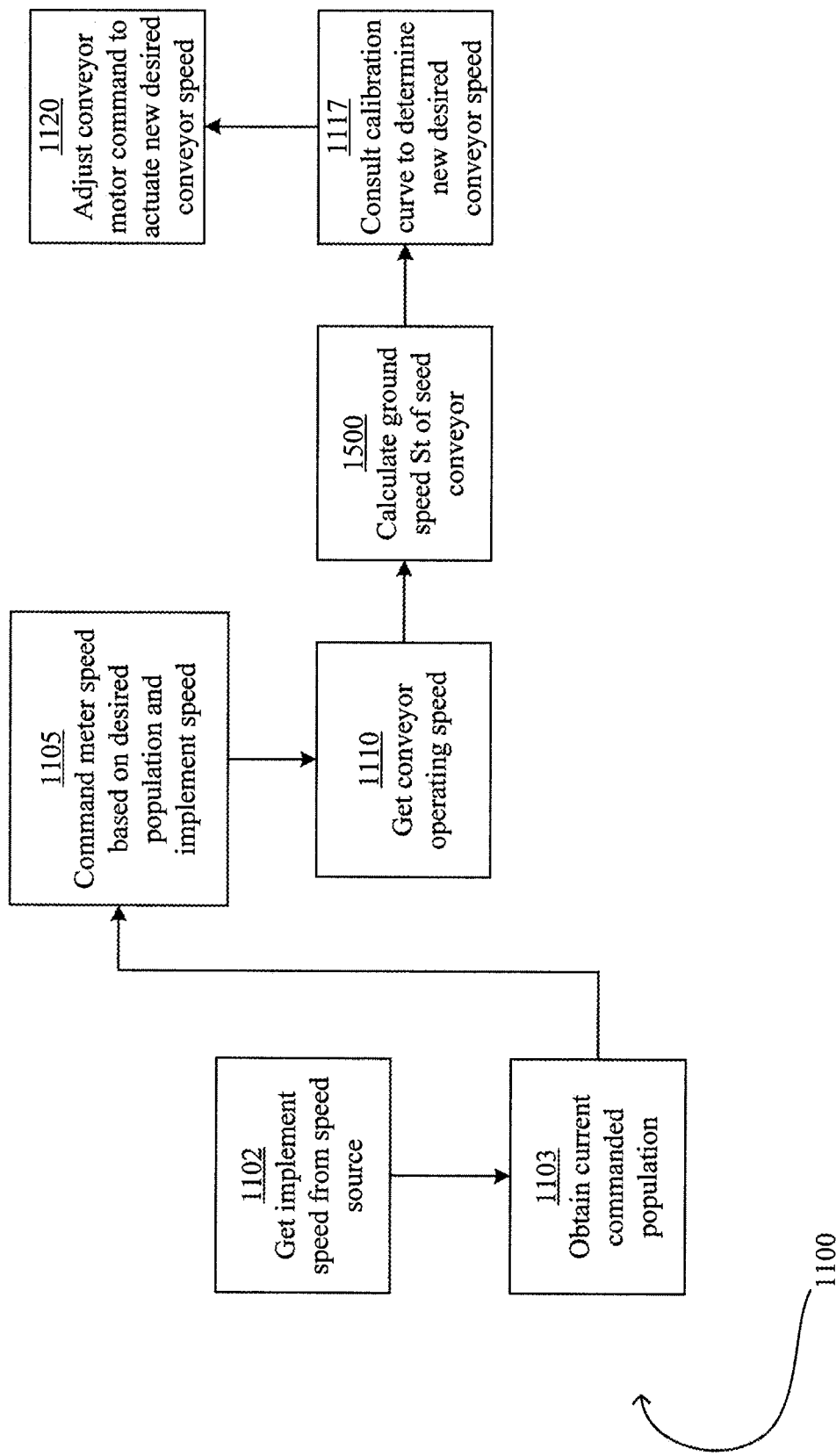
FIG. 9A illustrates an embodiment of a process for controlling a seed conveyor.
Figure 9B:
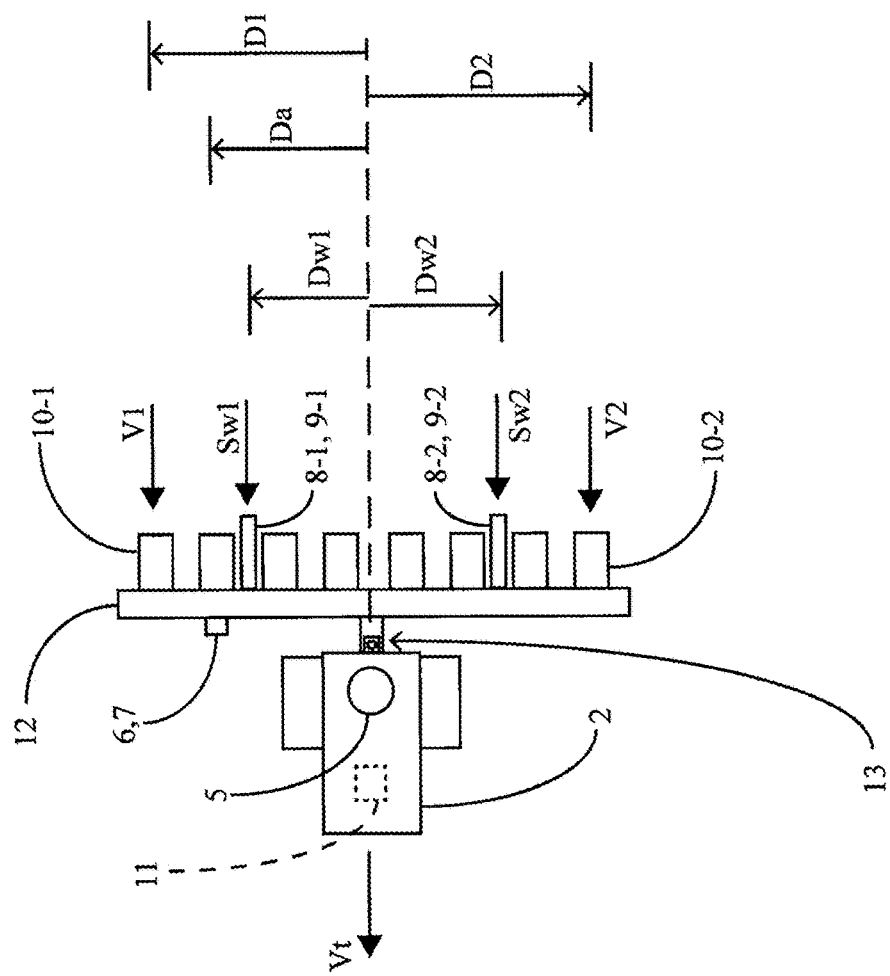
FIG. 9B is a top view of a tractor in cooperation with an embodiment of a planter.

A process 1100 for controlling the rotational speed of the seed conveyor 100 is illustrated in FIG. 9A. At block 1102 the planter monitor 1005 obtains a speed of the planting implement from the speed source 1010. At block 1103, the planter monitor 1005 preferably obtains the current commanded planting population (i.e., the number of desired seeds planted per acre) from a memory contained within the planter monitor 1005. At block 1105, the planter monitor 1005 preferably commands a rotational speed of meter 50 based on the desired population and the current implement speed.

Continuing to refer to FIG. 9A, at block 1110, the planter monitor 1005 preferably determines an operating speed of the seed conveyor 100. This step may be accomplished using a Hall-effect or other sensor adapted to measure the driving speed of the electric motor or the rotational speed of the driven shaft of the seed conveyor 100. This step may also be accomplished by measuring the time between flights 142 passing the seed sensor 550. It should be appreciated in light of the instant disclosure that step of block 1110 does not require measuring an actual operational speed but may comprise measuring a criterion related to the operational speed.

Continuing to refer to FIG. 9A, at block 1500 the planter monitor 1005 preferably determines the ground speed St of the seed conveyor 100. In some embodiments, this step may be accomplished by assuming that the tractor or implement speed reported by the speed source 1010 is equal to the ground speed St of the seed conveyor 100. Such a method is accurate when the tractor and toolbar 12 are not turning, but becomes inaccurate when the tractor and toolbar 12 are turning. In other embodiments the step of block 1500 may be performed more accurately by determining the local ground speed St of each conveyor 100 along the toolbar 12. Such embodiments are described herein in the section entitled "Conveyor Ground Speed Determination."

Figure 9C:
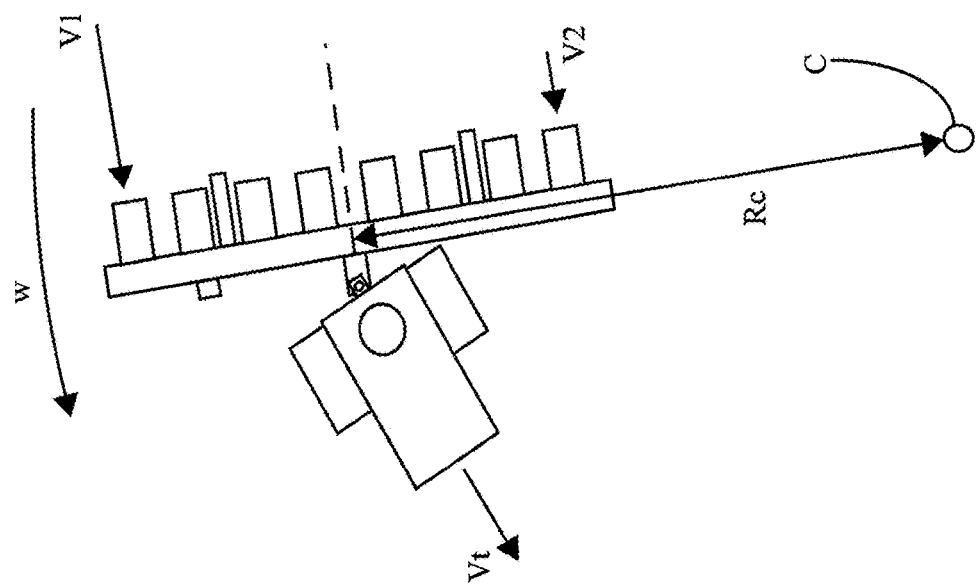
FIG. 9C is a top view of a tractor in cooperation with an embodiment of a planter.

Returning to FIG. 9A and process 1100, at block 1117 the planter monitor 1005 preferably determines a conveyor motor speed command using a calibration curve. A preferred calibration curve 990 is illustrated in FIG. 9E. The calibration curve 1200 relates the ground speed St to a desired operational speed So. It should be appreciated in light of the instant disclosure that the calibration curve 990 could also relate a criterion related to ground speed (such as a measured voltage or commanded voltage) to a criterion related to a desired conveyor speed (such as a measured voltage or commanded voltage). The calibration curve 990 preferably includes a sloped portion 992 (e.g., having a slope approximately equal to 1) in which operational speed is directly related to ground speed. The calibration curve 990 preferably includes a zero-slope portion 991 in which operational speed does not decrease as the ground speed decreases. The constant portion 991 is preferably below a minimum ground speed St-1 (e.g., 1 mile per hour). A slope of the calibration curve 990 preferably changes below the minimum ground speed St-1. The calibration curve 990 preferably has a non-zero minimum operational speed So-1 (e.g., 100 rpm at the upper pulley 152). It should be appreciated in light of the instant disclosure that a zero-slope portion is not required to ensure a non-zero minimum operational speed. It should also be appreciated in light of the instant disclosure that a non-zero minimum operational speed is preferable in order to simplify control of the seed conveyor when stopping and starting the planting implement. The minimum operational speed So-1 is preferably small enough that seeds 62 exiting the seed conveyor 100 do not have sufficient rearward horizontal velocity Vx (FIG. 2C) to cause substantial seed bounce or roll at low ground speeds (e.g., less than 1 mile per hour).

Returning to FIG. 9A and the process 1100, at block 1120 the planter monitor 1005 preferably commands the new desired conveyor speed. It should be appreciated in light of the instant disclosure that the change in conveyor speed command may be deferred until the actual conveyor speed is outside of a preferred range, e.g. 5%, with respect to the desired conveyor speed.

Figure 10A:
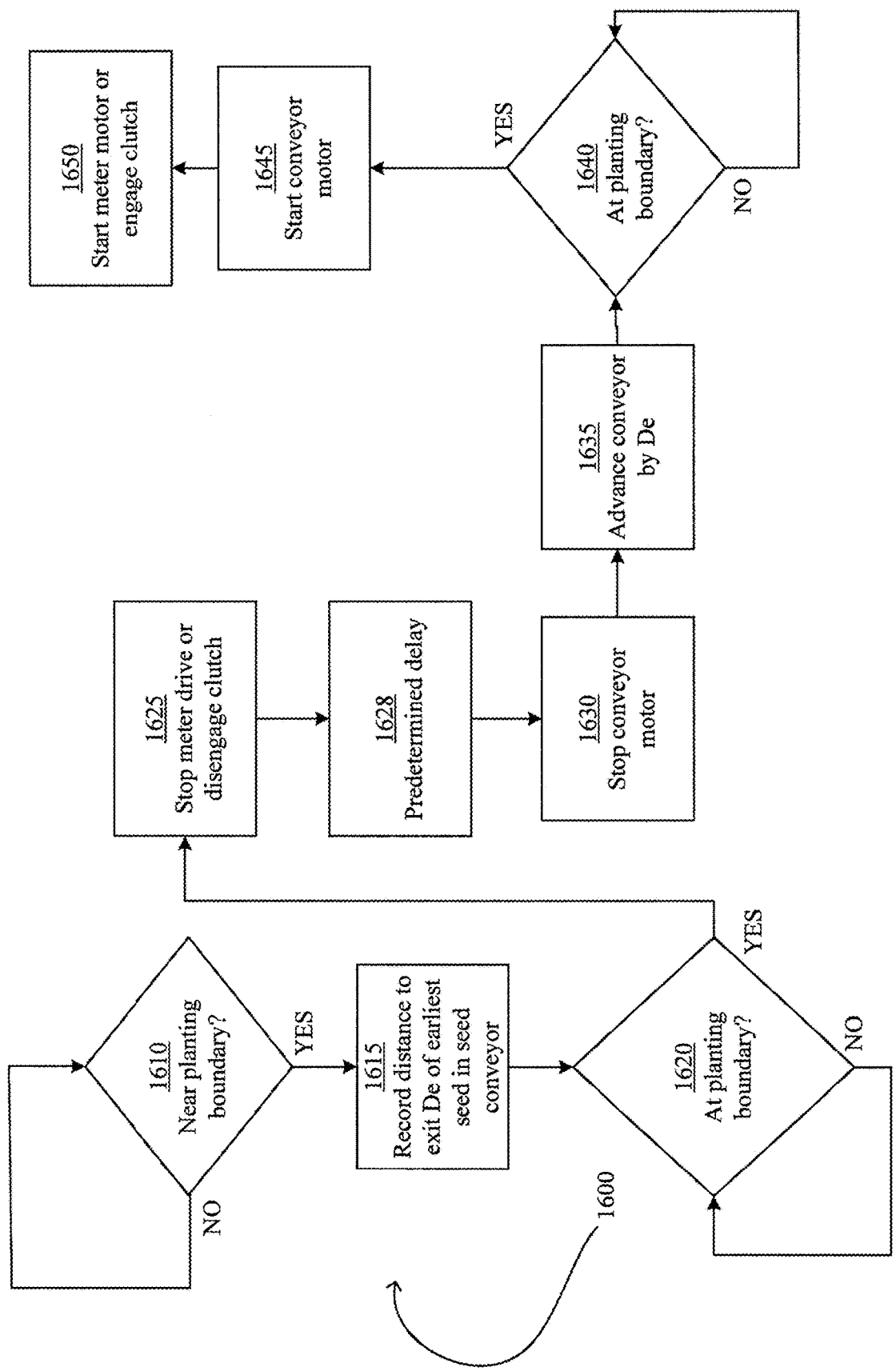
FIG. 10A illustrates an embodiment of a process for controlling a seed conveyor.
Figure 10B:
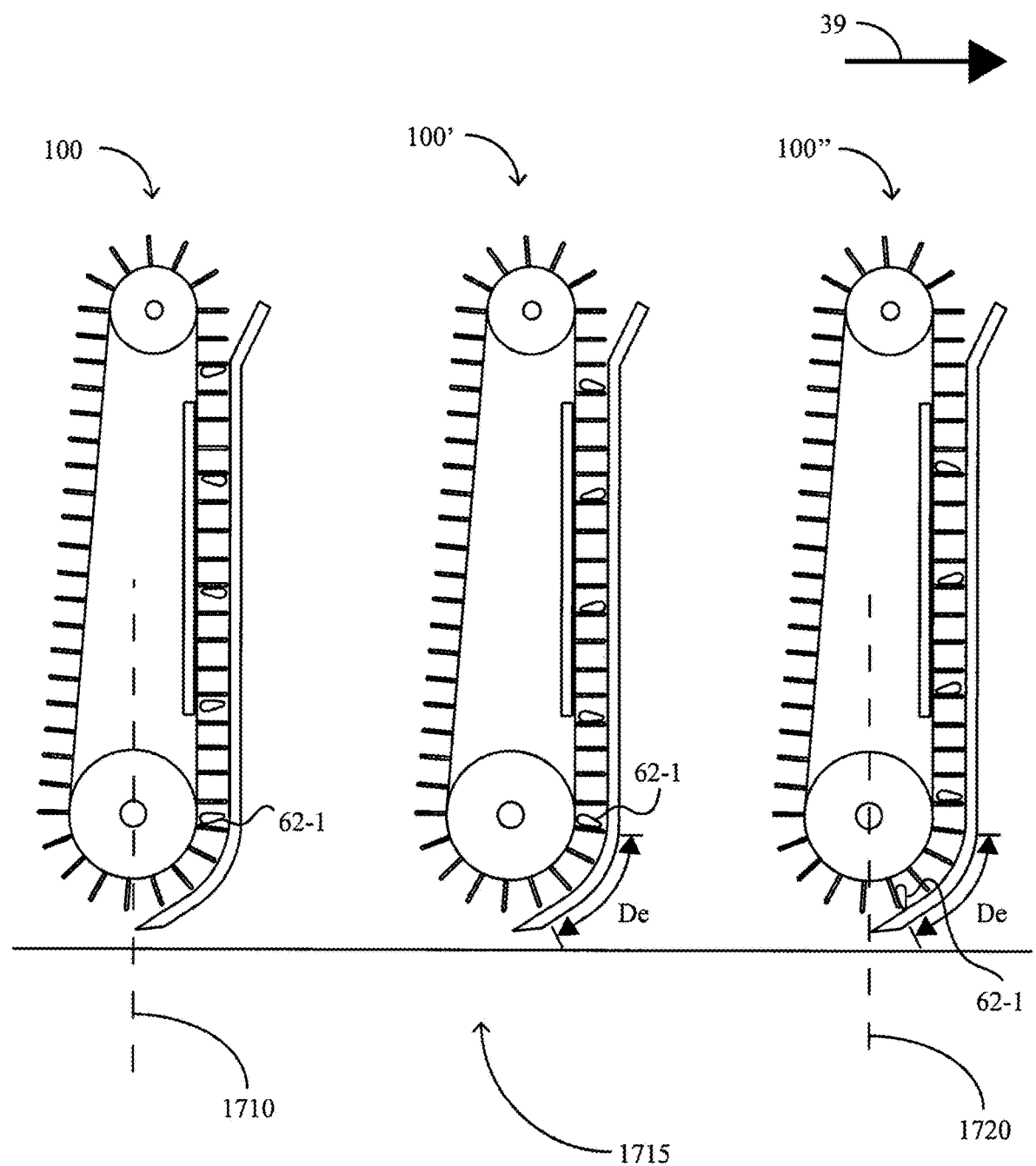
FIG. 10B is a side elevation view of an embodiment of a seed conveyor traversing a field.

Turning to FIG. 10A, a process 1600 is illustrated for shutting off and turning on the seed conveyor 100 at planting boundaries. Turning to FIG. 10B, the seed conveyor is illustrated at three locations indicated by 100, 100', and 100" along direction of travel 39. As illustrated, the meter 50 has introduced several seeds 62 into the seed conveyor 100; the earliest seed introduced into the seed conveyor 1200 is identified as seed 62-1. The seed conveyor 100 first crosses a first planting boundary 1710, thus entering into a no-planting region 1715 (e.g., a waterway), and then crosses a second planting boundary 1720, thus exiting the no-planting region 1715. In overview, the process 1600 shuts off the seed conveyor 100 at the first planting boundary 1710, advances the earliest seed 62-1 a distance De to the exit while the conveyor is in the no-planting region, and starts the seed conveyor at the second planting boundary 1720.

Returning to FIG. 10A to describe the process 1600 in detail, at block 1610 the planter monitor 1005 preferably determines whether the seed conveyor is within a predetermined distance or time from crossing a planting boundary. The current distance to a planting boundary is preferably estimated by comparing the position reported by a GPS receiver 5 (FIG. 9B) to the position at which a planting boundary intersects a line along the direction of travel. The time to a planting boundary is preferably estimated by dividing the distance to a planting boundary by the speed currently reported by the speed source 1010. Once the seed conveyor 100 is within a predetermined time or distance of a planting boundary, at block 1615 the planter monitor 1005 preferably begins to record the distance De between the earliest seed 62-1 in the seed conveyor and the seed exit 164. The distance De is preferably recorded by recording the time of each seed pulse from the seed sensor 550 (FIG. 8B) and then estimating the position of the seed by integrating the speed of the conveyor motor 1020. When De equals zero, it is assumed that the earliest seed 62-1 in the conveyor has exited the conveyor and the planter monitor 1005 preferably identifies the next earliest seed as the earliest seed 62-1. At block 1620, the planter monitor 1005 determines whether the seed conveyor 100 has crossed a planting boundary (e.g., planting boundary 1710 in FIG. 10B). Once the conveyor has crossed a planting boundary into a no-planting region (e.g., no-planting region 1715 in FIG. 10B), at block 1625 the planter monitor 1005 commands the meter drive motor 27 (FIG. 8B) to shut off or alternatively commands a clutch associated with the seed meter 50 to disengage. At block 1628, the planter monitor 1005 preferably allows a predetermined delay to pass before commanding the conveyor motor 1020 to stop at block 1630. The predetermined delay may vary with ground speed and planting population and may be based on empirically determined delays between meter stop commands and the last seed deposited by the meter 50 into the seed conveyor 100.

Continuing to refer to FIG. 10A, at block 1635 the planter monitor 1635 preferably advances the seed conveyor 100 such that the belt 140 travels through a distance De, thus moving the last seed 62-1 adjacent to the seed exit 164. At block 1640, the planter monitor 1005 preferably determines whether the seed conveyor 100 has crossed a planting boundary (e.g., planting boundary 1720 in FIG. 10B). Once a planting boundary has been crossed, the planter monitor 1005 preferably starts the conveyor motor 1020 at block 1645 and preferably subsequently starts the meter drive motor 27 (or alternatively commands a clutch associated with the meter 50 to engage) at block 1650.

Figure 10C:
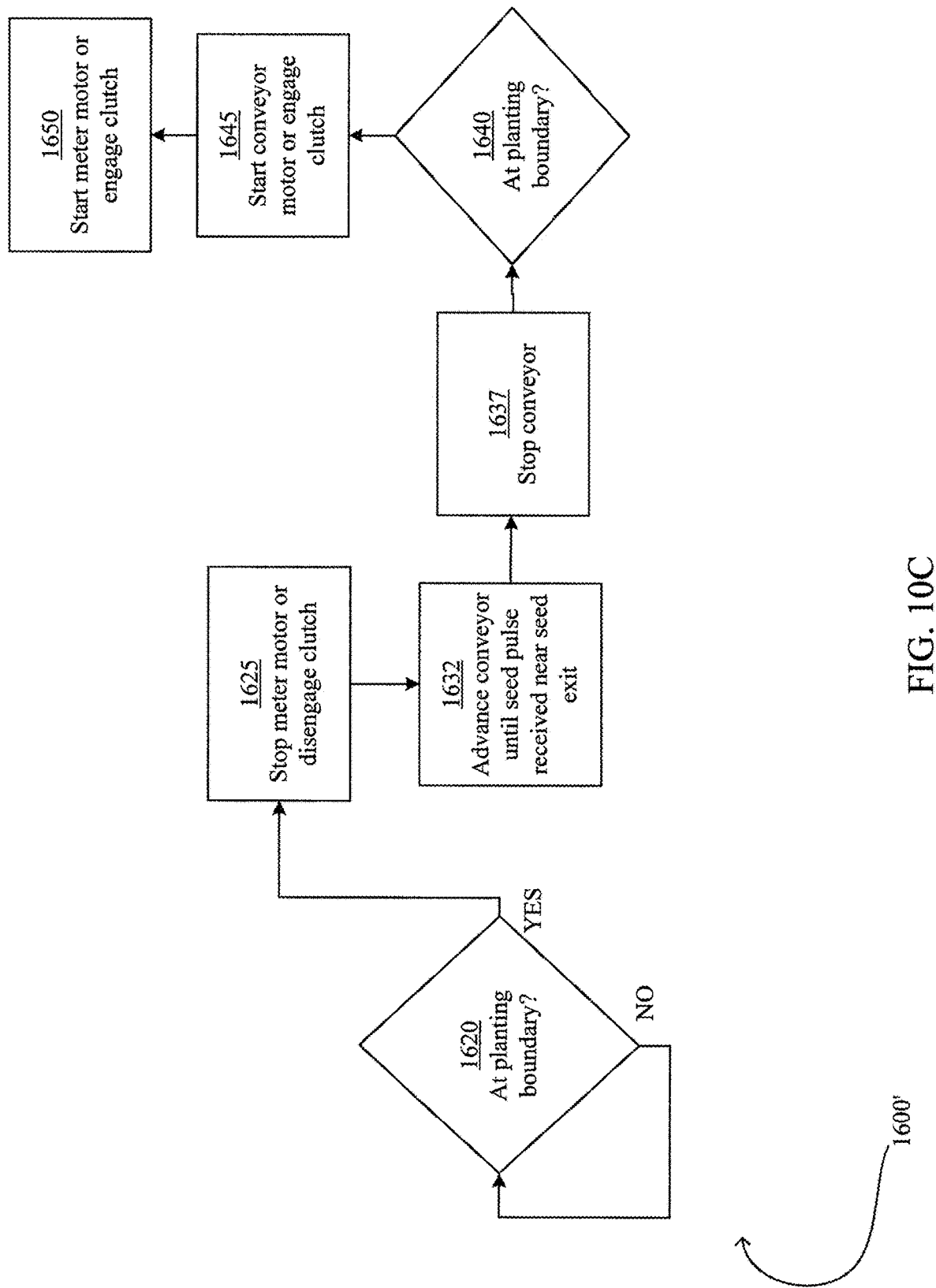
FIG. 10C illustrates an embodiment of a process for controlling a seed conveyor.
Figure 10D:
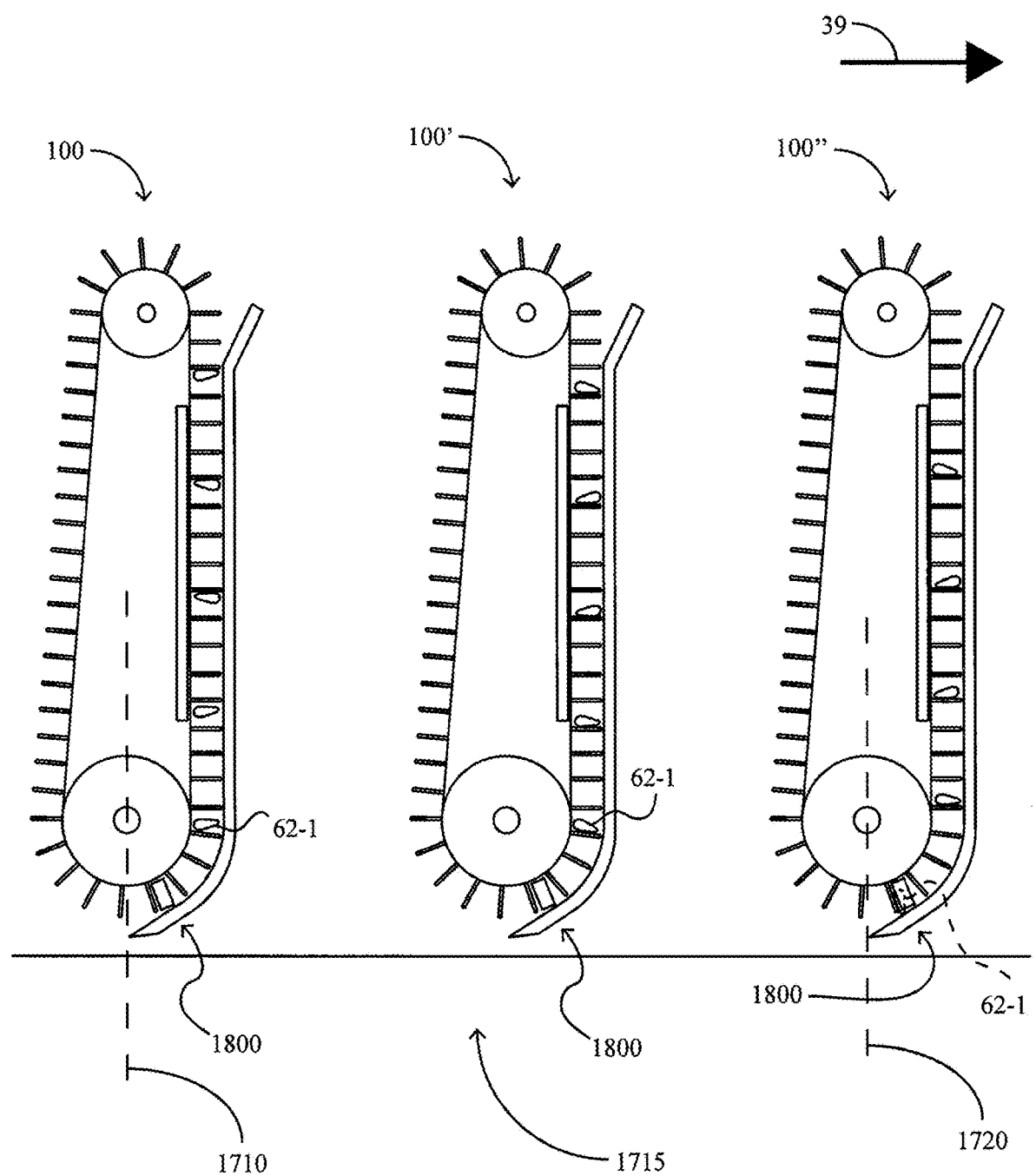
FIG. 10D is a side elevation view of an embodiment of a seed conveyor traversing a field.

Turning to FIG. 10C, another process 1600' is illustrated for shutting off and turning on the seed conveyor 100 at planting boundaries. Turning to FIG. 10D, the seed conveyor is illustrated at three locations indicated by 100, 100', and 100" along direction of travel 39. As with process 1600, process 1600' shuts off the seed conveyor 100 at the first planting boundary 1710, advances the earliest seed 62-1 to the seed exit while the conveyor is in the no-planting boundary, and starts the seed conveyor at the second planting boundary 1720. However, rather than calculating and storing the distance De as in process 1600, process 1600' uses a seed sensor 1800 to determine the location of the earliest seed 62-1. The seed sensor 1800 is preferably an optical seed sensor mounted to the seed conveyor 100 in a fashion similar to the seed sensor 550 described herein. The seed sensor 1800 is preferably disposed to sense seeds 62 adjacent the seed exit. The seed sensor 1800 is preferably disposed to sense seeds 62 prior to release; i.e., before the flight 142 below the seed is sufficiently separated from seed guide 110 to allow the seed to exit the seed conveyor 100.

Returning to FIG. 10C to describe the process 1600' in detail, at block 1620 the planter monitor 1005 preferably determines whether the seed conveyor 100 is at a planting boundary (e.g., first planting boundary 1710 in FIG. 10D). Once the conveyor has crossed a planting boundary into a no-plant region (e.g., no-plant region 1715 in FIG. 10D), at block 1625 the planter monitor 1005 commands the meter drive motor 27 (FIG. 8B) to shut off or alternatively commands a clutch associated with the seed meter 50 to disengage. At block 1632, the planter monitor 1005 preferably commands the conveyor motor 1020 to advance. Once a seed pulse has been received from seed sensor 1800, the planter monitor 1005 preferably commands the conveyor motor 1020 to stop at block 1637. At block 1640, the planter monitor 1005 preferably determines whether the seed conveyor 100 has crossed a planting boundary (e.g., planting boundary 1720 in FIG. 10B). Once a planting boundary has been crossed, the planter monitor 1005 preferably starts the conveyor motor 1020 at block 1645 and preferably subsequently starts the meter drive motor 27 (or alternatively commands a clutch associated with the meter 50 to engage) at block 1650.

Conveyor Ground Speed Determination

As noted elsewhere herein, in order to match the operating speed of the seed conveyor 100 to the ground speed St of the conveyor, it is desirable to determine the ground speed of each seed conveyor at each row unit 10. This determination becomes more complex when the implement is turning, because the speed of each seed conveyor 100 varies according to its distance from the center of the turn. Thus several alternative systems and methods of determining individual conveyor ground speed St are disclosed herein.

Conveyor Ground Speed Determination—Systems

Turning to FIG. 9B, the toolbar 12 is drawn through the field by a tractor 2. The toolbar 12 is preferably mounted to the tractor 2 by a hitch 13 near the transverse center of the toolbar. Toolbar 12 is supported by wheels 8, which are mounted in transversely spaced relation along the toolbar. A right wheel 8-1 is mounted at a transverse distance Dw-1 from the center of the toolbar 12. A left wheel 8-2 is mounted at a transverse distance Dw-2 from the center of the toolbar 12. Wheels 8 may be mounted to the toolbar 12 in a fashion similar to the wheel and tire assemblies disclosed in U.S. patent application Ser. No. 12/270,317 (Pub. No. US 2010/0116974). Row units 10, each preferably including a seed conveyor 100, are mounted in transversely spaced relation along the toolbar 12. A right row unit 10-1 is located at a transverse distance D1 from the center of toolbar 12. A left row unit 10-2 is located at a transverse distance D2 from the center of toolbar 12.

Continuing to refer to FIG. 9B, several data-gathering devices are preferably mounted to the tractor 2 and the toolbar 12. A gyroscope 6 is preferably mounted to the toolbar 12. The gyroscope 6 is preferably in electrical communication with the planter monitor 1005. A three-axis accelerometer 7 is preferably mounted to the toolbar 12. The accelerometer 7 is preferably mounted to the toolbar 12. The gyroscope and accelerometer 6,7 are mounted to the toolbar at a transverse distance Da from the center of the toolbar 12. A GPS receiver 5 is preferably mounted to the tractor 2. The GPS receiver 5 is preferably in electrical communication with the planter monitor 1005. A radar speed sensor 11 is preferably mounted to the underside of the tractor 2. The radar speed sensor 11 is preferably in electrical communication with the planter monitor 1005. Wheel speed sensors 9 are preferably mounted to wheels 8 and configured to measure the rotational speed of wheels 8. Wheel speed sensors 9 are preferably in electrical communication with the planter monitor 1005. Wheel speed sensors 9 may be similar to the rotation sensors described in U.S. patent application Ser. No. 12/270,317 (Pub. No. US 2010/0116974). In other embodiments, a GPS receiver and radar speed sensor are mounted to the toolbar 12.

Continuing to refer to FIG. 9B, while traveling through the field, the tractor 2 has a velocity Vt, while the right and left row units 10-1,10-2 have velocities V1,V2 respectively. It should be appreciated that the ground speed St of each seed conveyor 100 is equal to the speed component of the associated row unit velocity; e.g., the magnitude of V1 is equal to the ground speed St of the seed conveyor associated with row unit 10-1. Additionally, wheels 8-1,8-2 travel at longitudinal speeds Sw1, Sw2. As illustrated in FIG. 9B, when the tractor 2 is traveling in a consistent direction (i.e., not turning), velocities Vt, V1 and V2 are equal. As illustrated in FIG. 9C, as the tractor 2 turns, the direction of velocity Vt changes and the velocities V1 and V2. The toolbar 12 has an angular velocity w about a center of rotation C. The center of rotation C is a distance Rc from the center of the toolbar 12. It should be appreciated that the longitudinal speed of each point along the toolbar 12 increases with the distance of each point from the center of the toolbar.

Conveyor Ground Speed Determination—Methods

Figure 9D:
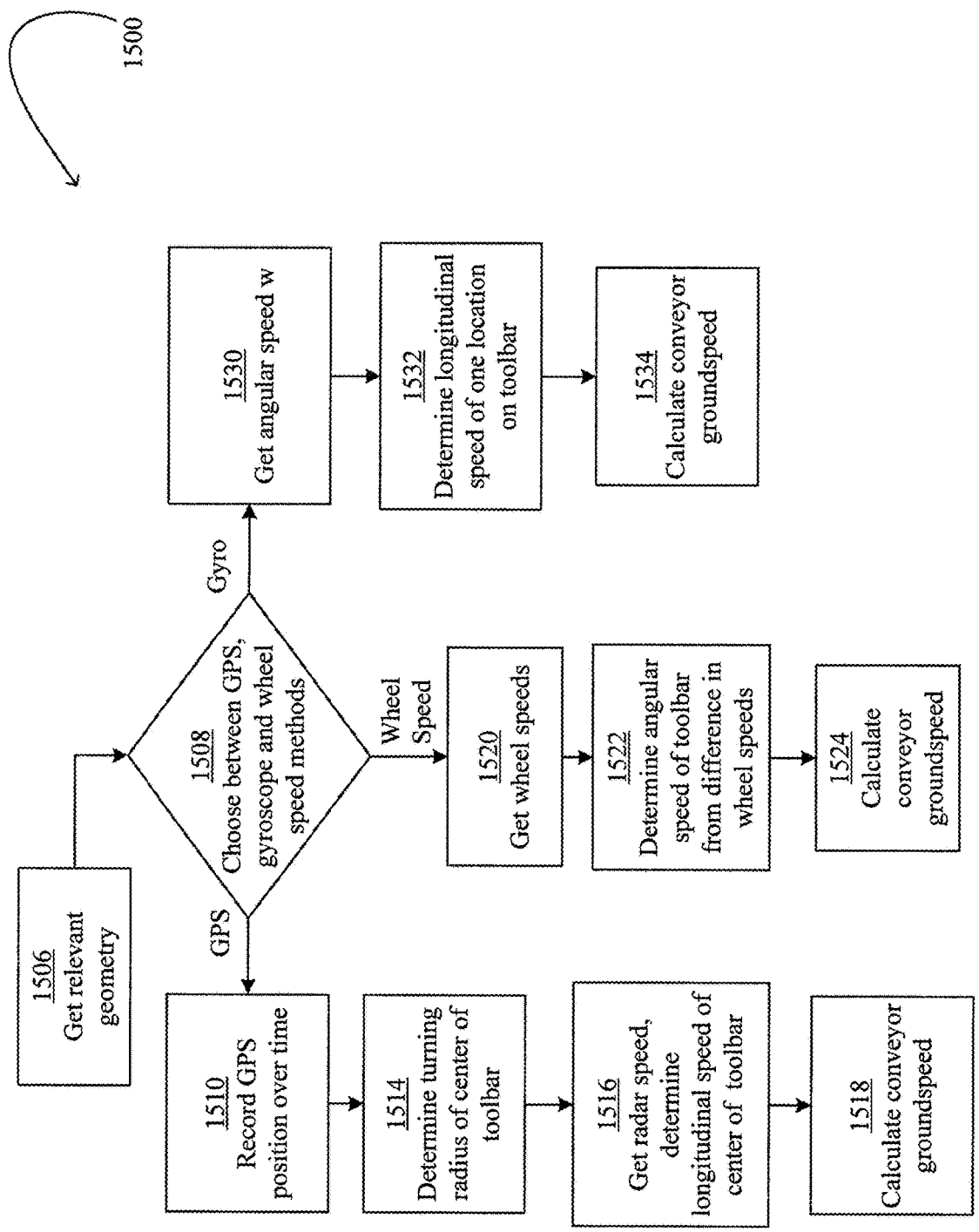
FIG. 9D illustrates an embodiment of a process for determining a local speed along a toolbar.
Figure 9E:
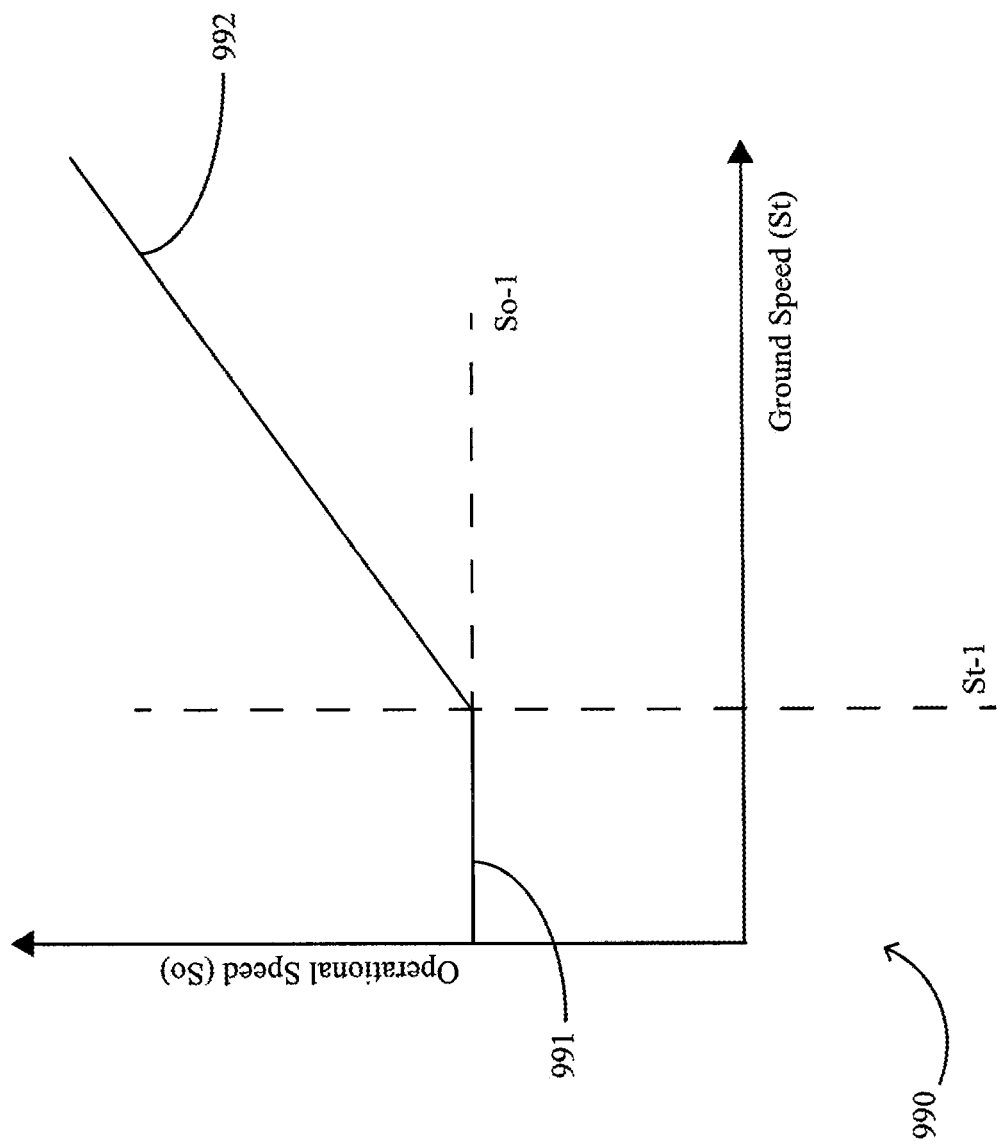
FIG. 9E illustrates a calibration curve for controlling a seed conveyor.

Turning to FIG. 9D, process 1500 includes multiple methods of determining conveyor ground speed St. It should be appreciated that process 1500 of FIG. 9D is a detailed illustration of the block 1500 of FIG. 9A.

At block 1506, the planter monitor 1005 preferably obtains the geometry relevant to the available groundspeed determination method, e.g., distances D1, D2, Da, Dw1, Dw2, the transverse and longitudinal offsets between the GPS receiver 5 and the hitch 13, and the longitudinal offset between the hitch 13 and the center of the toolbar 12. To accomplish this step, the planter monitor 1005 preferably prompts the user to enter the relevant distances and offsets via a series of graphical user interface screens similar to those disclosed in Applicant's co-pending PCT Patent Application No. PCT/US2011/045587, previously incorporated herein by reference.

At block 1508, the planter monitor 1005 preferably selects the desired method of ground speed St. In some embodiments step may be accomplished by simply choosing the only available method. In other embodiments, the method may be selected based on the stability of the signals used in certain methods (e.g., a method other than GPS may be selected during periods of GPS signal instability).

Turning first to the wheel speed method, at block 1520 the planter monitor 1005 preferably determines the longitudinal speeds Sw1,Sw2 of wheels 8-1,8-2 from the signals generated by wheel speed sensors 9-1,9-2, respectively. At block 1522, the planter monitor 1005 preferably determines the angular speed w of the toolbar 12 by a relation such as:

$$w = \frac{S_{w1} - S_{w2}}{D_{w1} + D_{w2}}$$

At block 1524, the planter monitor 1004 preferably determines the longitudinal speed at a row unit, e.g., row unit 10-1, using a relation such as:

$$V_1 = S_{w1} + w(D_1 - D_{w1})$$

In this and each of the following methods described herein, the planter monitor 1005 preferably stores the speed Vn of each row unit 10-n as the groundspeed St of the seed conveyor 100 associated with the row unit 10-n.

Turning next to the gyroscope method, at block 1530 the planter monitor 1005 preferably determines the angular speed w of the toolbar 12 from the signal generated by the gyroscope 6. At block 1532, the planter monitor 1005 preferably determines the longitudinal speed of one location along toolbar 12. In some embodiments, the longitudinal speed of the center of the toolbar 12 may be determined from the signal generated by the radar speed sensor 11. In other embodiments, the longitudinal speed of the accelerometer 7 may be determined by integrating the signal from the accelerometer. At block 1534, the planter monitor 1005 preferably calculates the velocity of, e.g., the row unit 10-1 based on the angular speed w and the known longitudinal speed of a location on the toolbar. Assuming the accelerometer-integrated speed (Sa) is used, the planter monitor 1005 preferably uses a relation such as:

$$V_1 = S_a + w(D_1 - D_a)$$

Turning next to the GPS method, at block 1510 the planter monitor 1005 preferably records the GPS position over a period of time. At block 1514, the planter monitor 1005 preferably determines the distance Rc from the center of the toolbar 12 to the center of rotation of the toolbar. At block 1516, the planter monitor 1005 preferably determines the longitudinal speed of the center of the toolbar (Vc) from the tractor speed Vt reported by the radar speed sensor 11. At block 1518, the planter monitor 1005 preferably determines the velocity of a row unit 10-1 using a relation such as:

$$V_1 = V_c + wD_1$$

It should be appreciated that the methods disclosed herein for determining a ground speed St of each seed conveyor effectively determine a row-unit-specific speed. Thus the row-unit-specific speed could also be used to implement a desired application rate in implements having sectional or row-by-row application rate control. For example, in some embodiments the meter drive motor 27 is driven at a rate based upon the row-unit-specific speed determined by one or more of the methods described herein with respect to FIG. 9D, rather than based upon the tractor speed reported by GPS or radar as is conventional. It should be appreciated that the increase in application rate accuracy resulting from the use of a row-unit-specific speed is most significant when the implement is executing a turn or otherwise traveling in a curvilinear path. It should also be appreciated that such use of a row-unit-specific speed to control application rate could be implemented in row units without a seed conveyor (e.g., using a conventional seed tube or depositing seeds directly from the metering device into the seed trench).

Mapping Row Speed

Figure 16:
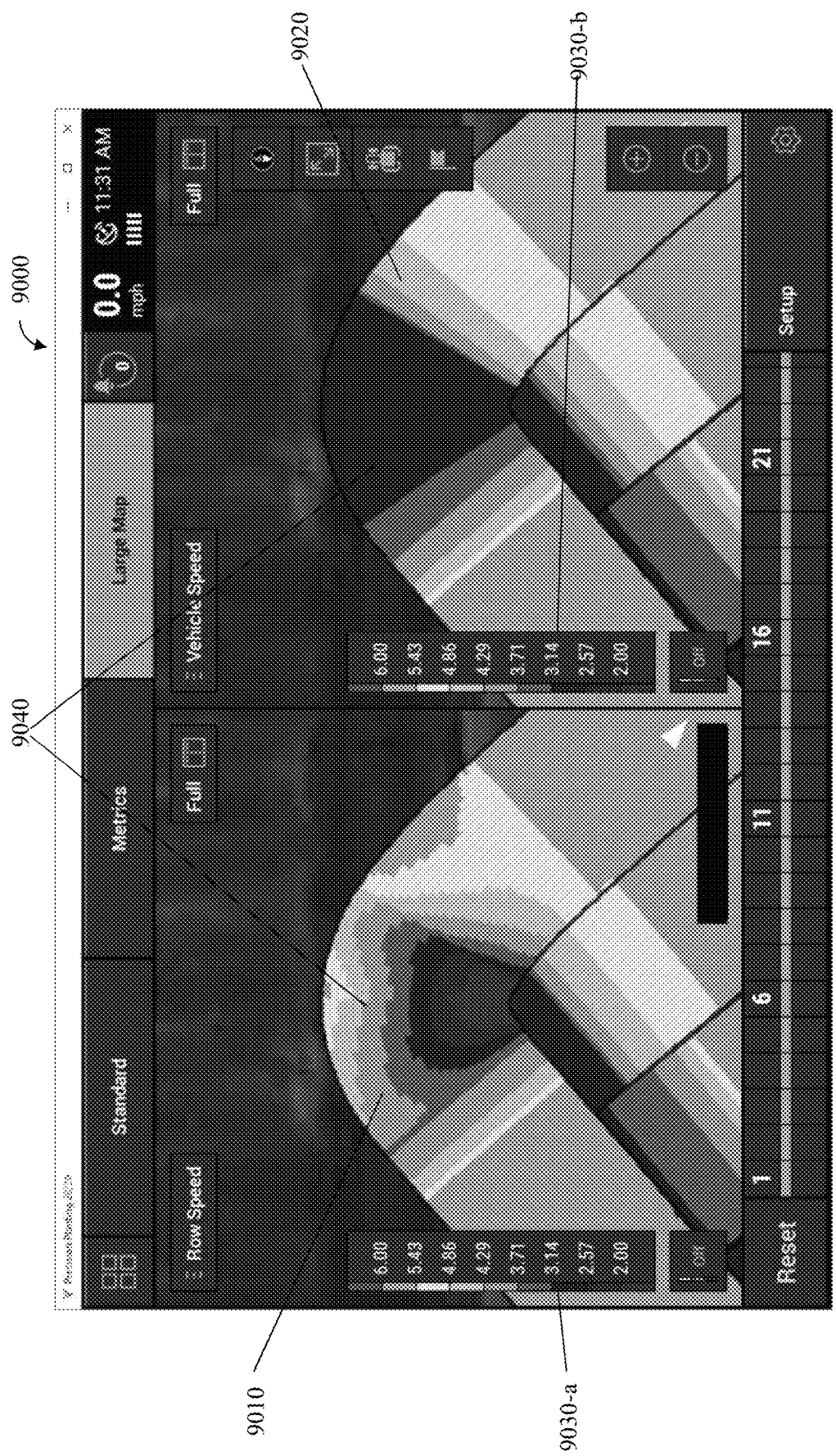
FIG. 16 illustrates an embodiment of a monitor screen for displaying a row speed map.

FIG. 16 illustrates an embodiment of a monitor screen 9000 in which the differences between row speed (row speed map 9010) and implement or vehicle speed (vehicle speed map 9020) are displayed side-by-side for the same geographic location. Different speeds can be represented by different colors. Speed legends 9030-a and 9030-b can be placed on monitor screen 9000 to show the range of speeds.

It can be seen that in areas where the implement 9200 is traveling straight, the row speed and the vehicle speed are the same. In turn 9040, it can be seen that speed across the implement 9200 is different in row speed map 9010 compared to vehicle speed map 9020 depending on where the row is across turn 9040.

Figure 17:
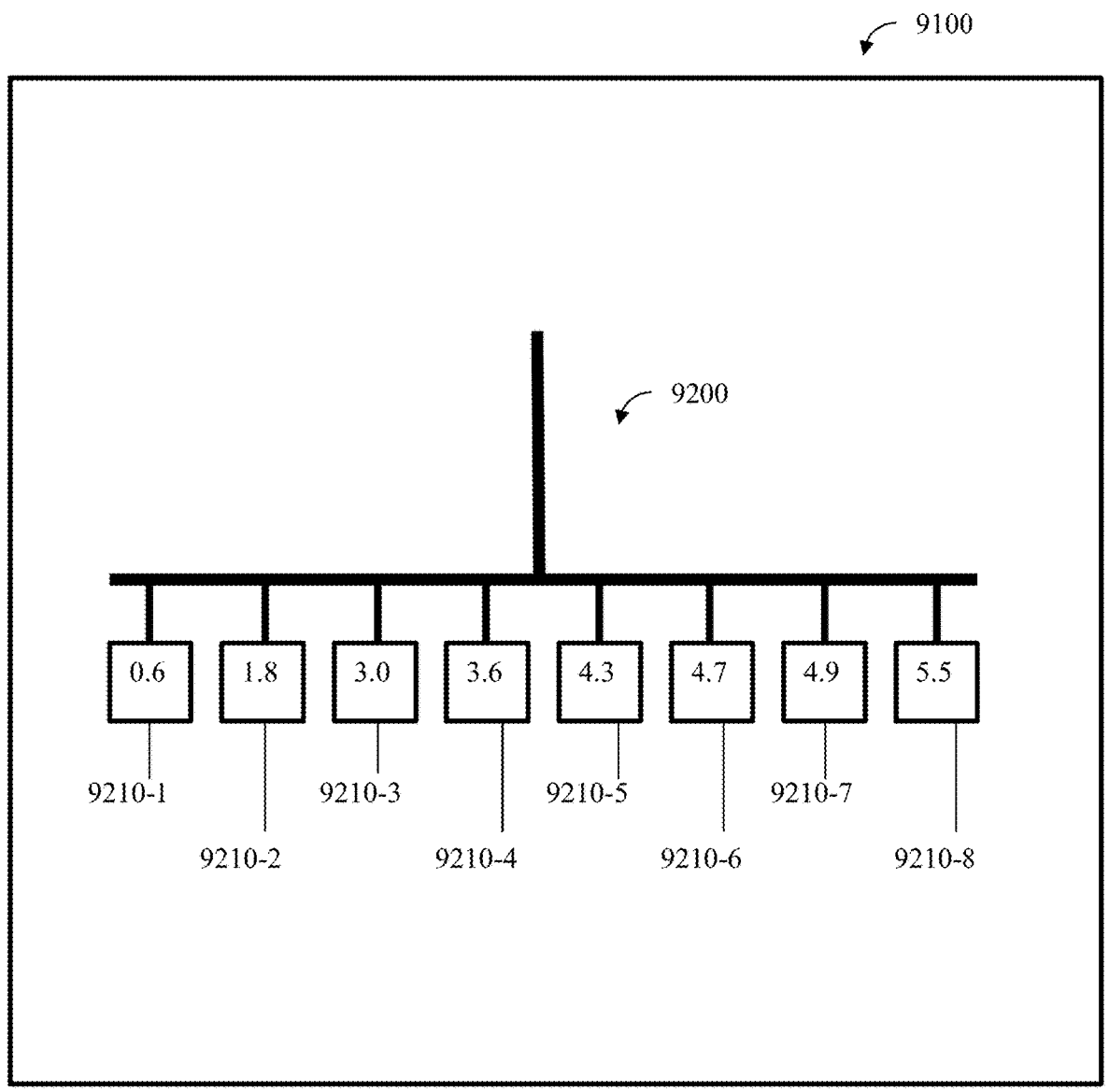
FIG. 17 illustrates an embodiment of a monitor screen displaying row speed for each row

In addition to or alternative to a map, speed at each row can be displayed on a screen 9100 as illustrated in FIG. 17. Implement 9200 having eight rows 9210 (9210-1 to 9210-8) is displayed on screen 9100 with the speed at each row 9210.

Row speed can be measured directly with a speed measuring sensor, such as a speedometer or radar, or speed can be calculated based on vehicle speed and the geometry of the vehicle. While described with speed at a row, for implements that are not configured as rows, points across the implement can be considered rows. Although the disclosure herein is illustrated for a planter, the method can be used with any implement, such as a seeder, side-dress bar, combine, or any other implement.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method of mapping speed of a plurality of row units of an implement traveling through a field, comprising:
   displaying on a monitor screen an area of a field traveled by the implement;
   detecting a ground speed of each of the plurality of row units as the implement travels in a forward direction of travel; and
   graphically representing on the monitor screen the detected ground speed of each of the plurality of row units over the area of the field traveled by the implement in the forward direction of travel.

2. The method of claim 1, wherein the graphical representation of the detected ground speed of each row unit includes associating different colors with different ranges of ground speed.

3. The method of claim 2, further comprising:
displaying a speed legend on the monitor screen associating a particular color with a particular range of ground speed.

4. The method of claim 1, wherein the step of detecting the ground speed of each of the plurality of row units of the implement comprises:
measuring a ground speed of the implement; and
calculating the ground speed of each of the plurality of row units based on a geometry of the implement.

5. A method of mapping speed of a plurality of row units of an implement traveling through a field, comprising:
displaying on a monitor screen an area of a field traveled by the implement;
detecting a speed of each of the plurality of row units of the implement;
graphically representing the detected speed of each of the plurality of row units on the area of the field traveled by the implement;
detecting a speed of the implement; and
graphically representing the detected speed of the implement on the area of the field traveled by the implement in side-by-side relation with the graphical representation of the detected speed of each of the plurality of row units.

6. The method of claim 5, wherein the graphical representation of the detected speed of the implement includes associating different colors with different speed ranges.

7. A method of mapping speed of a plurality of row units of an implement traveling through a field, comprising:
displaying on a monitor screen an area of a field traveled by the implement;
detecting a speed of each of the plurality of row units of the implement;
graphically representing the detected speed of each of the plurality of row units on the area of the field traveled by the implement, wherein the graphical representation of the detected speed of each of the plurality of row units includes associating different colors with different speed ranges;
detecting a speed of the implement; and
graphically representing the detected speed of the implement on the area of the field traveled by the implement in side-by-side relation with the graphical representation of the detected speed of each of the plurality of row units.

8. The method of claim 7, wherein the graphical representation of the detected speed of the implement includes associating different colors with different speed ranges.

9. A method of mapping speed of a plurality of row units of an implement traveling through a field, comprising:
displaying on a monitor screen an area of a field traveled by the implement;
detecting a speed of each of the plurality of row units of the implement;
graphically representing the detected speed of each of the plurality of row units on the area of the field traveled by the implement, wherein the graphical representation of the detected speed of each of the plurality of row units includes associating different colors with different speed ranges;
detecting a speed of the implement;
displaying a speed legend on the monitor screen associating a particular color with a particular speed range; and
graphically representing the detected speed of the implement on the area of the field traveled by the planter in side-by-side relation with the graphical representation of the detected speed of each of the plurality of row units.

10. The method of claim 9, wherein the graphical representation of the detected speed of the implement includes associating different colors with different speed ranges.

* * * * *